US010337538B2

(12) United States Patent
Matsuzaki et al.

(10) Patent No.: US 10,337,538 B2
(45) Date of Patent: Jul. 2, 2019

(54) SHOVEL

(71) Applicant: SUMITOMO HEAVY INDUSTRIES, LTD., Tokyo (JP)

(72) Inventors: Eisuke Matsuzaki, Kanagawa (JP); Hiroshi Ishiyama, Kanagawa (JP); Koichiro Tsukane, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 111 days.

(21) Appl. No.: 15/479,422

(22) Filed: Apr. 5, 2017

(65) Prior Publication Data

US 2017/0204887 A1 Jul. 20, 2017

Related U.S. Application Data

(63) Continuation of application No. PCT/JP2015/077730, filed on Sep. 30, 2015.

(30) Foreign Application Priority Data

Oct. 6, 2014 (JP) ................................ 2014-205831

(51) Int. Cl.
*F16D 31/02* (2006.01)
*F15B 21/14* (2006.01)
(Continued)

(52) U.S. Cl.
CPC .............. *F15B 21/14* (2013.01); *E02F 3/308* (2013.01); *E02F 9/20* (2013.01); *E02F 9/22* (2013.01);
(Continued)

(58) Field of Classification Search
CPC .......... F15B 1/024; F15B 1/033; F15B 11/17; F15B 21/14; E02F 9/2217
(Continued)

(56) References Cited

U.S. PATENT DOCUMENTS

| | | | | |
|---|---|---|---|---|
| 6,009,708 A * | 1/2000 | Miki | E02F 9/2217 60/414 |
| 8,726,645 B2 * | 5/2014 | Shang | F15B 21/14 60/414 |

(Continued)

FOREIGN PATENT DOCUMENTS

| | | |
|---|---|---|
| EP | 3118465 | 1/2017 |
| JP | 2010-048417 | 3/2010 |

(Continued)

OTHER PUBLICATIONS

International Search Report for PCT/JP2015/077730 dated Dec. 22, 2015.

*Primary Examiner* — Michael Leslie
(74) *Attorney, Agent, or Firm* — IPUSA, PLLC

(57) ABSTRACT

A shovel includes a first pump 14L; a second pump 14R; a hydraulic swing motor 21; a pump/motor 14A configured to generate an engine-assist torque in response to hydraulic oil from the hydraulic swing motor 21 during swing deceleration; an accumulator 80 configured to accumulate the hydraulic oil flowing out of the hydraulic swing motor 21 during swing deceleration; a regeneration valve 22G configured to switch open/close of transfer from a discharge port 21L to the pump/motor 14A and the accumulator 80; and a controller configured to control the regeneration valve 22G. During swing deceleration, the controller adjusts an open area of the regeneration valve 22G in such a way that a swing flowing-out pressure becomes a swing braking target pressure, and causes the hydraulic oil flowing out of the hydraulic swing motor 21 to flow into the pump/motor 14A and the accumulator 80 at the same pressure.

13 Claims, 31 Drawing Sheets

(51) Int. Cl.

| | |
|---|---|
| ***E02F 9/22*** | (2006.01) |
| ***E02F 3/30*** | (2006.01) |
| ***E02F 9/20*** | (2006.01) |
| ***F15B 1/033*** | (2006.01) |
| ***F15B 11/17*** | (2006.01) |
| *E02F 3/40* | (2006.01) |

(52) U.S. Cl.
CPC .......... *E02F 9/2217* (2013.01); *E02F 9/2232* (2013.01); *E02F 9/2267* (2013.01); *E02F 9/2292* (2013.01); *E02F 9/2296* (2013.01); *F15B 1/033* (2013.01); *F15B 11/17* (2013.01); *E02F 3/401* (2013.01); *E02F 9/2271* (2013.01); *F15B 2201/51* (2013.01); *F15B 2211/20576* (2013.01); *F15B 2211/212* (2013.01); *F15B 2211/40* (2013.01); *F15B 2211/7053* (2013.01); *F15B 2211/7058* (2013.01); *F15B 2211/71* (2013.01); *F15B 2211/88* (2013.01)

(58) Field of Classification Search
USPC ............................................................ 60/414
See application file for complete search history.

(56) References Cited

U.S. PATENT DOCUMENTS

| | | | | |
|---|---|---|---|---|
| 9,080,582 | B2 * | 7/2015 | Fukuda .................. | F15B 21/14 |
| 9,618,014 | B2 * | 4/2017 | Morris .................... | F15B 21/14 |
| 2010/0043420 | A1 | 2/2010 | Ikeda et al. | |
| 2011/0265467 | A1 | 11/2011 | Kawasaki | |
| 2012/0151904 | A1 | 6/2012 | Shang et al. | |
| 2014/0325975 | A1 * | 11/2014 | Kim ....................... | F15B 21/14 60/414 |
| 2015/0013323 | A1 | 1/2015 | Fukuda et al. | |
| 2016/0273192 | A1 * | 9/2016 | Kajita ..................... | F15B 21/14 |
| 2016/0376770 | A1 * | 12/2016 | Matsuzaki ............ | E02F 9/2217 60/414 |

FOREIGN PATENT DOCUMENTS

| | | |
|---|---|---|
| JP | 2010-084888 | 4/2010 |
| JP | 2011-017427 | 1/2011 |
| JP | 2013-151986 | 8/2013 |
| WO | 2014/120930 | 8/2014 |

* cited by examiner

SHOVEL

CROSS-REFERENCE TO RELATED APPLICATIONS

The present application is a continuation application of International Application No. PCT/JP2015/077730 filed on Sep. 30, 2015, which claims priority to Japanese Patent Application No. 2014-205831 filed on Oct. 6, 2014. The contents of these applications are incorporated herein by reference in their entirety.

BACKGROUND OF THE INVENTION

1. Field of the Invention

The present invention relates to a shovel that mounts a hydraulic circuit including a plurality of hydraulic pumps and at least one hydraulic device serving as at least either of a hydraulic pump and a hydraulic motor.

2. Description of the Related Art

A hydraulic system for a construction machine is known that is provided with a boom cylinder, an arm cylinder, and a bucket cylinder that may be simultaneously actuated by hydraulic oil supplied from each of three hydraulic pumps (for example, refer to PTL 1).

To increase an actuating speed of a working device comprised of a boom, an arm, and a bucket, this hydraulic system merges the hydraulic oil supplied from each of the three hydraulic pumps together and allows the hydraulic oil to flow into respective corresponding cylinders.

CITATION LIST

Patent Literature

[PTL 1] Japanese Unexamined Patent Application Publication No. 2010-48417

SUMMARY OF THE INVENTION

Technical Problem

However, the above hydraulic system does not mention difference in load pressure in each of the boom cylinder, the arm cylinder, and the bucket cylinder when they are actuated simultaneously. Thus, it cannot prevent energy loss caused by the difference in load pressure, and far from a system that can effectively actuate the three hydraulic pumps.

In view of the above, it is desirable to provide a shovel that mounts a hydraulic circuit that can more effectively actuate a plurality of hydraulic pumps and at least one hydraulic device serving as at least either of a hydraulic pump and a hydraulic motor.

Solution to Problem

A shovel according to an embodiment of the present invention is provided. The shovel includes a plurality of hydraulic pumps. The shovel includes a hydraulic swing motor; a hydraulic motor configured to generate an engine-assist torque in response to hydraulic oil flowing out of a suction port side of the hydraulic swing motor during swing acceleration, or in response to hydraulic oil flowing out of a discharge port side of the hydraulic swing motor during swing deceleration; an accumulator configured to accumulate the flowing out hydraulic oil; an open/close valve, whose open area is adjustable, configured to switch open/close of transfer from one of the suction port and the discharge port to both the hydraulic motor and the accumulator; and a control device configured to control the open/close valve. The control device adjusts the open area of the open/close valve in such a way that a pressure of the flowing out hydraulic oil becomes a predetermined target pressure, and causes the flowing out hydraulic oil to flow into each of the hydraulic motor and the accumulator at the same pressure.

A shovel according to an embodiment of the present invention is provided. The shovel includes a plurality of hydraulic pumps. The shovel includes a hydraulic swing motor; an accumulator configured to accumulate hydraulic oil flowing out of a suction port side of the hydraulic swing motor during swing acceleration, or hydraulic oil flowing out of a discharge port side of the hydraulic swing motor during swing deceleration; an open/close valve, whose open area is adjustable, configured to switch open/close of transfer from one of the suction port and the discharge port to the accumulator; and a control device configured to control the open/close valve. The control device adjusts the open area of the open/close valve in such a way that a pressure of the flowing out hydraulic oil becomes a predetermined target pressure, and causes the flowing out hydraulic oil to flow into the accumulator.

Advantageous Effects of Invention

Due to the above means, a shovel can be provided that mounts a hydraulic circuit that can more effectively actuate a plurality of hydraulic pumps and at least one hydraulic device serving as at least either of a hydraulic pump and a hydraulic motor.

DETAILED DESCRIPTION OF THE PREFERRED EMBODIMENTS

Figure 1:
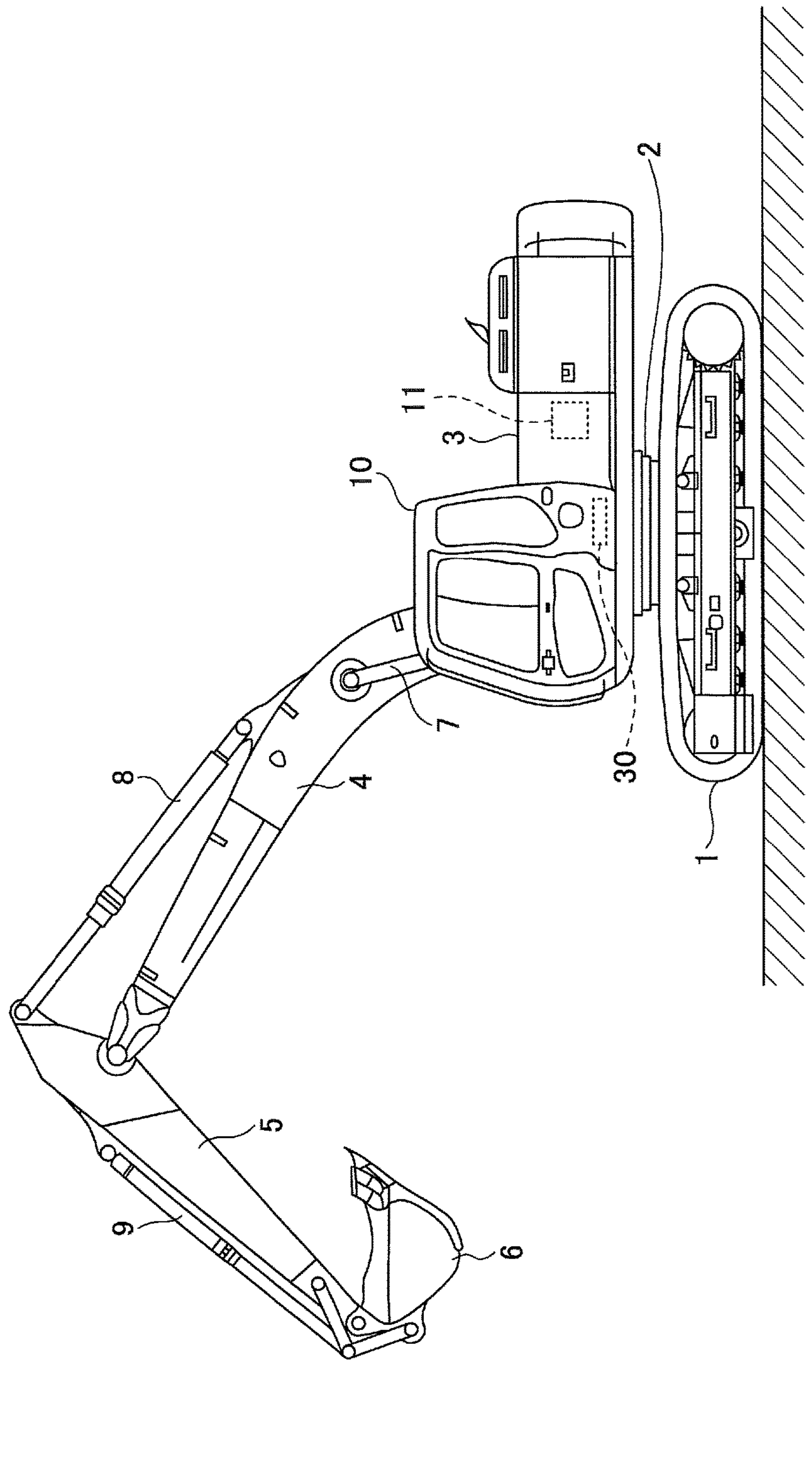
FIG. 1 is a side view of a shovel.

FIG. 1 is a side view of a shovel that the present invention is applied to. An upper swing body 3 is mounted on a lower running body 1 via a swing mechanism 2. A boom 4 is attached to the upper swing body 3. An arm 5 is attached to an end of the boom 4, and a bucket 6 is attached to an end of the arm 5. The boom 4, arm 5 and bucket 6 each as a working element constitutes an excavating attachment as an example of an attachment, and are hydraulically actuated by a boom cylinder 7, an arm cylinder 8 and a bucket cylinder 9, respectively. A cabin 10 is provided on the upper swing body 3, and a power source such as an engine 11 or the like, a controller 30 and the like are mounted on the upper swing body 3.

The controller 30 is a control device as a main control part that executes a drive control of the shovel. In the present embodiment, the controller 30 is comprised of an arithmetic processing unit including a Central Processing Unit (CPU) and an internal memory, and achieves various functions by causing the CPU to execute a program for the drive control stored in the internal memory.

Figure 2:
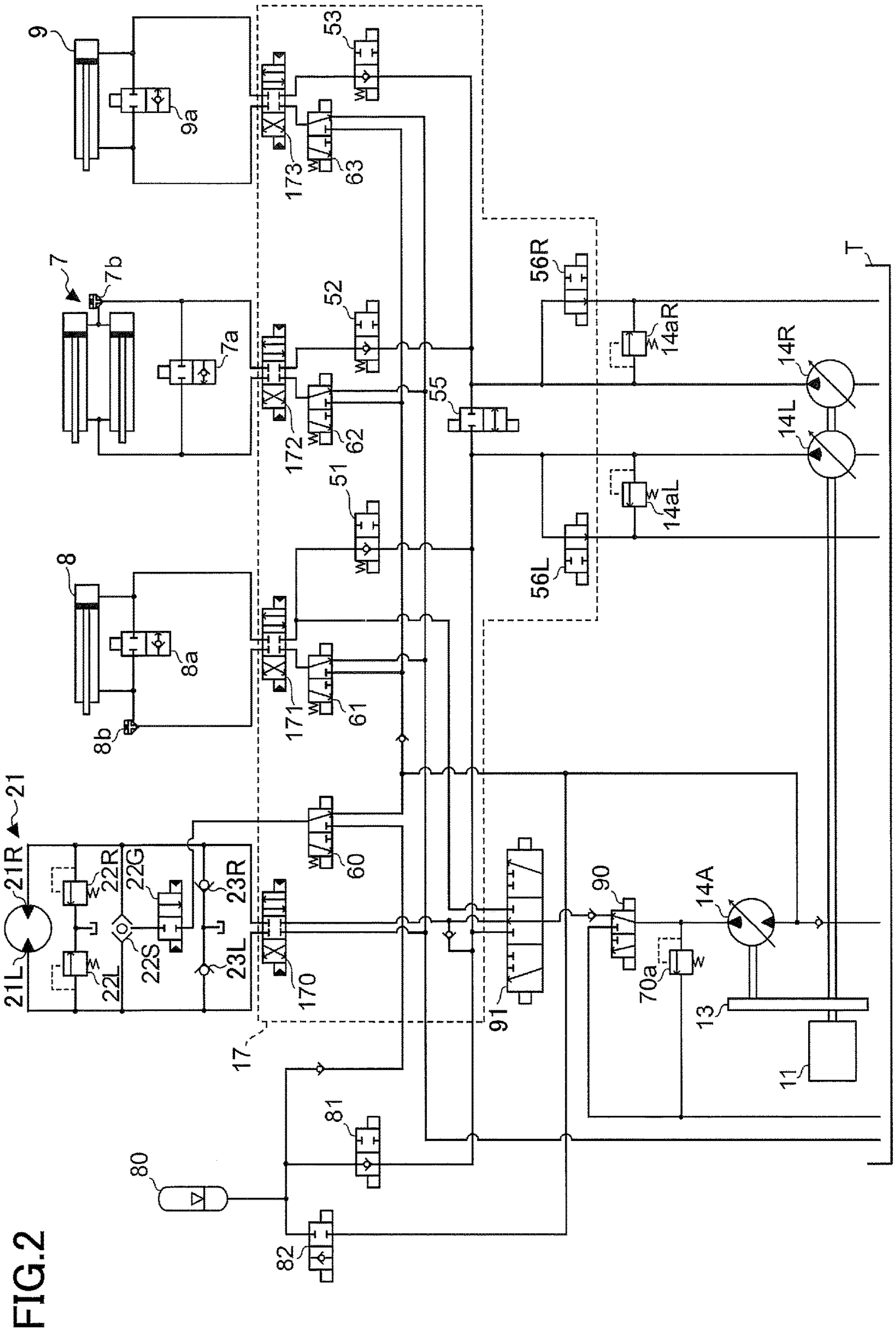
FIG. 2 is a schematic view showing a configuration example of a hydraulic circuit mounted on the shovel in FIG. 1.

FIG. 2 is a schematic view showing a configuration example of a hydraulic circuit mounted on the shovel in FIG. 1. In the present embodiment, the hydraulic circuit mainly includes a first pump 14L, a second pump 14R, a pump/motor 14A, a control valve 17, and hydraulic actuators. The hydraulic actuators mainly include the boom cylinder 7, the arm cylinder 8, the bucket cylinder 9, a hydraulic swing motor 21, and an accumulator 80.

The boom cylinder 7 is a hydraulic cylinder that lifts or lowers the boom 4. A regeneration valve 7*a* is connected between a bottom side hydraulic chamber and a rod side hydraulic chamber. A holding valve 7*b* is located at the side of the bottom side hydraulic chamber. The arm cylinder 8 is a hydraulic cylinder that opens or closes the arm 5. A regeneration valve 8*a* is connected between a bottom side hydraulic chamber and a rod side hydraulic chamber. A holding valve 8*b* is located at the side of the rod side hydraulic chamber. The bucket cylinder 9 is a hydraulic cylinder that opens or closes the bucket 6. A regeneration valve 9*a* is connected between a bottom side hydraulic chamber and a rod side hydraulic chamber.

The hydraulic swing motor 21 is a hydraulic motor that swings the upper swing body 3. Respective Ports 21L, 21R are connected to a hydraulic oil tank T via relief valves 22L, 22R, connected to a regeneration valve 22G via a shuttle valve 22S, and connected to the hydraulic oil tank T via check valves 23L, 23R.

The relief valve 22L opens when pressure at the side of the port 21L reaches a predetermined relief pressure, and releases the hydraulic oil at the side of the port 21L to the hydraulic oil tank T. Also, the relief valve 22R opens when pressure at the side of the port 21R reaches a predetermined relief pressure, and releases the hydraulic oil at the side of the port 21R to the hydraulic oil tank T.

The shuttle valve 22S supplies hydraulic oil at the side of the port 21L or hydraulic oil at the side of the port 21R, whichever is higher in pressure, to the regeneration valve 22G.

The regeneration valve 22G operates in response to a command from the controller 30. It switches open/close of a communication of a regeneration oil path from the hydraulic swing motor (the shuttle valve 22S) to the pump/motor 14A or to the accumulator 80. In the present embodiment, the regeneration valve 22G is an open/close valve whose opening area is adjustable. The controller 30 may control pressure of the hydraulic oil flowing out of the hydraulic swing motor 21 by adjusting the opening area of the regeneration valve 22G to adjust a flowing path area of the regeneration oil path, in order to adjust braking torque for stopping the swing of the upper swing body 3.

The check valve 23L opens when pressure at the side of the port 21L becomes negative, and supplies hydraulic oil from the hydraulic oil tank T to the side of the port 21L. The check valve 23R opens when pressure at the side of the port 21R becomes negative, and supplies hydraulic oil from the hydraulic oil tank T to the side of the port 21R. In this way, the check valves 23L, 23R constitute a replenishing mechanism that supplies hydraulic oil to a suction side port during braking of the hydraulic swing motor 21.

The first pump 14L is a hydraulic pump that sucks hydraulic oil from the hydraulic oil tank T and discharges the hydraulic oil. In the present embodiment, the first pump 14L is a swash plate type variable displacement hydraulic pump. The first pump 14L is connected to a regulator. The regulator controls a discharge rate of the first pump 14L by changing a swash plate tilting angle in response to a command from the controller 30. The same goes for the second pump 14R.

A relief valve **14*a*L is located at a discharge side of the first pump 14L. The relief valve 14*a*L opens when pressure at the discharge side of the first pump 14L reaches a predetermined relief pressure, and releases the hydraulic oil at the discharge side to the hydraulic oil tank T. The same goes for a relief valve 14*a*R located at a discharge side of the second pump 14**R.

The pump/motor 14A is a hydraulic device serving as a hydraulic pump (a third pump) and a hydraulic motor. In the present embodiment, the pump/motor 14A is a swash plate type variable displacement hydraulic pump/motor. The pump/motor 14A is connected to a regulator in the same way as the first pump 14L and the second pump 14R. The regulator controls a discharge rate of the pump/motor 14A by changing a swash plate tilting angle of the pump/motor 14A in response to a command from the controller 30. It should be noted that the pump/motor 14A may be a fixed displacement hydraulic pump/motor. The pump/motor 14A may be connected to the engine 11 via a clutch mechanism so that it is possible for the pump/motor 14A to run idle if necessary when serving as a hydraulic motor.

A relief valve **70*a* is located at the discharge side of the pump/motor 14A. The relief valve 70*a* opens when pressure at the discharge side of the pump/motor 14**A reaches a predetermined relief pressure, and releases the hydraulic oil at the discharge side to the hydraulic oil tank T.

In the present embodiment, respective drive shafts of the first pump 14L, the second pump 14R, and the pump/motor 14A are mechanically coupled. Specifically, the respective drive shafts are coupled to an output shaft of the engine 11 via a gearbox 13 at a predetermined transmission gear ratio. Thus, as long as an engine rotation speed is constant, respective rotation speeds are constant as well. However, the first pump 14L, the second pump 14R, and the pump/motor 14A may be connected to the engine 11 via a non-stage transmission or the like so as to change their rotation speeds even if the engine rotation speed is constant.

The control valve 17 is a hydraulic control device that controls a hydraulic drive system on a shovel. The control valve 17 mainly includes variable load check valves 51-53, a confluence valve 55, unified bleed-off valves 56L, 56R, selector valves 60-63, and flow rate control valves 170-173.

The flow rate control valves 170-173 control flow direction and flow rate of hydraulic oil flowing into and out of the hydraulic actuators. In the present embodiment, each of the flow rate control valves 170-173 is a 4-port 3-position spool valve that operates by receiving a pilot pressure generated by a corresponding operating device (not shown) such as an operating lever at either a left side pilot port or a right side pilot port. The operating device applies the pilot pressure generated depending on an amount of operation (an angle of operation) onto a pilot port at a side corresponding to a direction of operation.

Specifically, the flow rate control valve 170 is a spool valve that controls flow direction and flow rate of hydraulic oil flowing into and out of the hydraulic swing motor 21. The flow rate control valve 171 is a spool valve that controls flow direction and flow rate of hydraulic oil flowing into and out of the arm cylinder 8.

The flow rate control valve 172 is a spool valve that controls flow direction and flow rate of hydraulic oil flowing into and out of the boom cylinder 7. The flow rate control valve 173 is a spool valve that controls flow direction and flow rate of hydraulic oil flowing into and out of the bucket cylinder 9.

The variable load check valves 51-53 operate in response to a command from the controller 30. In the present embodiment, each of the variable load check valves 51-53 is a 2-port 2-position electromagnetic valve that can switch open/close of a communication between each of the flow rate control valves 170-173 and at least either of the first pump 14L and the second pump 14R. At a first position, the variable load check valves 51-53 have a check valve that blocks a flow of hydraulic oil returning to the pumps. Specifically, the variable load check valve 51 opens a communication between the flow rate control valve 171 and at least either of the first pump 14L and the second pump 14R when it is at the first position, and closes the communication when it is at a second position. The same goes for the variable load check valve 52 and the variable load check valve 53.

The confluence valve 55 is an example of a confluence switching part, and operates in response to a command from the controller 30. In the present embodiment, the confluence valve 55 is a 2-port 2-position electromagnetic valve that can switch whether or not to merge hydraulic oil discharged from the first pump 14L (hereinafter referred to as "first hydraulic oil") and hydraulic oil discharged from the second pump 14R (hereinafter referred to as "second hydraulic oil"). Specifically, the confluence valve 55 merges the first hydraulic oil and the second hydraulic oil when it is at a first position, and does not merge the first hydraulic oil and the second hydraulic oil when it is at a second position.

The unified bleed-off valves 56L, 56R operate in response to a command from the controller 30. In the present embodiment, the unified bleed-off valve 56L is a 2-port 2-position electromagnetic valve that can control outflow rate of the first hydraulic oil to the hydraulic oil tank T. The same goes for the unified bleed-off valve 56R. Due to this configuration, the unified bleed-off valves 56L, 56R can reproduce a synthetic opening of related flow rate control valves out of the flow rate control valves 170-173. Specifically, when the confluence valve 55 is at the second position, the unified bleed-off valve 56L can reproduce a synthetic opening of the flow rate control valve 170 and the flow rate control valve 171, and the unified bleed-off valve 56R can reproduce a synthetic opening of the flow rate control valve 172 and the flow rate control valve 173.

The selector valves 60-63 operate in response to a command from the controller 30. In the present embodiment, the selector valves 60-63 are 3-port 2-position electromagnetic valves that can switch whether or not to supply hydraulic oil flowing out of respective hydraulic actuators to upstream side (supply side) of the pump/motor 14A. Specifically, the selector valve 60 supplies the hydraulic oil flowing out of the hydraulic swing motor 21 to the supply side of the pump/motor 14A via the regeneration valve 22G when it is at a first position, and supplies the hydraulic oil flowing out of the hydraulic swing motor 21 to the accumulator 80 via the regeneration valve 22G when it is at a second position. The selector valve 61 supplies the hydraulic oil flowing out of the arm cylinder 8 to the hydraulic oil tank T when it is at a first position, and supplies the hydraulic oil flowing out of the arm cylinder 8 to the supply side of the pump/motor 14A when it is at a second position. The same goes for the selector valve 62 and the selector valve 63.

The accumulator 80 is a hydraulic device that accumulates pressurized hydraulic oil. In the present embodiment, the accumulator 80 uses nitrogen gas, and accumulation/release of hydraulic oil in/from the accumulator 80 is controlled by a selector valve 81 and a selector valve 82.

The selector valve 81 operates in response to a command from the controller 30. In the present embodiment, the selector valve 81 is a 2-port 2-position electromagnetic valve that can switch open/close of a communication between the first pump 14L that is a supply source of pressurized hydraulic oil and the accumulator 80. Specifically, the selector valve 81 opens the communication between the first pump 14L and the accumulator 80 when it is at a first position, and closes the communication when it is at a second position. At the first position, the selector valve 81 has a check valve that blocks a flow of hydraulic oil returning to the first pump 14L.

The selector valve 82 operates in response to a command from the controller 30. In the present embodiment, the selector valve 82 is a 2-port 2-position electromagnetic valve that can switch open/close of a communication between the supply side of the pump/motor 14A that is a supply destination of pressurized hydraulic oil and the accumulator 80. Specifically, the selector valve 82 opens the communication between the pump/motor 14A and the accumulator 80 when it is at a first position, and closes the communication when it is at a second position. At the first position, the selector valve 82 has a check valve that blocks a flow of hydraulic oil returning to the accumulator 80.

A selector valve 90 operates in response to a command from the controller 30. In the present embodiment, the selector valve 90 is a 3-port 2-position electromagnetic valve that can switch a supply destination of the hydraulic oil discharged from the pump/motor 14A (hereinafter referred to as "third hydraulic oil"). Specifically, the selector valve 90 supplies the third hydraulic oil to a selector valve 91 when it is at a first position, and supplies the third hydraulic oil to the hydraulic oil tank T when it is at a second position.

The selector valve 91 operates in response to a command from the controller 30. In the present embodiment, the selector valve 91 is a 4-port 3-position electromagnetic valve that can switch a supply destination of the third hydraulic oil. Specifically, the selector valve 91 supplies the third hydraulic oil to the arm cylinder 8 when it is at a first position, supplies the third hydraulic oil to the hydraulic swing motor 21 when it is at a second position, and supplies the third hydraulic oil to the accumulator 80 when it is at a third position.

Figure 3:
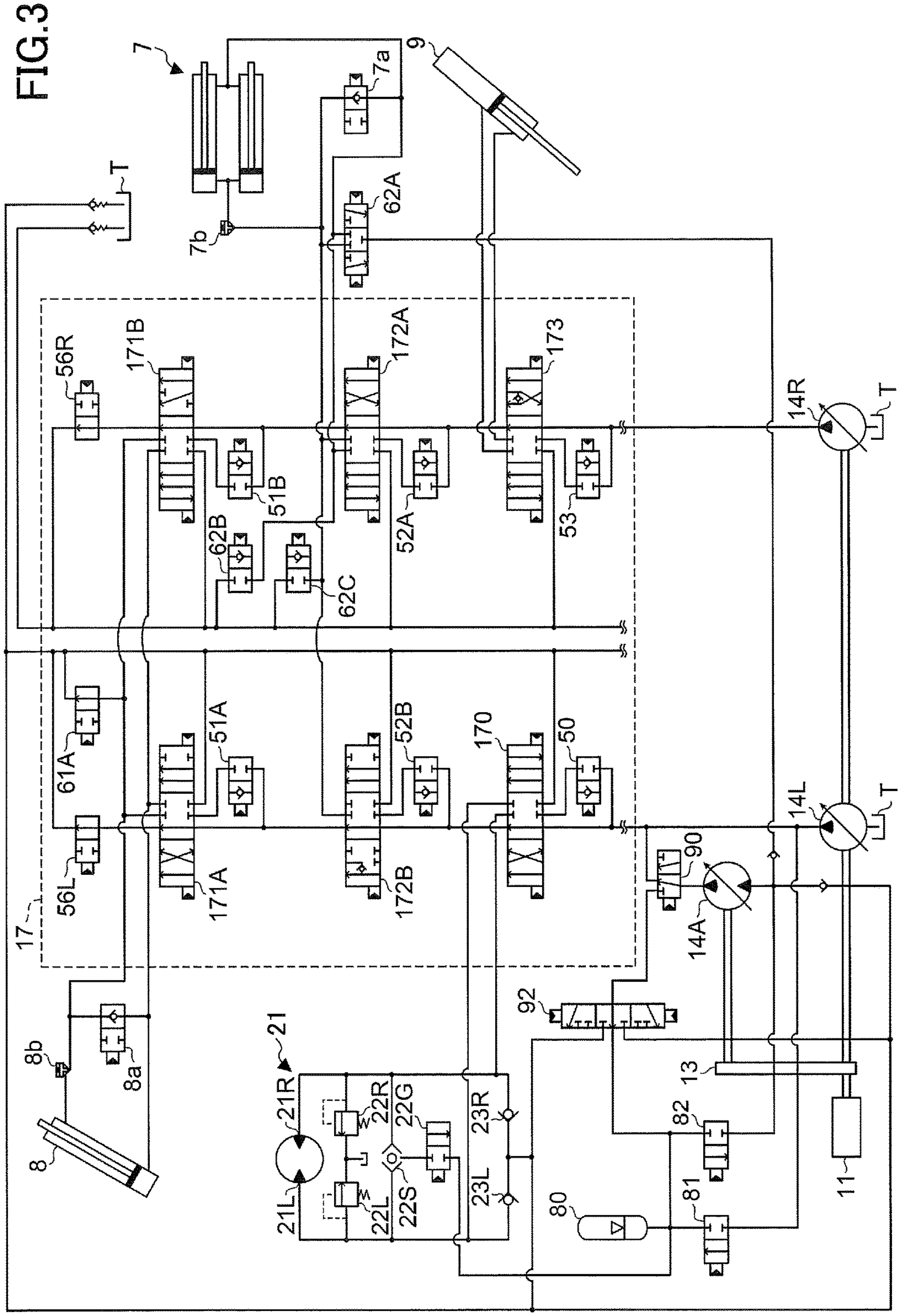
FIG. 3 is schematic view showing another configuration example of a hydraulic circuit mounted on the shovel in FIG. 1.

Next, referring to FIG. 3, another configuration example of a hydraulic circuit is described. FIG. 3 is a schematic view showing another configuration example of a hydraulic circuit mounted on the shovel in FIG. 1. The hydraulic circuit in FIG. 3 is different from the hydraulic circuit in FIG. 2 mainly in that a flow direction and a flow rate of the hydraulic oil flowing into and out of the arm cylinder 8 are controlled by two flow rate control valves 171A, 171B, in that a flow rate of the hydraulic oil flowing into and out of the bottom side hydraulic chamber of the boom cylinder 7 is controlled by two flow rate control valves 172A, 172B, in that a confluence switching part is comprised of not a confluence valve but a variable load check valve (in that a confluence valve is omitted), and in that the hydraulic oil returning from the boom cylinder 7 can be accumulated in the accumulator 80. The other points are in common with the hydraulic circuit in FIG. 2. Thus, the differences are explained in detail while omitting an explanation of the common points.

The flow rate control valves 171A, 172B control a flow direction and a flow rate of the hydraulic oil flowing into and out of the arm cylinder 8, and correspond to the flow rate control valve 171 in FIG. 2. Specifically, the flow rate control valve 171A supplies the first hydraulic oil to the arm cylinder 8, and the flow rate control valve 172B supplies the second hydraulic oil to the arm cylinder 8. Thus, the first hydraulic oil and the second hydraulic oil can simultaneously flow into the arm cylinder 8.

The flow rate control valve 172A controls a flow direction and a flow rate of the hydraulic oil flowing into and out of the boom cylinder 7, and corresponds to the flow rate control valve 172 in FIG. 2.

The flow rate control valve 172B supplies the first hydraulic oil to the bottom side hydraulic chamber of the boom cylinder 7 when a boom lifting operation is carried out. When a boom lowering operation is carried out, it can merge the hydraulic oil flowing out of the bottom side hydraulic chamber of the boom cylinder 7 into the first hydraulic oil.

The flow rate control valve 173 controls a flow direction and a flow rate of the hydraulic oil flowing into and out of the bucket cylinder 9, and corresponds to the flow rate control valve 173 in FIG. 2. The flow rate control valve 173 in FIG. 3 includes a check valve within it in order to regenerate the hydraulic oil flowing out of the rod side hydraulic chamber of the bucket cylinder 9 to the bottom side hydraulic chamber.

Variable load check valves 50, 51A, 51B, 52A, 52B, and 53 are 2-port 2-position valve that can switch open/close a communication between each of the flow rate control valves 170, 171A, 171B, 172A, 172B, and 173 and at least either of the first pump 14L and the second pump 14R. These six variable load check valves operate in conjunction with one another and act as the confluence switching part, and thus can realize a function of the confluence valve 55 in FIG. 2. Therefore, in the hydraulic circuit in FIG. 3, the confluence valve 55 in FIG. 2 is omitted. Due to the same reason, the selector valve 91 in FIG. 2 is omitted.

Unified bleed-off valves 56L, 56R are 2-port 2-position valve that can control outflow rate of the first hydraulic oil to the hydraulic oil tank T, and correspond to the unified bleed-off valves 56L, 56R in FIG. 2.

Any of the six flow rate control valves in FIG. 3 is a 6-port 3-position spool valve, and, different from the flow rate control valves in FIG. 2, it has a center bypass port. Thus, in FIG. 3, the unified bleed-off valve 56L is located downstream of the flow rate control valve 171A, and the unified bleed-off valve 56R is located downstream of the flow rate control valve 171B.

A selector valve 61A is a 2-port 2-position valve that can switch whether or not to supply the hydraulic oil flowing out of the rod side hydraulic chamber of the arm cylinder 8 to upstream side (supply side) of the pump/motor 14A. Specifically, the selector valve 61A opens a communication between the rod side hydraulic chamber of the arm cylinder 8 and the pump/motor 14A when it is at a first position, and closes the communication when it is at a second position.

A selector valve 62A is a 3-port 3-position valve that can switch whether or not to supply the hydraulic oil flowing out of the boom cylinder 7 to upstream side (supply side) of the pump/motor 14A. Specifically, the selector valve 62A opens a communication between the bottom side hydraulic chamber of the boom cylinder 7 and the pump/motor 14A when it is at a first position, opens a communication between the rod side hydraulic chamber of the boom cylinder 7 and the pump/motor 14A when it is at a second position, and closes the communications when it is at a third position (a neutral position).

A selector valve 62B is a 2-port 2-position variable relief valve that can switch whether or not to release the hydraulic oil flowing out of the rod side hydraulic chamber of the boom cylinder 7 to the hydraulic oil tank. T. Specifically, the selector valve 62B opens a communication between the rod side hydraulic chamber of the boom cylinder 7 and the hydraulic oil tank T when it is at a first position, and closes the communication when it is at a second position. In the first position, the selector valve 62B has a check valve that blocks a flow of the hydraulic oil from the hydraulic oil tank T.

A selector valve 62C is a 2-port 2-position variable relief valve that can switch whether or not to release the hydraulic oil flowing out of the bottom side hydraulic chamber of the boom cylinder 7 to the hydraulic oil tank T. Specifically, the selector valve 62C opens a communication between the bottom side hydraulic chamber of the boom cylinder 7 and the hydraulic oil tank T when it is at a first position, and closes the communication when it is at a second position. In the first position, the selector valve 62C has a check valve that blocks a flow of the hydraulic oil from the hydraulic oil tank T.

A selector valve 90 is a 3-port 2-position electromagnetic valve that can switch a supply destination of the third hydraulic oil discharged from the pump/motor 14A, and corresponds to the selector valve 90 in FIG. 2. Specifically, the selector valve 90 supplies the third hydraulic oil toward the control valve 17 when it is at a first position, and supplies the third hydraulic oil toward the selector valve 92 when it is at a second position.

A selector valve 92 is a 4-port 3-position electromagnetic valve that can switch a supply destination of the third hydraulic oil. Specifically, the selector valve 92 supplies the third hydraulic oil toward a replenishing mechanism of the hydraulic swing motor 21 when it is at a first position, supplies the third hydraulic oil toward the accumulator 80 when it is at a second position, and supplies the third hydraulic oil toward the hydraulic oil tank T when it is at a third position.

[Excavating Movement]

Figure 4:
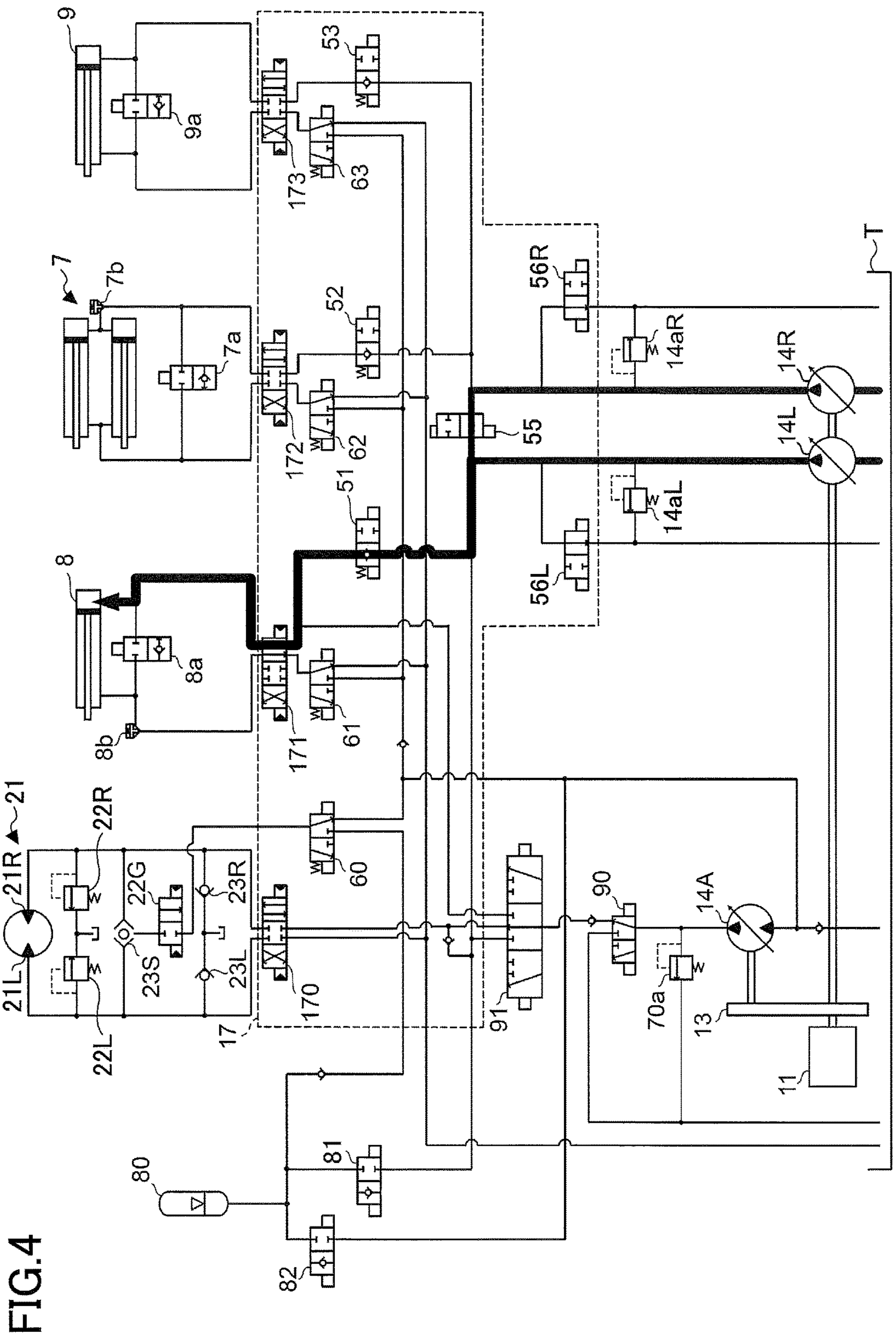
FIG. 4 shows a state of the hydraulic circuit in FIG. 2 when an excavating movement is carried out.
Figure 5:
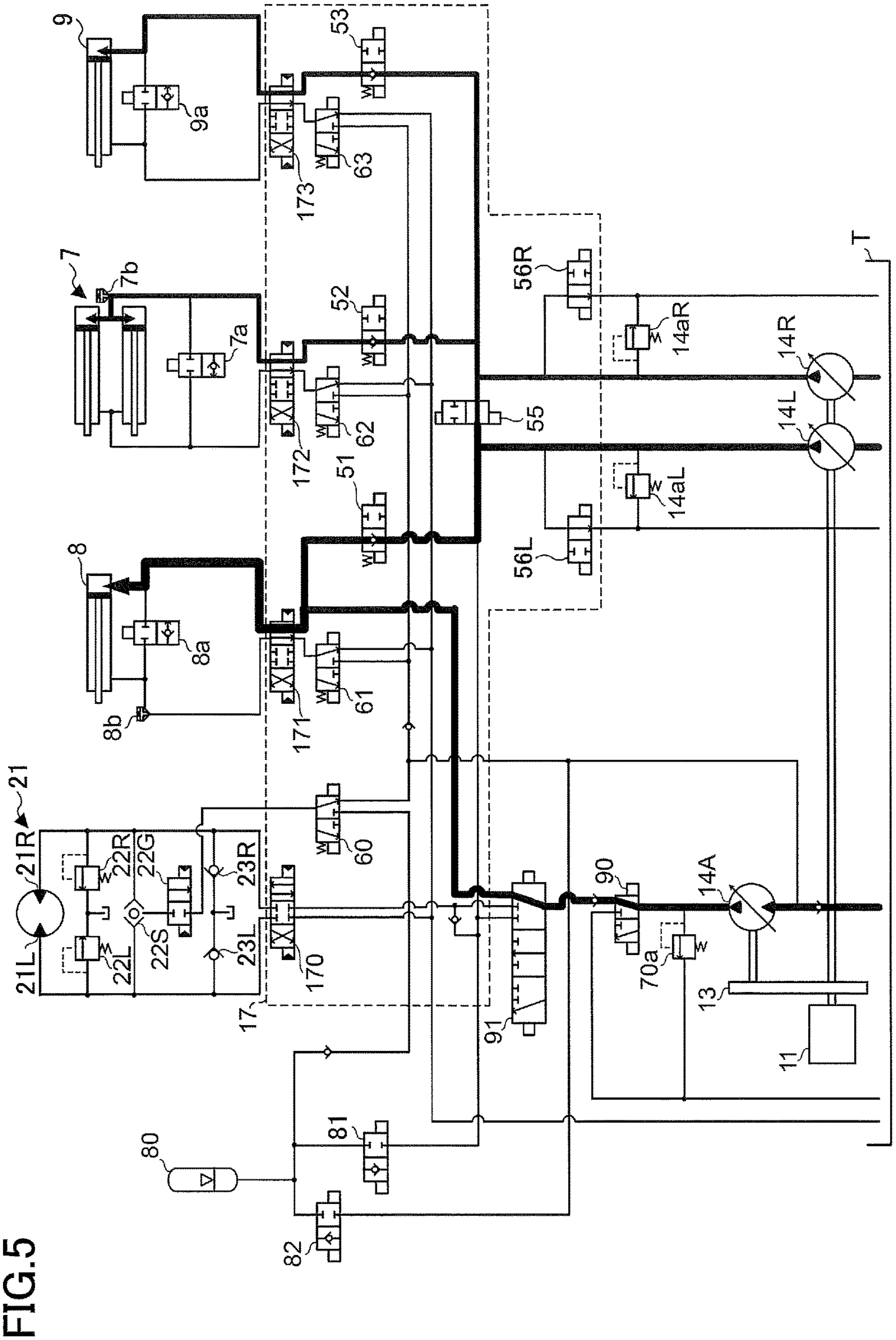
FIG. 5 shows a state of the hydraulic circuit in FIG. 2 when an excavating movement is carried out.
Figure 6:
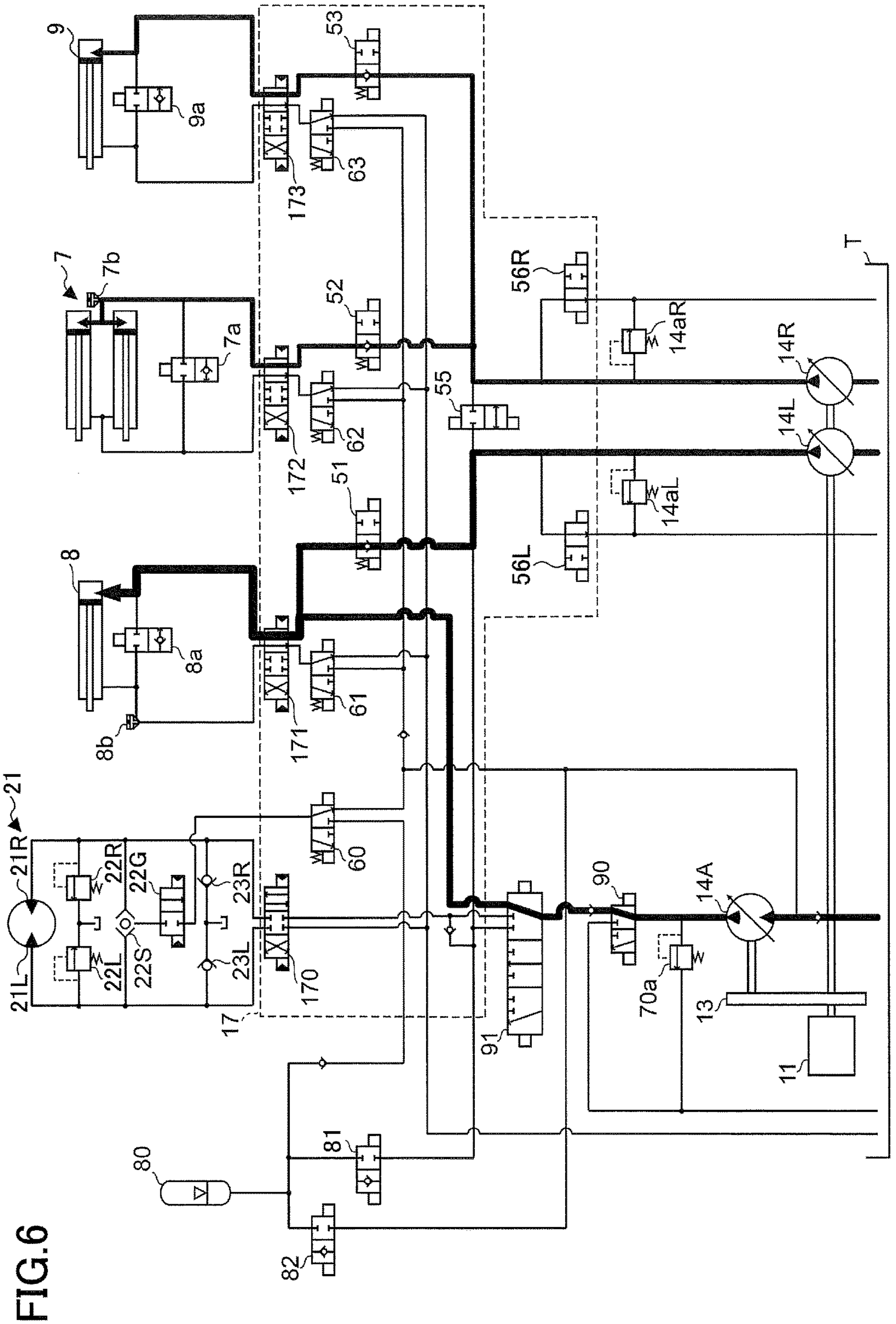
FIG. 6 shows a state of the hydraulic circuit in FIG. 2 when an excavating movement is carried out.

Next, referring to FIGS. 4-6, states of the hydraulic circuit in FIG. 2 when an excavating movement is carried out are explained. FIGS. 4-6 show states of the hydraulic circuit in FIG. 2 when an excavating movement is carried out. Black thick solid lines in FIGS. 4-6 depict flows of the hydraulic oil flowing into the hydraulic actuators. A width of the solid line increases with increase in flow rate.

The controller 30 determines a content of operation of the shovel by an operator based on an output of an operation detecting part such as an operating pressure sensor (not shown) that detects a pilot pressure generated by the operating device. The controller 30 also determines an operating state of the shovel based on an output of a load detecting part such as a discharge pressure sensor (not shown) that detects respective discharge pressures of the first pump 14L, the second pump 14R, and the pump/motor 14A, and a load pressure sensor (not shown) that detects respective pressures of the hydraulic actuators. In the present embodiment, the load pressure sensor includes cylinder pressure sensors that detect respective pressures of the bottom side hydraulic chamber and the rod side hydraulic chamber of each of the boom cylinder 7, the arm cylinder 8, and the bucket cylinder 9. The controller 30 also detects a pressure of the hydraulic oil accumulated in the accumulator 80 (hereinafter referred to as “accumulator pressure”) based on an output of an accumulator pressure sensor (not shown).

Then, when the controller 30 determines that the arm 5 has been operated, as shown in FIG. 4, the controller 30 moves the confluence valve 55 at the second position toward the first position depending on an amount of operation of an arm operating lever. As a result, the first hydraulic oil and the second hydraulic oil are merged and supplied to the flow rate control valve 171. The flow rate control valve 171 shifts to its right position in FIG. 4 in response to a pilot pressure generated depending on an amount of operation of the arm operating lever, and causes the first hydraulic oil and the second hydraulic oil to flow into the arm cylinder 8.

When the controller 30 determines that the boom 4 and the bucket 6 have been operated, the controller 30 determines which an excavating movement or a floor drilling movement has been carried out based on an output of the load pressure sensor. The floor drilling movement is, for example, a movement to smooth a land surface by the bucket 6. During the floor drilling movement, a pressure in the bottom side hydraulic chamber of the arm cylinder 8 is lower than that during the excavating movement.

When the controller 30 determines that an excavating movement has been carried out, the controller 30 decides a discharge rate command value for the second pump 14R corresponding to an amount of operation of a boom operating lever and an amount of operation of a bucket operating lever, based on a pump discharge rate control such as a negative control, a positive control, a load sensing control, a horsepower control, or the like. Then, the controller 30 controls a corresponding regulator so that a discharge rate of the second pump 14R can meet the command value.

Also, by using the above pump discharge rate control, the controller 30 computes a flow rate difference between the discharge rate command value and a calculated discharge rate in consideration of an amount of operation of the arm operating lever as well as an amount of operation of a boom operating lever and an amount of operation of a bucket operating lever. Then, the controller 30 causes the pump/motor 14A to discharge hydraulic oil corresponding to the flow rate difference. This calculated discharge rate becomes the maximum discharge rate of the second pump 14R when the arm 5 is being operated at full lever as in the excavating movement. The full lever represents an amount of operation greater than or equal to 80%, for example, under the assumption that a neutral state of a lever correspond to 0% and the maximally operated state corresponds to 100%. Specifically, as shown in FIG. 5, the controller 30 actuates the pump/motor 14A as a hydraulic pump and controls a corresponding regulator so that a discharge rate of the pump/motor 14A becomes a flow rate corresponding to the flow rate difference. Then, the controller 30 switches the selector valve 90 to the first position and directs the third hydraulic oil toward the selector valve 91, and switches the selector valve 91 to the first position and directs the third hydraulic oil toward the arm cylinder 8.

The controller 30 also controls an opening area of the confluence valve 55 based on the above flow rate difference, a discharge pressure of the first pump 14L, a discharge pressure of the second pump 14R, and the like. In the examples of FIG. 4-6, the controller 30 determines the opening area of the confluence valve 55 by reference to a predefined opening map, and outputs a command corresponding to the opening area to the confluence valve 55. The controller 30 may determine the opening area of the confluence valve 55 by using a predetermined function instead of the opening map.

For example, when a flow rate of the third hydraulic oil discharged from the pump/motor 14A reaches a flow rate corresponding to the above flow rate difference, as shown in FIG. 6, the controller 30 switches the confluence valve 55 to the second position and stops merging of the first hydraulic oil and the second hydraulic oil.

Also, when the controller 30 determines that a floor drilling movement has been carried out, as shown in FIG. 6, the controller 30 closes the confluence valve 55 as soon as possible, as long as a movement of the shovel does not become unstable. This is to enhance operability of the boom 4 and the bucket 6 by causing only the second hydraulic oil to flow into the boom cylinder 7 and the bucket cylinder 9.

In the examples of FIGS. 4-6, the maximum discharge rate of the pump/motor 14A is less than the maximum discharge rate of the second pump 14R. Thus, when the above flow rate difference is greater than the maximum discharge rate of the pump/motor 14A, the controller 30 actuates the first pump 14L and the pump/motor 14A acting as a hydraulic pump at their maximum discharge rate, and then increases a discharge rate of the second pump 14R so that a difference between the maximum discharge rate of the second pump 14R and an actual increased discharge rate of the second pump 14R becomes lower than or equal to the maximum discharge rate of the pump/motor 14A. This is to prevent an actuating speed of the arm 5 from being less than the actuating speed of the arm 5 when using the first hydraulic oil and the second hydraulic oil.

However, when the maximum discharge rate of the pump/motor 14A is greater than or equal to the maximum discharge rate of the second pump 14R, as shown in FIG. 6, the controller 30 can maintain the confluence valve 55 in a closed state (the second position) during the excavating movement. This is because the actuating speed of the arm 5 when using the first hydraulic oil and the third hydraulic oil does not become lower than the actuating speed of the arm 5 when using the first hydraulic oil and the second hydraulic oil. In this case, whenever during the excavating movement, the controller 30 causes only the first hydraulic oil and the third hydraulic oil to flow into the arm cylinder 8, and causes only the second hydraulic oil to flow into the boom cylinder 7 and the bucket cylinder 9. As a result, it can completely separate the hydraulic oil for actuating the arm 5 from the hydraulic oil for actuating the boom 4 and the bucket 6, and can enhance the operability of each of them.

Figure 7:
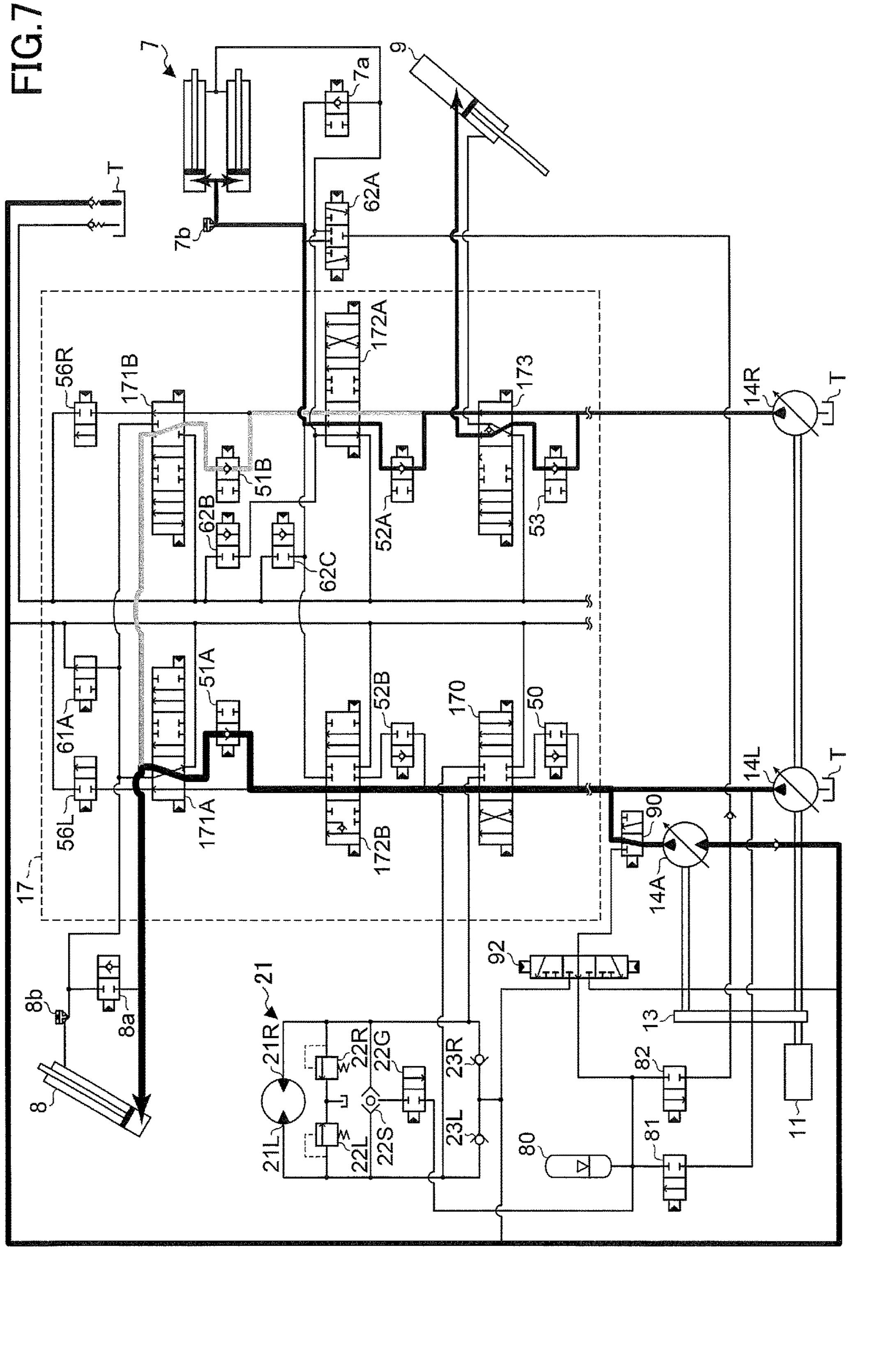
FIG. 7 shows a state of the hydraulic circuit in FIG. 3 when an excavating movement is carried out.

Next, referring to FIG. 7, a state of the hydraulic circuit in FIG. 3 when an excavating movement is carried out is explained. FIG. 7 shows a state of the hydraulic circuit in FIG. 3 when an excavating movement is carried out. Black thick solid lines and gray thick solid lines in FIG. 7 depict flows of the hydraulic oil flowing into the hydraulic actuators. A width of the solid line increases with increase in flow rate. The gray thick solid lines in FIG. 7 additionally depict that flows of the hydraulic oil may decrease or disappear.

As in the case of the hydraulic circuit in FIG. 2, the controller 30 determines a content of operation of the shovel by an operator based on an output of an operation detecting part, and determines an operating state of the shovel based on an output of a load detecting part.

When the arm 5 is operated, the flow rate control valve 171A shifts to its left position in FIG. 7 in response to a pilot pressure generated depending on an amount of operation of the arm operating lever, and the flow rate control valve 171B shifts to its right position in FIG. 7 in response to a pilot pressure generated depending on an amount of operation of the arm operating lever.

Then, when the controller 30 determines that the arm 5 has been operated, the controller 30 switches the variable load check valve 51A to the first position so that the first hydraulic oil reaches the flow rate control valve 171A through the variable load check valve 51A. The controller 30 also switches the variable load check valve 51B to the first position so that the second hydraulic oil reaches the flow rate control valve 171B through the variable load check valve 51B. The first hydraulic oil passing through the flow rate control valve 171A merges with the second hydraulic oil passing through the flow rate control valve 171B, and flows into the bottom side hydraulic chamber of the arm cylinder 8.

Then, when the controller 30 determines that the boom 4 and the bucket 6 have been operated, the controller 30 determines which an excavating movement or a floor drilling movement has been carried out based on an output of the load pressure sensor. Then, when the controller 30 determines that an excavating movement has been carried out, the controller 30 determines a discharge rate command value of the second pump 14R corresponding to an amount of operation of the boom operating lever and an amount of operation of the bucket operating lever. Then, the controller 30 controls a corresponding regulator so that a discharge rate of the second pump 14R can meet the command value.

In this case, the flow rate control valve 172A shifts to its left position in FIG. 7 in response to a pilot pressure generated depending on an amount of operation of the boom operating lever. The flow rate control valve 173 shifts to its right position in FIG. 7 in response to a pilot pressure generated depending on an amount of operation of the bucket operating lever. Then, the controller 30 switches the variable load check valve 52A to the first position so that the second hydraulic oil reaches the flow rate control valve 172A through the variable load check valve 52A. Similarly, the controller 30 switches the variable load check valve 53 to the first position so that the second hydraulic oil reaches the flow rate control valve 173 through the variable load check valve 53. Then, the second hydraulic oil passing through the flow rate control valve 172A flows into the bottom side hydraulic chamber of the boom cylinder 7, and the second hydraulic oil passing through the flow rate control valve 173 flows into the bottom side hydraulic chamber of the bucket cylinder 9.

The controller 30 computes a flow rate difference between the maximum discharge rate of the second pump 14R and the discharge rate command value, and causes the pump/motor 14A to discharge hydraulic oil corresponding to the flow rate difference. Specifically, as shown in FIG. 7, the controller 30 actuates the pump/motor 14A as a hydraulic pump, and controls a corresponding regulator so that a discharge rate of the pump/motor 14A becomes a discharge rate corresponding to the discharge rate difference. Then, the controller 30 switches the selector valve 90 to the first position and directs the third hydraulic oil toward the control valve 17.

The controller 30 also controls an opening area of the variable load check valve 51B based on the above flow rate difference, a discharge pressure of the first pump 14L, a discharge pressure of the second pump 14R, and the like. In the example of FIG. 7, the controller 30 determines an opening area of the variable load check valve 51B in reference to a predefined opening map, and outputs a command corresponding to the opening area to the variable load check valve 51B. As a result, the second hydraulic oil flowing into the bottom side hydraulic chamber of the arm cylinder 8 decreases or disappears. The gray thick solid lines in FIG. 7 depict that the second hydraulic oil flowing into the bottom side hydraulic chamber of the arm cylinder 8 decreases or disappears with increase in a flow rate of the third hydraulic oil discharged from the pump/motor 14A.

As described above, the controller 30 actuates the pump/motor 14A as a hydraulic pump when an excavating movement including a boom lifting, an arm closing, and a bucket closing has been carried out. Then, the controller 30 causes the third hydraulic oil discharged from the pump/motor 14A to flow into a hydraulic actuator (the arm cylinder 8) having high load pressure. When the controller 30 can actuate the hydraulic actuator having high load pressure at a desired speed by using the first hydraulic oil and the third hydraulic oil, the controller 30 stops merging of the first hydraulic oil and the second hydraulic oil by closing the confluence valve 55 (or by controlling the confluence switching part). As a result, the shovel according to an embodiment of the present invention can actuate a hydraulic actuator (the arm cylinder 8) having high load pressure by using the first hydraulic oil, and can actuate a hydraulic actuator (the boom cylinder 7 and the bucket cylinder 9) having low load pressure by using the second hydraulic oil whose pressure is lower than that of the first hydraulic oil. Specifically, there is no need to actuate the hydraulic actuator having low load pressure by using the second hydraulic oil that is pressurized to the same pressure as the first hydraulic oil for merging with the first hydraulic oil. That is, there is no need to constrict a flow rate of the second hydraulic oil by an aperture in order to actuate the hydraulic actuator having low load pressure at a desired speed by using the pressurized second hydraulic oil. As a result, the shovel can reduce or prevent generation of pressure loss at the aperture, and can reduce or prevent energy loss.

The controller 30 may increase a discharge rate of the first pump 14L by individual flow control, instead of causing the pump/motor 14A to discharge the third hydraulic oil. Specifically, after closing the confluence valve 55 (or after controlling the confluence switching part) and stopping merging of the first hydraulic oil and the second hydraulic oil, the controller 30 may increase the maximum discharge rate of the first pump 14L (the maximum swash plate tilting angle) by a decreased amount of the discharge rate of the second pump 14R.

[Excavating Movement Along with an Engine-assist by a Back-pressure Regeneration]

Figure 8:
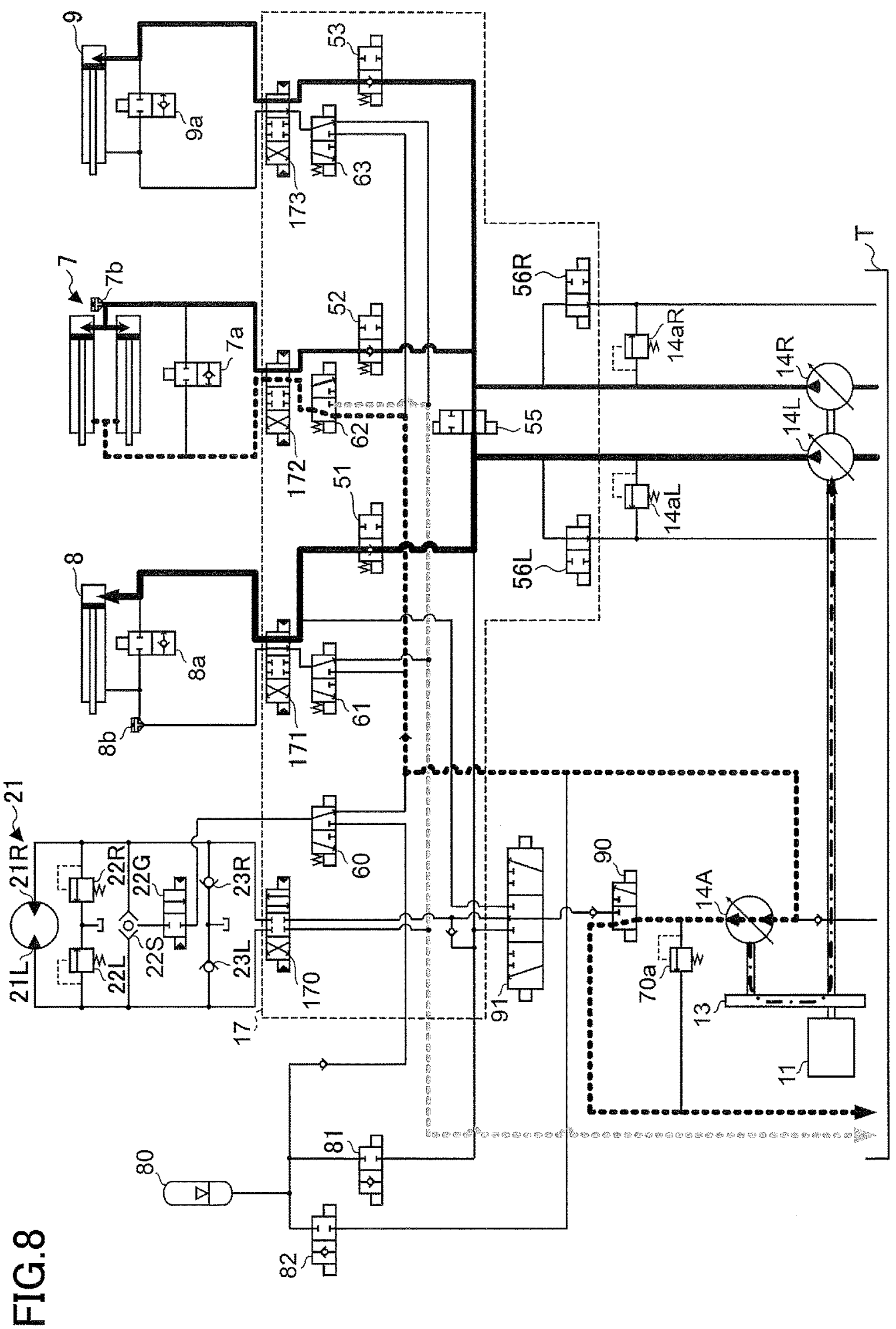
FIG. 8 shows a state of the hydraulic circuit in FIG. 2 when an excavating movement is carried out along with an engine-assist by a back-pressure regeneration.

Next, referring to FIG. 8, a state of the hydraulic circuit in FIG. 2 when an excavating movement is carried out along with an assist of the engine 11 by a back-pressure regeneration is explained. FIG. 8 shows a state of the hydraulic circuit in FIG. 2 when an excavating movement is carried out along with an assist of the engine 11 by a back-pressure regeneration. Black thick solid lines in FIG. 8 depict flows of the hydraulic oil flowing into the hydraulic actuators. A width of the solid line increases with increase in flow rate. Black thick dotted lines and gray thick dotted lines in FIG. 8 depict flows of the hydraulic oil flowing out of the hydraulic actuators.

A back-pressure regeneration is a procedure carried out when a plurality of the hydraulic actuators are simultaneously actuated and when respective load pressure of the plurality of hydraulic actuators differ. For example, when a combined excavating movement by the boom lifting operation and the arm closing operation is carried out, a load pressure of the arm cylinder 8 (a pressure in the bottom side hydraulic chamber of the arm cylinder 8) becomes higher than a load pressure of the boom cylinder 7 (a pressure in the bottom side hydraulic chamber of the boom cylinder 7). This is because, the bucket 6 is in contact with the ground during excavation, and respective weights of the boom 4, arm 5, and bucket 6 are supported by the ground. This is also because the boom 4 bears an excavation reaction force related to an excavating movement (closing movement) of the arm 5.

Thus, when the combined excavating movement is carried out, the controller 30 increases a system pressure of the hydraulic circuit (discharge pressures of the first pump 14L and the second pump 14R) to deal with a relatively high load pressure of the arm cylinder 8. At the same time, the controller 30 controls a flow rate of the hydraulic oil flowing into the bottom side hydraulic chamber of the boom cylinder 7 in order to control an actuating speed of the boom cylinder 7 actuated by a load pressure lower than the system pressure. In this case, it results in pressure loss (energy loss) if the controller 30 controls the flow rate by an aperture of the flow rate control valve 172. Therefore, the controller 30 realizes a control of the actuating speed of the boom cylinder 7 while preventing pressure loss at the flow rate control valve 172 by increasing a pressure (a back-pressure) in the rod side hydraulic chamber of the boom cylinder 7. At the same time, the controller 30 supplies the hydraulic oil flowing out of the rod side hydraulic chamber of the boom cylinder 7 to the pump/motor 14A and actuates the pump/motor 14A as a hydraulic (regenerative) motor in order to increase a pressure (a back-pressure) in the rod side hydraulic chamber of the boom cylinder 7. When the controller 30 executes this back-pressure regeneration, the controller 30 causes the flow rate control valve 172 to shift largely to its right position in FIG. 8 independently of an amount of operation of the boom operating lever. This is to minimize pressure loss by maximizing an opening area of the flow rate control valve 172. For example, the controller 30 assists a shift of the flow rate control valve 172 by increasing a pilot pressure acting on the pilot port of the flow rate control valve 172 by using a decompression valve (not shown).

Specifically, the controller 30 determines a content of operation of the shovel by an operator based on an output of the operation detecting part, and determines an operating state of the shovel based on an output of a load detecting part.

When the controller 30 determines that the combined excavating movement by the boom lifting operation, the arm closing operation, and the bucket closing operation is being carried out, it determines which load pressure of hydraulic actuators is minimum. Specifically, the controller 30 determines in which hydraulic actuators the energy loss (the pressure loss) becomes maximum on the condition that the controller 30 had supposedly controlled a flow rate of the hydraulic oil flowing into each of the hydraulic actuators by an aperture of the flow rate control valve.

When the controller 30 determines that a pressure (a load pressure) in the bottom side hydraulic chamber of the boom cylinder 7 is minimum, the controller 30 switches the selector valve 62 to the second position and directs the hydraulic oil flowing out of the rod side hydraulic chamber of the boom cylinder 7 to the supply side of the pump/motor 14A as shown by the black thick dotted lines. Also, the controller 30 causes an opening area of the flow rate control valve 172 to become maximum by increasing a pilot pressure acting on the right side pilot port of the flow rate control valve 172 by using a decompression valve independently of an amount of operation of the boom operating lever, and reduces the pressure loss at the flow rate control valve 172. Also, the controller 30 switches the selector valve 63 to the first position and directs the hydraulic oil flowing out of the rod side hydraulic chamber of the bucket cylinder 9 to the hydraulic oil tank T.

Then, the controller 30 controls a suction amount of the hydraulic oil (a displacement volume) by the pump/motor 14A as a hydraulic motor so that an actuating speed of the boom cylinder 7 becomes a speed corresponding to an amount of operation of the boom operating lever. Specifically, the controller 30 controls a displacement volume by adjusting a swash plate tilting angle of the pump/motor 14A by using the regulator. For example, when the controller 30 rotates the pump/motor 14A at a constant speed, the controller 30 can decrease a flow rate of the hydraulic oil flowing out of the rod side hydraulic chamber of the boom cylinder 7 with a decrease in the displacement volume, and can increase a pressure (a back-pressure) in the rod side hydraulic chamber of the boom cylinder 7 with a decrease in the displacement volume. By using this relationship, the controller 30 can control the back-pressure so that the back-pressure becomes a level that matches a desired load pressure in the boom cylinder 7 (a desired pressure in the bottom side hydraulic chamber).

The hydraulic oil flowing out of the rod side hydraulic chamber of the boom cylinder 7 generates rotary torque by rotating the pump/motor 14A. This rotary torque is transmitted to the rotation axis of the engine 11 via the gearbox 13, and may be used as driving force for the first pump 14L and the second pump 14R. That is, the rotary torque generated by the pump/motor 14A is used for assisting rotation of the engine 11, and brings about an effect that it can reduce the load of the engine 11, and thus, it can reduce an amount of fuel injection. A black dashed-dotted line arrow in FIG. 8 depicts that the rotary torque is transmitted to the rotation axis of the engine 11 via the gearbox 13 and can be used as driving force for the first pump 14L and the second pump 14R. As for an output control of the engine 11, a control that a transient load control (a torque based control) is applied to may preferably be used.

If the controller 30 cannot adjust an actuating speed of the boom cylinder 7 to a level corresponding to an amount of operation of the boom operating lever only by controlling the displacement volume of the pump/motor 14A, the controller 30 directs at least part of the hydraulic oil flowing out of the rod side hydraulic chamber of the boom cylinder 7 to the hydraulic oil tank T. Specifically, the controller 30 causes at least part of the hydraulic oil flowing out of the rod side hydraulic chamber of the boom cylinder 7 to flow to the hydraulic oil tank T by shifting the selector valve 62 to an intermediate position between the first position and the second position, or by completely switching the selector valve 62 to the first position. The same goes for a case where a CT opening of the flow rate control valve 172 is large (where an amount of the boom lifting operation is large and where an operator's intention to rapidly lift the boom 4 can be inferred), or a case where a load is applied to the boom cylinder 7 and therefore there becomes no need to generate the back-pressure. The gray thick dotted line in FIG. 8 depicts that the hydraulic oil flowing out of the rod side hydraulic chamber of the boom cylinder 7 flows to the hydraulic tank T when the selector valve 62 is switched to the first position.

Although the above description explains the case where it is determined that a pressure (a load pressure) in the bottom side hydraulic cylinder of the boom cylinder 7 is minimum, a similar explanation may be applied to a case where it is determined that a pressure (a load pressure) in the bottom side hydraulic chamber of the bucket cylinder 9 is minimum. Specifically, when the controller 30 determines that a pressure (a load pressure) in the bottom side hydraulic chamber of the bucket cylinder 9 is minimum, the controller 30 switches the selector valve 63 to the second position and directs the hydraulic oil flowing out of the rod side hydraulic chamber of the bucket cylinder 9 to the supply side of the pump/motor 14A. Also, the controller 30 causes an opening area of the flow rate control valve 173 to become maximum by increasing a pilot pressure acting on the right side pilot port of the flow rate control valve 173 by using a decompression valve independently of an amount of operation of the bucket operating lever, and therefore reduces pressure loss at the flow rate control valve 173. Also, the controller 30 directs the hydraulic oil flowing out of the respective rod side hydraulic chambers of the boom cylinder 7 and the arm cylinder 8 to the hydraulic oil tank T by switching each of the selector valve 61 and the selector valve 62 to the first position. An actuating speed of the bucket cylinder 9 is also controlled as in the above descriptions.

When the controller 30 determines that a pressure (a load pressure) in the bottom side hydraulic chamber of the arm cylinder 8 is minimum, the controller 30 switches the selector valve 61 to the second position and directs the hydraulic oil flowing out of the rod side hydraulic chamber of the arm cylinder 8 to the supply side of the pump/motor 14A. Also, the controller 30 causes an opening area of the flow rate control valve 171 to become maximum by increasing a pilot pressure acting on the right side pilot port of the flow rate control valve 171 by using a decompression valve independently of an amount of operation of the arm operating lever, and therefore reduces pressure loss at the flow rate control valve 171. Also, the controller 30 directs the hydraulic oil flowing out of the respective rod side hydraulic chambers of the boom cylinder 7 and the bucket cylinder 9 to the hydraulic oil tank T by switching each of the selector valve 62 and the selector valve 63 to the first position. An actuating speed of the arm cylinder 8 is also controlled as in the above descriptions.

Figure 9:
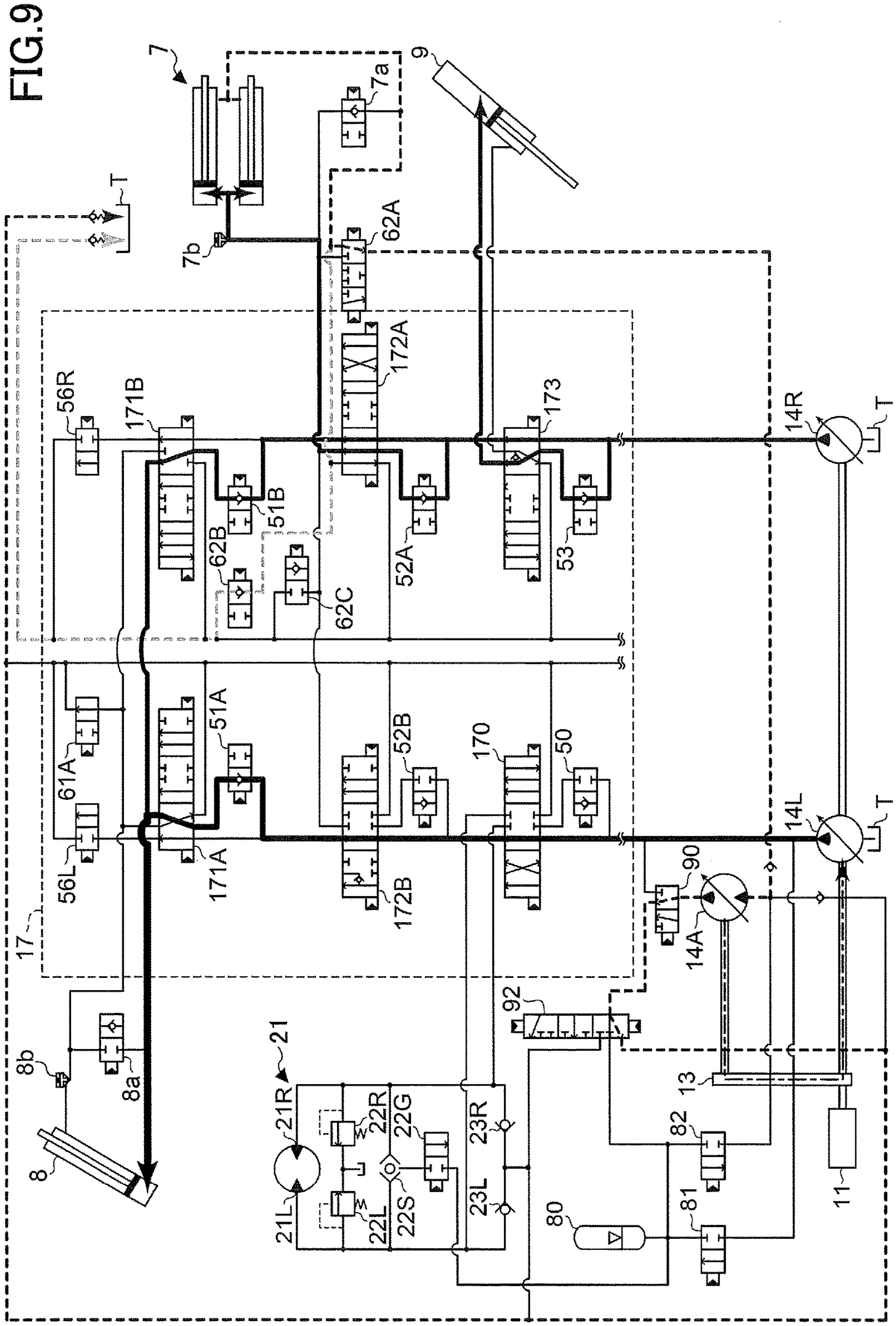
FIG. 9 shows a state of the hydraulic circuit in FIG. 3 when an excavating movement is carried out along with an engine-assist by a back-pressure regeneration.

Next, referring to FIG. 9, a state of the hydraulic circuit in FIG. 3 when an excavating movement is carried out along with an assist of the engine 11 by a back-pressure regeneration is explained. FIG. 9 shows a state of the hydraulic circuit in FIG. 3 when an excavating movement is carried out along with an assist of the engine 11 by a back-pressure regeneration. Black thick solid lines in FIG. 9 depict flows of the hydraulic oil flowing into the hydraulic actuators. A width of the solid line increases with increase in flow rate. Black thick dotted lines in FIG. 9 depict flows of the hydraulic oil flowing out of hydraulic actuators.

Specifically, when the controller 30 determines that the combined excavating movement by the boom lifting operation, arm closing operation, and bucket closing operation is being carried out, the controller 30 switches the selector valve 62A to the second position and directs the hydraulic oil flowing out of the rod side hydraulic chamber of the boom cylinder 7 to the supply side of the pump/motor 14A as shown by the black thick dotted line. Also, the controller 30 causes an opening area of the flow rate control valve 172A to become maximum by increasing a pilot pressure acting on the left side pilot port of the flow rate control valve 172A by using a decompression valve independently of an amount of operation of the boom operating lever, and therefore reduces pressure loss at the flow rate control valve 172A. Also, the controller 30 causes the hydraulic oil flowing out of the rod side hydraulic chamber of the bucket cylinder 9 to flow to the hydraulic oil tank T through the flow rate control valve 173.

Then, the controller 30 controls a suction amount of the hydraulic oil (a displacement volume) by the pump/motor 14A as a hydraulic motor so that an actuating speed of the boom cylinder 7 becomes a speed corresponding to an amount of operation of the boom operating lever.

If the controller 30 cannot adjust an actuating speed of the boom cylinder 7 to a level corresponding to an amount of operation of the boom operating lever, for example, only by controlling the displacement volume of the pump/motor 14A, the controller 30 directs at least part of the hydraulic oil flowing out of the rod side hydraulic chamber of the boom cylinder 7 to the hydraulic oil tank T. Specifically, the controller 30 causes at least part of the hydraulic oil flowing out of the rod side hydraulic chamber of the boom cylinder 7 to flow to the hydraulic oil tank T by shifting the selector valve 62B to an intermediate position between the first position and the second position, or by completely switching the selector valve 62B to the first position. The controller 30 may close the communication between the rod side hydraulic chamber of the boom cylinder 7 and the pump/motor 14A by switching the selector valve 62A to the third position (neutral position) as needed. The gray thick dotted lines in FIG. 9 depict that the hydraulic oil flowing out of the rod side hydraulic chamber of the boom cylinder 7 flows to the hydraulic tank T when the selector valve 62B is switched to the first position.

As described above, the controller 30 additionally brings about following effects in addition to the effects described at [Excavating Movement].

Specifically, when the boom lifting operation is carried out, the controller 30 generates a back-pressure by rotating the pump/motor 14A with the hydraulic oil flowing out of the rod side hydraulic chamber of the boom cylinder 7. Thus, the shovel according to an embodiment of the present invention can use a rotary torque obtained during generation of the back-pressure for assisting the engine 11. As a result, it can realize saving of energy by decreasing an engine power by an amount of power assisted, or faster movement and decreased cycle time by increasing a hydraulic pump power by adding an amount of power assisted to the engine power, or the like. A black dashed-dotted line arrow in FIG. 9 depicts that the rotary torque is transmitted to the rotation axis of the engine 11 via the gearbox 13 and may be used as a driving force for the first pump 14L and the second pump 14R.

Also, the controller 30 does not have to constrict a flow of the hydraulic oil flowing out of the rod side hydraulic chamber of the boom cylinder 7 by an aperture in order to generate a back-pressure by rotating the pump/motor 14A, and therefore does not result in pressure loss at the aperture, either. Thus, it reduces or prevents hydraulic energy in the hydraulic oil flowing out of the rod side hydraulic chamber of the boom cylinder 7 from being wasted as heat energy, and therefore reduces or prevents energy loss.

[Excavating Movement Along with an Accumulator-assist]

Figure 10:
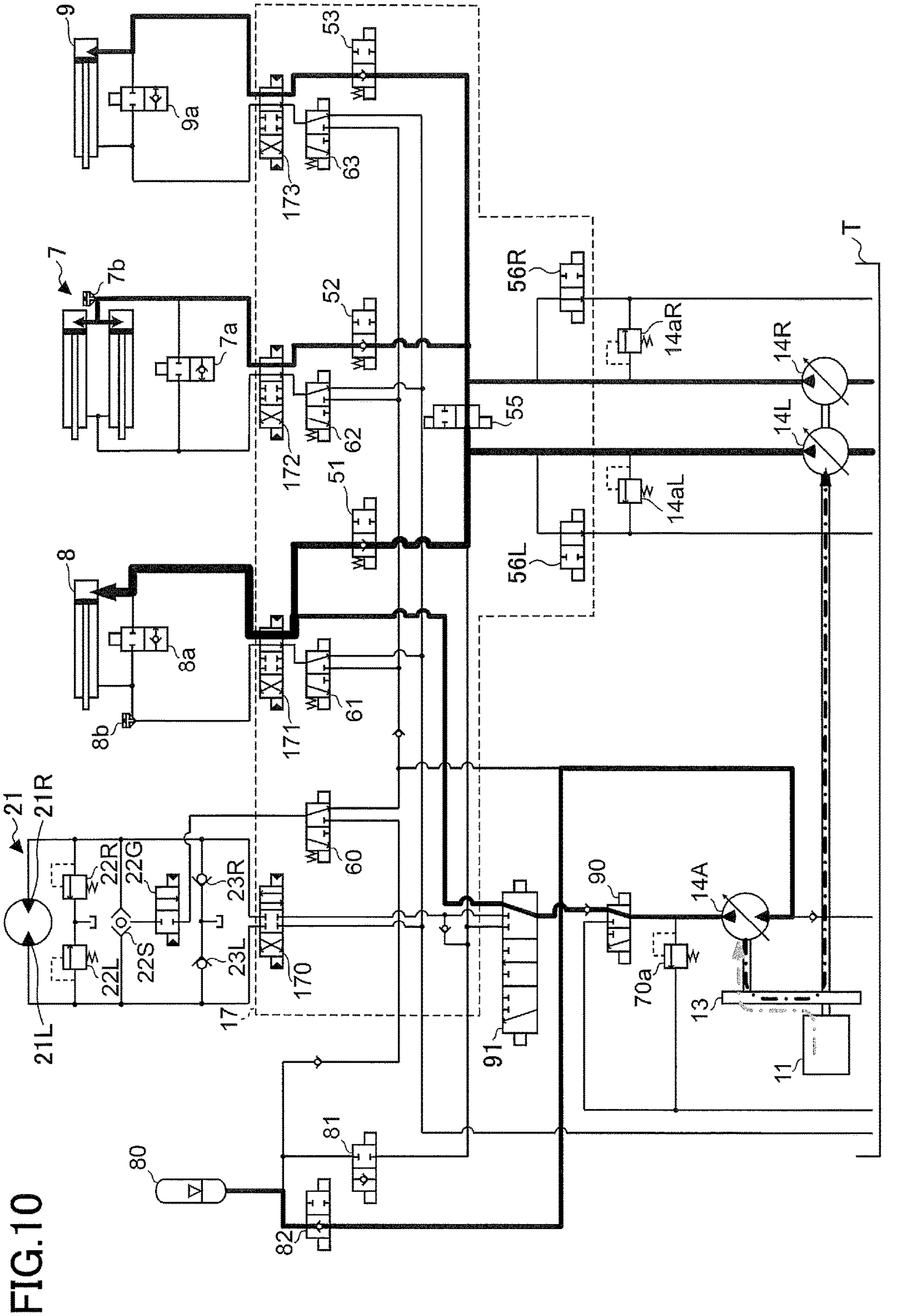
FIG. 10 shows a state of the hydraulic circuit in FIG. 2 when an excavating movement is carried out along with an accumulator-assist.

Next, referring to FIG. 10, a state of the hydraulic circuit in FIG. 2 when an excavating movement is carried out along with an accumulator-assist is explained. FIG. 10 shows a state of the hydraulic circuit in FIG. 2 when an excavating movement is carried out along with an accumulator-assist. Black thick solid lines in FIG. 10 depict flows of the hydraulic oil flowing into the hydraulic actuators. A width of the solid line increases with increase in flow rate.

An accumulator assist is a procedure for assisting a movement of a hydraulic actuator by using hydraulic oil accumulated in the accumulator 80, including a case where the hydraulic actuator is actuated by using only the hydraulic oil accumulated in the accumulator 80.

Specifically, as shown in FIG. 10, when the controller 30 determines that the arm 5 has been operated, it shifts the confluence valve 55 at the second position toward the first position depending on an amount of operation of the arm operating lever. Then, it merges the first hydraulic oil and the second hydraulic oil, and supplies the first hydraulic oil and the second hydraulic oil to the flow rate control valve 171. The flow rate control valve 171 shifts to the right side position in FIG. 10 in response to a pilot pressure corresponding to an amount of operation of the arm operating lever, causes the first hydraulic oil and the second hydraulic oil to flow into the arm cylinder 8.

Then, when the controller 30 determines that the boom 4 and the bucket 6 have been operated, it determines which an excavating movement or a floor drilling movement has been carried out based on an output of the load pressure sensor.

When the controller 30 determines that an excavating movement has been carried out, the controller 30 determines a discharge rate command value for the second pump 14R corresponding to an amount of operation of the boom operating lever and an amount of operation of the bucket operating lever, based on a pump discharge rate control such as a negative control, a positive control, a load sensing control, a horsepower control, or the like. Then, the controller 30 controls a corresponding regulator so that a discharge rate of the second pump 14R can meet the command value.

Also, the controller 30 computes a flow rate difference between the maximum discharge rate of the second pump 14R and the discharge rate command value, and causes the pump/motor 14A to discharge a hydraulic oil corresponding to the flow rate difference. Specifically, the controller 30 opens the communication between the accumulator 80 and the pump/motor 14A by switching the selector valve 82 to the first position, and causes the accumulator 80 to discharge the accumulated hydraulic oil toward the pump/motor 14A.

Then, when a load pressure of the arm cylinder 8 (a pressure in the bottom side hydraulic chamber) is higher than the accumulator pressure, the controller 30 actuates the pump/motor 14A as a hydraulic pump to increase a pressure of the hydraulic oil at the supply side (accumulator pressure) up to the load pressure, and controls the corresponding regulator so that a discharge rate of the pump/motor 14A becomes a level corresponding to the flow rate difference. The pump/motor 14A acting as a hydraulic pump can discharge hydraulic oil with a pump load lower than that of a case where it pumps hydraulic oil from the hydraulic oil tank T. As a result, it can reduce a load of the engine 11 and can realize saving of energy.

Also, when a load pressure of the arm cylinder 8 (a pressure in the bottom side hydraulic chamber) is lower than or equal to the accumulator pressure, the controller 30 actuates the pump/motor 14A as a hydraulic motor to decrease a pressure of the hydraulic oil at the supply side (accumulator pressure) down to the load pressure, and controls the corresponding regulator so that a discharge rate of the pump/motor 14A becomes a level corresponding to the flow rate difference. The pump/motor 14A acting as a hydraulic motor can assist the engine 11 and can supply a part of a driving force for rotating the first pump 14L. As a result, the controller 30 can increase a horsepower consumed by the first pump 14L, or can reduce a load of the engine 11 and thus can reduce an amount of fuel injection when it does not increase the horsepower consumed by the first pump 14L.

A black dashed-dotted line arrow in FIG. 10 depicts that a rotary torque generated by the pump/motor 14A acting as a hydraulic motor is transmitted to the rotation axis of the engine 11 via the gearbox 13, and may be used as a driving force for the first pump 14L and the second pump 14R. A gray dashed-dotted line arrow depicts that the pump/motor 14A acting as a hydraulic pump uses a part of the output of the engine 11.

Then, the controller 30 switches the selector valve 90 to the first position and directs the third hydraulic oil to the selector valve 91, and switches the selector valve 91 to the first position and directs the third hydraulic oil to the arm cylinder 8.

Also, the controller 30 controls an opening area of the confluence valve 55 based on the above flow rate difference, a discharge pressure of the first pump 14L, a discharge pressure of the second pump 14R, and the like. In the example of FIG. 10, the controller 30 decides the opening area of the confluence valve 55 by reference to a predefined opening map, and outputs a command corresponding to the opening area to the confluence valve 55. The controller 30 may decide the opening area of the confluence valve 55 by using a predetermined function instead of the opening map.

When the controller 30 determines that a floor drilling movement has been carried out, the controller 30 closes the confluence valve 55 as soon as possible, as long as a movement of the shovel does not become unstable. This is to enhance operability of the boom 4 and the bucket 6 by causing only the second hydraulic oil to flow into the boom cylinder 7 and the bucket cylinder 9.

In the example of FIG. 10, the maximum discharge rate of the pump/motor 14A is less than the maximum discharge rate of the second pump 14R. Thus, when the above discharge rate difference is greater than the maximum discharge rate of the pump/motor 14A, the controller 30 actuates the pump/motor 14A acting as a hydraulic pump and the first pump 14L at the maximum discharge rate and then increases a discharge rate of the second pump 14R. This is to cause an actuating speed of the arm 5 to become lower than the actuating speed of the arm 5 when using the first hydraulic oil and the second hydraulic oil by causing a difference between the maximum discharge rate of the second pump 14R and an actual increased discharge rate to become lower than or equal to the maximum discharge rate of the pump/motor 14A.

However, when the maximum discharge rate of the pump/motor 14A is greater than or equal to the maximum discharge rate of the second pump 14R, the controller 30 can maintain the confluence valve 55 in a closed state (the second position) during the excavating movement. This is because the actuating speed of the arm 5 when using the first hydraulic oil and the third hydraulic oil does not become lower than the actuating speed of the arm 5 when using the first hydraulic oil and the second hydraulic oil. In this case, whenever during the excavating movement, the controller 30 causes only the first hydraulic oil and the third hydraulic oil to flow into the arm cylinder 8, and causes only the second hydraulic oil to flow into the boom cylinder 7 and the bucket cylinder 9. As a result, it can completely separate the hydraulic oil for actuating the arm 5 from the hydraulic oil for actuating the boom 4 and the bucket 6, and can enhance the operability of each of them.

Figure 11:
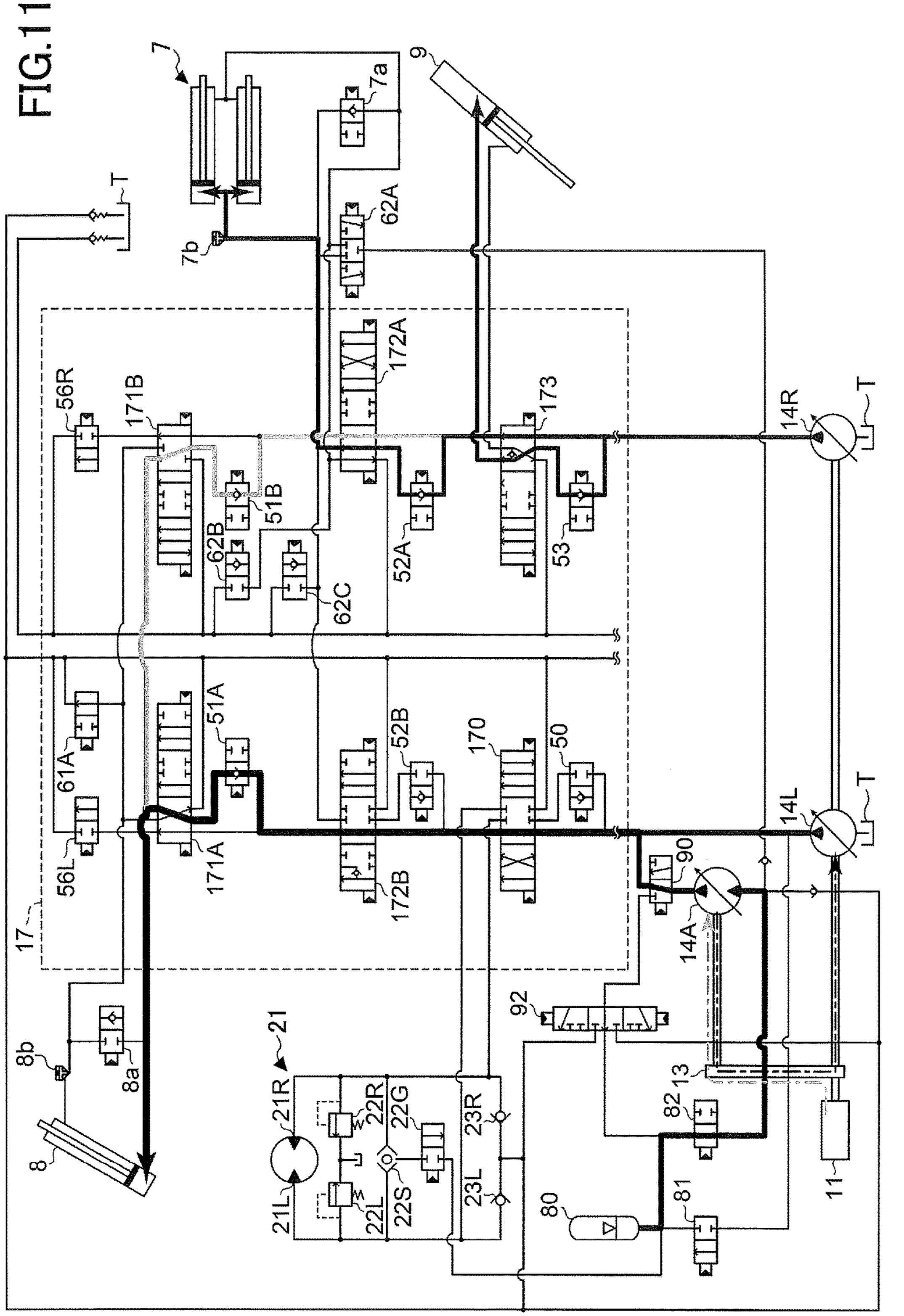
FIG. 11 shows a state of the hydraulic circuit in FIG. 3 when an excavating movement is carried out along with an accumulator-assist.

Next, referring to FIG. 11, a state of the hydraulic circuit in FIG. 3 when an excavating movement is carried out along with an accumulator assist is explained. FIG. 11 shows a state of the hydraulic circuit in FIG. 3 when an excavating movement is carried out along with an accumulator assist. Black thick solid lines and gray thick solid lines in FIG. 11 depict flows of the hydraulic oil flowing into the hydraulic actuators. A width of the solid line increases with increase in flow rate. The gray thick solid lines in FIG. 11 additionally depict that flows of the hydraulic oil may decrease or disappear.

Similar to the case of the hydraulic circuit in FIG. 10, the controller 30 determines a content of operation of the shovel by an operator based on an output of the operation detecting part, and determines an operating state of the shovel based on an output of the load detecting part.

When the arm 5 is operated, the flow rate control valve 171A shifts to the left side position in FIG. 11 in response to a pilot pressure generated depending on an amount of operation of the arm operating lever, and the flow rate control valve 171B shifts to the right side position in FIG. 11 in response to a pilot pressure generated depending on an amount of operation of the arm operating lever.

Then, when the controller 30 determines that the arm 5 has been operated, the controller 30 switches the variable load check valve 51A to the first position so that the first hydraulic oil reaches the flow rate control valve 171A through the variable load check valve 51A. The controller 30 also switches the variable load check valve 51B to the first position so that the second hydraulic oil reaches the flow rate control valve 171B through the variable load check valve 51B. The first hydraulic oil passing through the flow rate control valve 171A merges with the second hydraulic oil passing through the flow rate control valve 171B, and flows into the bottom side hydraulic chamber of the arm cylinder 8.

Then, when the controller 30 determines that the boom 4 and the bucket 6 have been operated, the controller 30 determines which an excavating movement or a floor drilling movement has been carried out based on an output of the load pressure sensor. Then, when the controller 30 determines that an excavating movement has been carried out, the controller 30 determines a discharge rate command value of the second pump 14R corresponding to an amount of operation of the boom operating lever and an amount of operation of the bucket operating lever. Then, the controller 30 controls a corresponding regulator so that a discharge rate of the second pump 14R can meet the command value.

In this case, the flow rate control valve 172A shifts to its left position in FIG. 11 in response to a pilot pressure generated depending on an amount of operation of the boom operating lever. The flow rate control valve 173 shifts to its right position in FIG. 11 in response to a pilot pressure generated depending on an amount of operation of the bucket operating lever. Then, the controller 30 switches the variable load check valve 52A to the first position so that the second hydraulic oil reaches the flow rate control valve 172A through the variable load check valve 52A. Similarly, the controller 30 switches the variable load check valve 53 to the first position so that the second hydraulic oil reaches the flow rate control valve 173 through the variable load check valve 53. Then, the second hydraulic oil passing through the flow rate control valve 172A flows into the bottom side hydraulic chamber of the boom cylinder 7, and the second hydraulic oil passing through the flow rate control valve 173 flows into the bottom side hydraulic chamber of the bucket cylinder 9.

The controller 30 computes a flow rate difference between the maximum discharge rate of the second pump 14R and the discharge rate command value, and causes the pump/motor 14A to discharge a hydraulic oil corresponding to the flow rate difference. Specifically, the controller 30 switches the selector valve 82 to the first position to open the communication between the accumulator 80 and the pump/motor 14A, and causes the accumulator 80 to discharge the accumulated hydraulic oil toward the pump/motor 14A.

Then, when a load pressure of the arm cylinder 8 (a pressure in the bottom side hydraulic chamber) is higher than the accumulator pressure, the controller 30 actuates the pump/motor 14A as a hydraulic pump to increase a pressure of the hydraulic oil at the supply side (accumulator pressure) up to the load pressure, and controls the corresponding regulator so that a discharge rate of the pump/motor 14A becomes a level corresponding to the flow rate difference. The pump/motor 14A acting as a hydraulic pump can discharge hydraulic oil with a pump load lower than that of a case where it pumps hydraulic oil from the hydraulic oil tank T. As a result, it can reduce a load of the engine 11 and can realize saving of energy.

Also, when a load pressure of the arm cylinder 8 (a pressure in the bottom side hydraulic chamber) is lower than or equal to the accumulator pressure, the controller 30 actuates the pump/motor 14A as a hydraulic motor to decrease a pressure of the hydraulic oil at the supply side (accumulator pressure) down to the load pressure, and controls the corresponding regulator so that a discharge rate of the pump/motor 14A becomes a level corresponding to the flow rate difference. The pump/motor 14A acting as a hydraulic motor can assist the engine 11 and can supply a part of a driving force for rotating the first pump 14L. As a result, the controller 30 can increase a horsepower consumed by the first pump 14L, or, when it does not increase the horsepower consumed by the first pump 14L, the controller 30 can reduce a load of the engine 11, and thus, can reduce an amount of fuel injection.

A black dashed-dotted line arrow in FIG. 11 depicts that the rotary torque generated by the pump/motor 14A acting as a hydraulic motor is transmitted to the rotation axis of the engine 11 via the gearbox 13 and can be used as driving force for the first pump 14L and the second pump 14R. A gray dashed-dotted line arrow depicts that the pump/motor 14A acting as a hydraulic pump uses a part of the output of the engine 11.

Also, the controller 30 controls an opening area of the variable load check valve 51B based on the above flow rate difference, a discharge pressure of the first pump 14L, a discharge pressure of the second pump 14R, and the like. In the example of FIG. 11, the controller 30 determines the opening area of the variable load check valve 51B by reference to a predefined opening map, and outputs a command corresponding to the opening area to the variable load check valve 51B. As a result, the second hydraulic oil flowing into the bottom side hydraulic chamber of the arm cylinder 8 decreases or disappears. The gray thick solid lines in FIG. 11 depict that the second hydraulic oil flowing into the bottom side hydraulic chamber of the arm cylinder 8 decreases or disappears with increase in a flow rate of the third hydraulic oil discharged from the pump/motor 14A.

As described above, the controller 30 additionally brings about following effects in addition to the effects described at [Excavating Movement] and [Excavating Movement Along with an Engine-assist by a Back-pressure Regeneration].

Specifically, when an excavating movement is carried out, the controller 30 supplies the hydraulic oil accumulated in the accumulator 80 to the pump/motor 14A. Then, it determines whether to actuate the pump/motor 14A as a hydraulic pump or as a hydraulic motor, and varies a discharge pressure of the third hydraulic oil discharged from the pump/motor 14A by adjusting the displacement volume of the pump/motor 14A. Thus, independently of magnitude relationship between a load pressure of a hydraulic actuator as a supply destination of the third hydraulic oil and the accumulator pressure, it can cause the third hydraulic oil to flow into the hydraulic actuator. As a result, it can flexibly control a flow rate balance of the first hydraulic oil and the third hydraulic oil, and can allow hydraulic energy accumulated in the accumulator 80 to be effectively reused.

[Excavating Movement Along with an Assist of a Hydraulic Actuator by a Back-pressure Regeneration]

Figure 12:
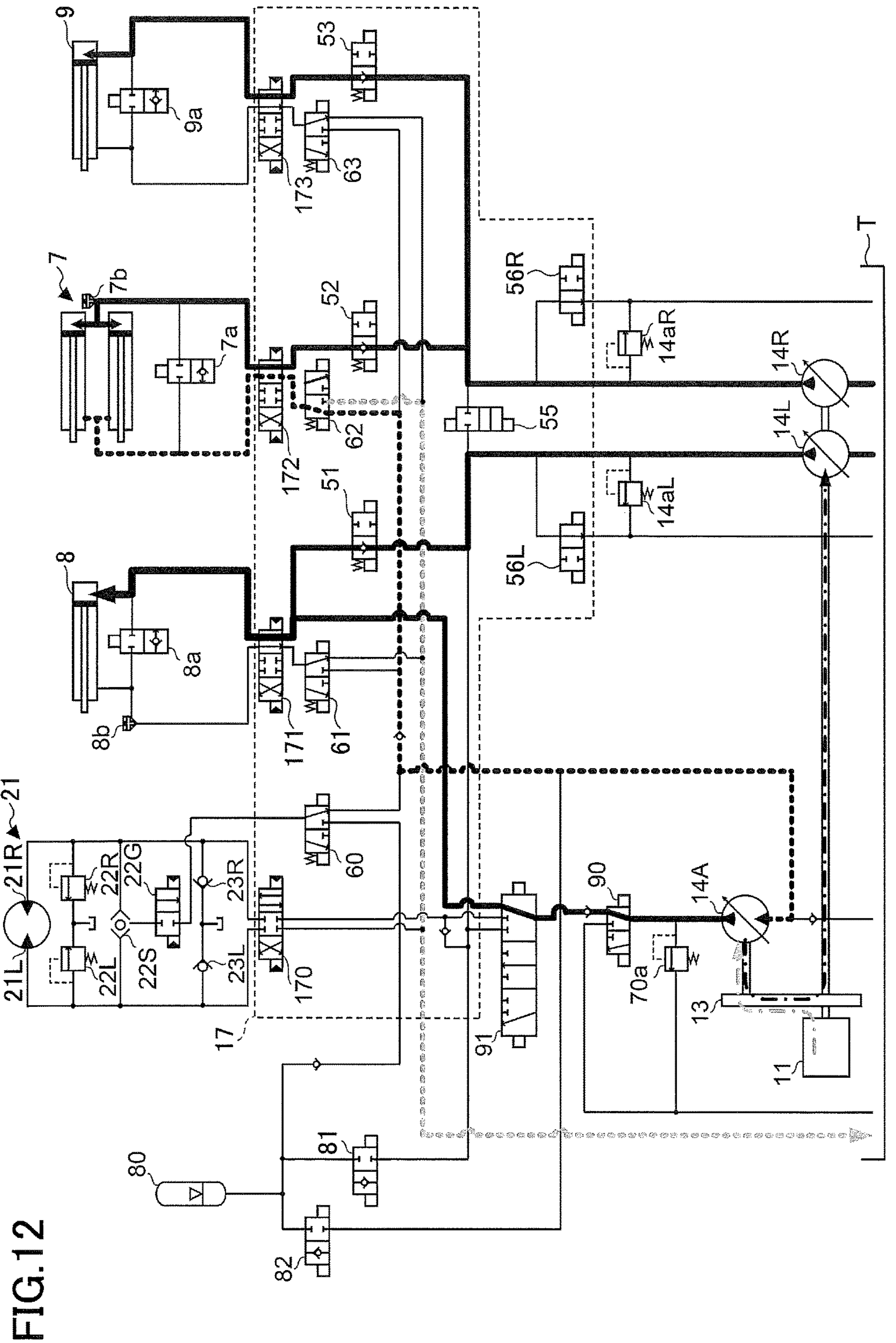
FIG. 12 shows a state of the hydraulic circuit in FIG. 2 when an excavating movement is carried out along with a hydraulic-actuator-assist by a back-pressure regeneration.

Next, referring to FIG. 12, a state of the hydraulic circuit in FIG. 2 when an excavating movement is carried out along with an assist of a hydraulic actuator by a back-pressure regeneration is explained. FIG. 12 shows a state of the hydraulic circuit in FIG. 2 when an excavating movement is carried out along with an assist of the arm cylinder 8 by a back-pressure regeneration. Black thick solid lines in FIG. 12 depict flows of the hydraulic oil flowing into the hydraulic actuators. A width of the solid line increases with increase in flow rate. Black thick dotted lines and gray thick dotted lines in FIG. 12 depict flows of the hydraulic oil flowing out of the hydraulic actuators.

Specifically, when the controller 30 determines that the combined excavating movement by the boom lifting operation, the arm closing operation, and the bucket closing operation is being carried out, it determines which load pressure of hydraulic actuators is minimum. When the controller 30 determines that a pressure (a load pressure) of the bottom side hydraulic chamber of the boom cylinder 7 is minimum, it switches the selector valve 62 to the second position and directs the hydraulic oil flowing out of the rod side hydraulic chamber of the boom cylinder 7 to the supply side of the pump/motor 14A as shown by the black thick dotted lines. Also, the controller 30 causes an opening area of the flow rate control valve 172 to become maximum by increasing a pilot pressure acting on the right side pilot port of the flow rate control valve 172 by using a decompression valve independently of an amount of operation of the boom operating lever, and reduces the pressure loss at the flow rate control valve 172. Also, the controller 30 switches the selector valve 63 to the first position and directs the hydraulic oil flowing out of the rod side hydraulic chamber of the bucket cylinder 9 to the hydraulic oil tank T.

Then, the controller 30 controls a suction amount of the hydraulic oil (a displacement volume) by the pump/motor 14A so that an actuating speed of the boom cylinder 7 becomes a speed corresponding to an amount of operation of the boom operating lever. Specifically, when a load pressure of the arm cylinder 8 (a pressure in the bottom side hydraulic chamber) is higher than a desired back-pressure of the boom cylinder 7 (a pressure in the rod side hydraulic chamber), the controller 30 actuates the pump/motor 14A as a hydraulic pump to increase a pressure of the hydraulic oil at the supply side (a pressure in the rod side hydraulic chamber of the boom cylinder 7) up to the load pressure of the arm cylinder 8. Also, when a load pressure of the arm cylinder 8 (a pressure in the bottom side hydraulic chamber) is lower than or equal to a desired back-pressure of the boom cylinder 7, the controller 30 actuates the pump/motor 14A as a hydraulic motor to decrease a pressure of the hydraulic oil at the supply side (a pressure in the rod side hydraulic chamber of the boom cylinder 7) down to the load pressure. Then, the controller 30 controls a displacement volume of the pump/motor 14A by adjusting a swash plate tilting angle of the pump/motor 14A by using a regulator. For example, when the controller 30 rotates the pump/motor 14A at a constant speed, the controller 30 can decrease a flow rate of the hydraulic oil flowing out of the rod side hydraulic chamber of the boom cylinder 7 with a decrease in the displacement volume, and can increase a pressure (a back-pressure) in the rod side hydraulic chamber of the boom cylinder 7 with a decrease in the displacement volume. By using this relationship, the controller 30 can control the back-pressure so that the back-pressure becomes a level that matches a desired load pressure in the boom cylinder 7 (a pressure in the bottom side hydraulic chamber).

The hydraulic oil flowing out of the rod side hydraulic chamber of the boom cylinder 7 generates rotary torque by rotating the pump/motor 14A acting as a hydraulic motor. This rotary torque is transmitted to the rotation axis of the engine 11 via the gearbox 13, and may be used as driving force for the first pump 14L and the second pump 14R. That is, the rotary torque generated by the pump/motor 14A is used for assisting rotation of the engine 11, and brings about an effect that it can reduce the load of the engine 11, and thus, can reduce an amount of fuel injection. As for an output control of the engine 11, a control that a torque based control is applied to may preferably be used.

The pump/motor 14A acting as a hydraulic pump can discharge hydraulic oil with a pump load lower than that of a case where it pumps hydraulic oil from the hydraulic oil tank T by pumping the hydraulic oil flowing out of the rod side hydraulic chamber of the boom cylinder 7. As a result, it can reduce a load of the engine 11 and can realize saving of energy.

A black dashed-dotted line arrow in FIG. 12 depicts that a rotary torque generated by the pump/motor 14A acting as a hydraulic motor is transmitted to the rotation axis of the engine 11 via the gearbox 13, and may be used as a driving force for the first pump 14L and the second pump 14R. A gray dashed-dotted line arrow depicts that the pump/motor 14A acting as a hydraulic pump uses a part of the output of the engine 11.

If the controller 30 cannot adjust an actuating speed of the boom cylinder 7 to a level corresponding to an amount of operation of the boom operating lever only by controlling the displacement volume of the pump/motor 14A, the controller 30 directs at least part of the hydraulic oil flowing out of the rod side hydraulic chamber of the boom cylinder 7 to the hydraulic oil tank T. Specifically, the controller 30 causes at least part of the hydraulic oil flowing out of the rod side hydraulic chamber of the boom cylinder 7 to flow into the hydraulic oil tank T by shifting the selector valve 62 to an intermediate position between the first position and the second position, or by completely switching the selector valve 62 to the first position. The same goes for a case where a CT opening of the flow rate control valve 172 is large or a case where a load is applied to the boom cylinder 7 and therefore there becomes no need to generate the back-pressure. The gray thick dotted line in FIG. 12 depicts that the hydraulic oil flowing out of the rod side hydraulic chamber of the boom cylinder 7 flows into the hydraulic tank T when the selector valve 62 is switched to the first position.

If the controller 30 cannot adjust an actuating speed of the arm cylinder 8 to a level corresponding to an amount of operation of the arm operating lever only by controlling the displacement volume of the pump/motor 14A, the controller 30 causes the second hydraulic oil discharged from the second pump 14R to flow into the arm cylinder 8 by switching the confluence valve 55 to the first position.

Although the above description explains the case where it is determined that a pressure (a load pressure) in the bottom side hydraulic cylinder of the boom cylinder 7 is minimum, a similar explanation may be applied to a case where it is determined that a pressure (a load pressure) in the bottom side hydraulic chamber of the bucket cylinder 9 is minimum. Specifically, when the controller 30 determines that a pressure (a load pressure) in the bottom side hydraulic chamber of the bucket cylinder 9 is minimum, the controller 30 switches the selector valve 63 to the second position and directs the hydraulic oil flowing out of the rod side hydraulic chamber of the bucket cylinder 9 to the supply side of the pump/motor 14A. Also, the controller 30 causes an opening area of the flow rate control valve 173 to become maximum by increasing a pilot pressure acting on the right side pilot port of the flow rate control valve 173 by using a decompression valve independently of an amount of operation of the bucket operating lever, and therefore reduces pressure loss at the flow rate control valve 173. Also, the controller 30 directs the hydraulic oil flowing out of the respective rod side hydraulic chambers of the boom cylinder 7 and the arm cylinder 8 to the hydraulic oil tank T by switching each of the selector valve 61 and the selector valve 62 to the first position. An actuating speed of the bucket cylinder 9 is also controlled as in the above descriptions.

When the controller 30 determines that a pressure (a load pressure) in the bottom side hydraulic chamber of the arm cylinder 8 is minimum, the controller 30 switches the selector valve 61 to the second position and directs the hydraulic oil flowing out of the rod side hydraulic chamber of the arm cylinder 8 to the supply side of the pump/motor 14A. Also, the controller 30 causes an opening area of the flow rate control valve 171 to become maximum by increasing a pilot pressure acting on the right side pilot port of the flow rate control valve 171 by using a decompression valve independently of an amount of operation of the arm operating lever, and therefore reduces pressure loss at the flow rate control valve 171. Also, the controller 30 directs the hydraulic oil flowing out of the respective rod side hydraulic chambers of the boom cylinder 7 and the bucket cylinder 9 to the hydraulic oil tank T by switching each of the selector valve 62 and the selector valve 63 to the first position. An actuating speed of the arm cylinder 8 is also controlled as in the above descriptions.

Figure 13:
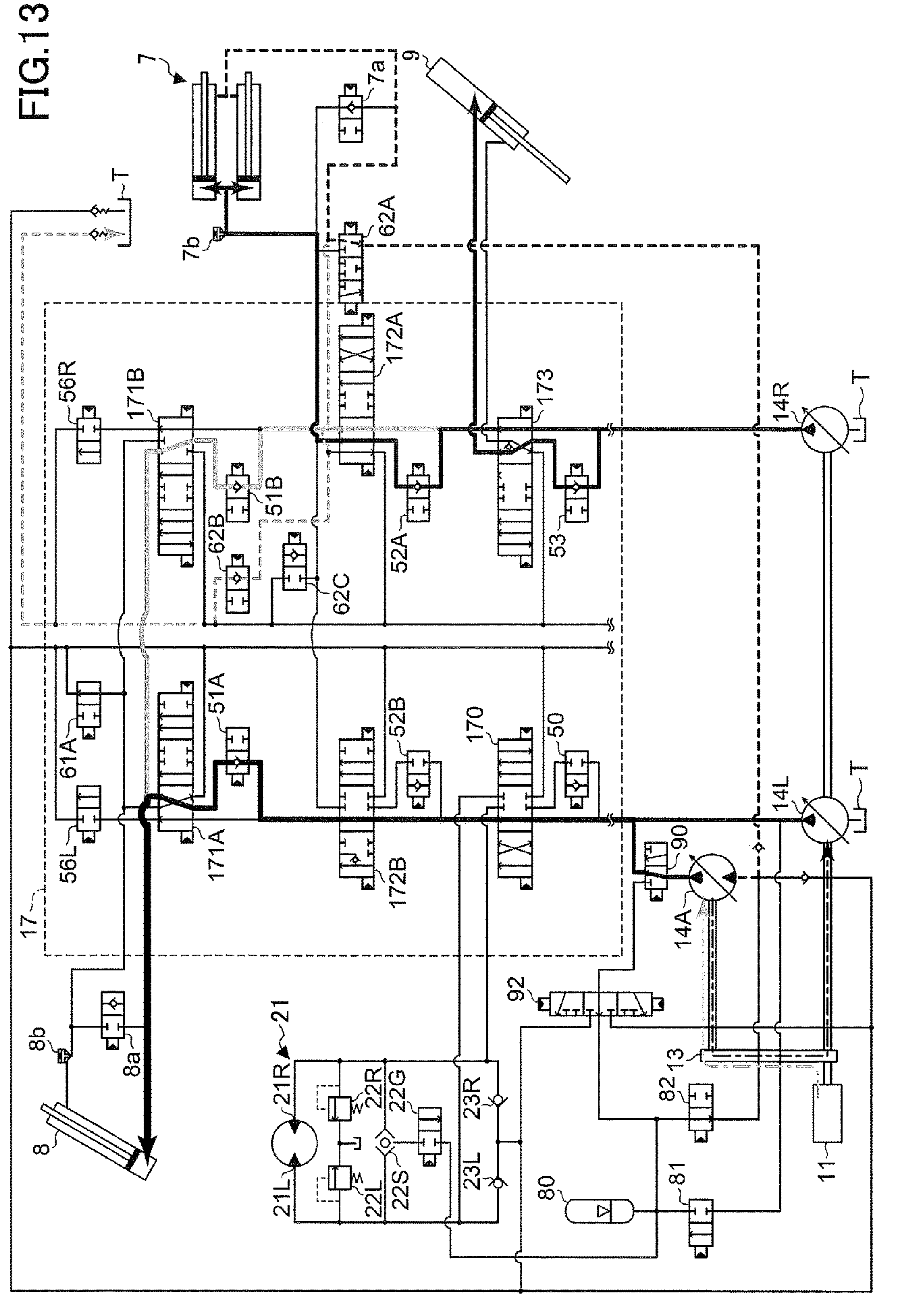
FIG. 13 shows a state of the hydraulic circuit in FIG. 3 when an excavating movement is carried out along with a hydraulic-actuator-assist by a back-pressure regeneration.

Next, referring to FIG. 13, a state of the hydraulic circuit in FIG. 3 when an excavating movement is carried out along with an assist of a hydraulic actuator by a back-pressure regeneration is explained. FIG. 13 shows a state of the hydraulic circuit in FIG. 3 when an excavating movement is carried out along with an assist of the arm cylinder 8 by a back-pressure regeneration. Black thick solid lines and gray thick solid lines in FIG. 13 depict flows of the hydraulic oil flowing into the hydraulic actuators. A width of the solid line increases with increase in flow rate. Black thick solid lines and gray thick solid lines in FIG. 13 depict flows of the hydraulic oil flowing out of the hydraulic actuators. The gray thick solid lines and the gray thick dotted lines in FIG. 13 additionally depict that flows of the hydraulic oil may decrease or disappear.

Specifically, when the controller 30 determines that the combined excavating movement by the boom lifting operation, the arm closing operation, and the bucket closing operation is being carried out, the controller 30 switches the selector valve 62A to the second position and directs the hydraulic oil flowing out of the rod side hydraulic chamber of the boom cylinder 7 to the supply side of the pump/motor 14A as shown by the black thick dotted line. Also, the controller 30 causes an opening area of the flow rate control valve 172A to become maximum by increasing a pilot pressure acting on the left side pilot port of the flow rate control valve 172A by using a decompression valve independently of an amount of operation of the boom operating lever, and therefore reduces pressure loss at the flow rate control valve 172A. Also, the controller 30 causes the hydraulic oil flowing out of the rod side hydraulic chamber of the bucket cylinder 9 to flow into the hydraulic oil tank T through the flow rate control valve 173.

Then, the controller 30 controls a suction amount of the hydraulic oil (a displacement volume) by the pump/motor 14A so that an actuating speed of the boom cylinder 7 becomes a speed corresponding to an amount of operation of the boom operating lever. Specifically, when a load pressure of the arm cylinder 8 (a pressure in the bottom side hydraulic chamber) is higher than a desired back-pressure of the boom cylinder 7 (a pressure in the rod side hydraulic chamber), the controller 30 actuates the pump/motor 14A as a hydraulic pump to increase a pressure of the hydraulic oil at the supply side (a pressure in the rod side hydraulic chamber of the boom cylinder 7) up to the load pressure of the arm cylinder 8. Also, when a load pressure of the arm cylinder 8 (a pressure in the bottom side hydraulic chamber) is lower than or equal to a desired back-pressure of the boom cylinder 7, the controller 30 actuates the pump/motor 14A as a hydraulic motor to decrease a pressure of the hydraulic oil at the supply side (a pressure in the rod side hydraulic chamber of the boom cylinder 7) down to the load pressure. Then, the controller 30 controls a displacement volume of the pump/motor 14A by adjusting a swash plate tilting angle of the pump/motor 14A by using a regulator.

A black dashed-dotted line arrow in FIG. 13 depicts that a rotary torque generated by the pump/motor 14A acting as a hydraulic motor is transmitted to the rotation axis of the engine 11 via the gearbox 13, and may be used as a driving force for the first pump 14L and the second pump 14R. A gray dashed-dotted line arrow depicts that the pump/motor 14A acting as a hydraulic pump uses a part of the output of the engine 11.

If the controller 30 cannot adjust an actuating speed of the boom cylinder 7 to a level corresponding to an amount of operation of the boom operating lever, for example, only by controlling the displacement volume of the pump/motor 14A, the controller 30 directs at least part of the hydraulic oil flowing out of the rod side hydraulic chamber of the boom cylinder 7 to the hydraulic oil tank T. Specifically, the controller 30 causes at least part of the hydraulic oil flowing out of the rod side hydraulic chamber of the boom cylinder 7 to flow into the hydraulic oil tank T by shifting the selector valve 62B to an intermediate position between the first position and the second position, or by completely switching the selector valve 62B to the first position. The controller 30 may close the communication between the rod side hydraulic chamber of the boom cylinder 7 and the pump/motor 14A by switching the selector valve 62A to the third position (neutral position) as needed. The gray thick dotted lines in FIG. 13 depict that the hydraulic oil flowing out of the rod side hydraulic chamber of the boom cylinder 7 flows into the hydraulic tank T when the selector valve 62B is switched to the first position.

Also, in a case where it is possible to control an actuating speed of the arm cylinder 8 to a level corresponding to an amount of operation of the arm operating lever by controlling a displacement volume of the pump/motor 14A, the controller 30 may block the second hydraulic oil from flowing into the arm cylinder 8 by switching the variable load check valve 51B to the second position. The gray thick solid line in FIG. 13 depicts that the second hydraulic oil is blocked from flowing into the arm cylinder 8 when the variable load check valve 51B is switched to the second position.

As described above, the controller 30 additionally brings about following effects in addition to the effects described at [Excavating Movement] and [Excavating Movement Along with an Engine-assist by a Back-pressure Regeneration].

Specifically, when an excavating movement is carried out, the controller 30 supplies the hydraulic oil flowing out of the rod side hydraulic chamber of the boom cylinder 7 to the pump/motor 14A. Then, it determines whether to actuate the pump/motor 14A as a hydraulic pump or as a hydraulic motor, and varies a discharge pressure of the third hydraulic oil discharged from the pump/motor 14A by adjusting the displacement volume of the pump/motor 14A. Thus, independently of magnitude relationship between a load pressure of a hydraulic actuator as a supply destination of the third hydraulic oil and a desired back-pressure in the rod side hydraulic chamber of the boom cylinder 7, it can cause the third hydraulic oil to flow into the hydraulic actuator. As a result, it can flexibly control a flow rate balance of the first hydraulic oil and the third hydraulic oil, and can allow regenerated energy to be effectively reused.

[Earth Removing Movement Along with an Engine-assist by a Back-pressure Regeneration]

Figure 14:
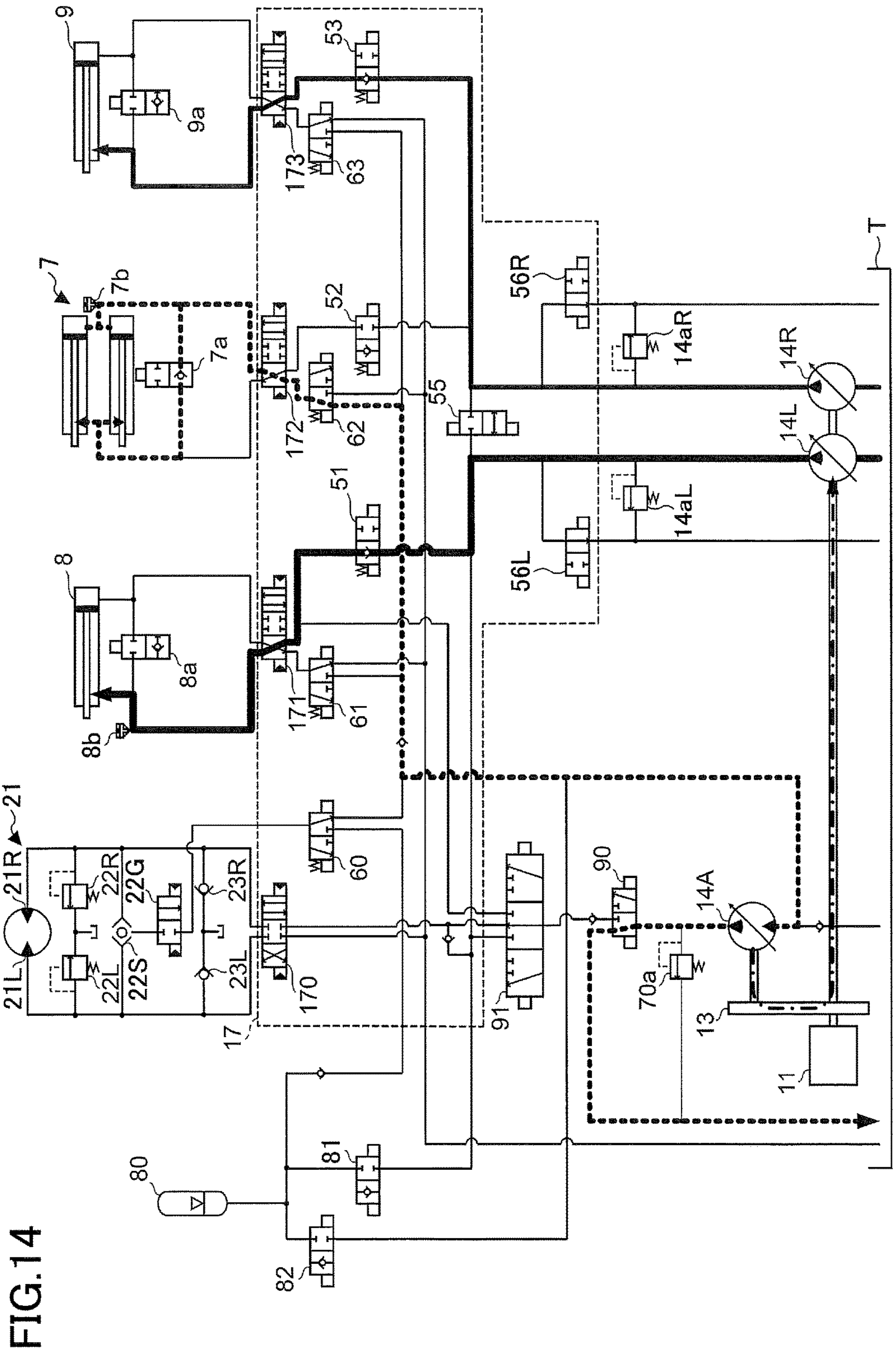
FIG. 14 shows a state of the hydraulic circuit in FIG. 2 when an earth removing movement is carried out along with an engine-assist by a back-pressure regeneration.

Next, referring to FIG. 14, a state of the hydraulic circuit in FIG. 2 when an earth removing movement is carried out along with an assist of the engine 11 by a back-pressure regeneration is explained. FIG. 14 shows a state of the hydraulic circuit in FIG. 2 when an earth removing movement is carried out along with an assist of the engine 11 by a back-pressure regeneration. Black thick solid lines in FIG. 14 depict flows of the hydraulic oil flowing into the hydraulic actuators. A width of the solid line increases with increase in flow rate. Black thick dotted lines in FIG. 14 depict flows of the hydraulic oil flowing out of the hydraulic actuators.

An earth removing movement is a movement including a boom lowering, an arm opening, and a bucket opening. The boom 4 lowers under its own weight. A lowering speed of the boom 4 is controlled by adjusting a flow rate of the hydraulic oil flowing out of the bottom side hydraulic chamber of the boom cylinder 7. Specifically, the lowering speed of the boom 4 increases with increase in a flow rate of the hydraulic oil flowing out of the bottom side hydraulic chamber.

When the boom lowering operation is carried out, the flow rate control valve 172 shifts to the left position in FIG. 14 in response to a pilot pressure generated depending on an amount of operation of the boom operating lever. Also, when the arm opening operation is carried out, the flow rate control valve 171 shifts to the left position in FIG. 14 in response to a pilot pressure generated depending on an amount of operation of the arm operating lever, and when the bucket opening operation is carried out, the flow rate control valve 173 shifts to the left position in FIG. 14 in response to a pilot pressure generated depending on an amount of operation of the bucket operating lever.

Then, when the controller 30 determines that the boom lowering operation has been carried out, the controller 30 causes the hydraulic oil flowing out of the bottom side hydraulic chamber of the boom cylinder 7 to flow into the rod side hydraulic chamber of the boom cylinder 7 by maximizing an opening area of the regeneration valve 7*a* as shown in FIG. 14.

When the opening area of the regeneration valve 7*a* becomes maximum, a pressure in the bottom side hydraulic chamber of the boom cylinder 7 is directly applied to the rod side hydraulic chamber. Thus, the pressure in the bottom side hydraulic chamber further increases and may exceed the relief pressure of the relief valve located in the control valve 17. Therefore, when the pressure in the bottom side hydraulic chamber of the boom cylinder 7 has come close to the relief pressure, the controller 30 decreases an opening area of the regeneration valve 7*a* so that the pressure in the bottom side hydraulic chamber does not exceed the relief pressure.

Also, the controller 30 switches the selector valve 62 to the second position, and directs the hydraulic oil flowing out of the bottom side hydraulic chamber of the boom cylinder 7 to the supply side of the pump/motor 14A as shown by the black thick dotted line. Also, the controller 30 causes an opening area of the flow rate control valve 172 to become maximum by increasing a pilot pressure acting on the left side pilot port of the flow rate control valve 172 by using a decompression valve independently of an amount of operation of the boom operating lever, and reduces the pressure loss at the flow rate control valve 172. Also, the controller 30 switches the variable load check valve 52 to the second position and closes the communication between the second pump 14R and the flow rate control valve 172.

Also, the controller 30 controls a discharge rate of the pump/motor 14A depending on an amount of operation of the boom operating lever and an opening area of the regeneration valve 7*a*. Specifically, the controller 30 actuates the pump/motor 14A as a hydraulic motor and controls a displacement volume of the pump/motor 14A by controlling a corresponding regulator so that a pressure in the bottom side hydraulic chamber of the boom cylinder 7 does not change suddenly or does not exceed the relief pressure. Then, the controller 30 causes the third hydraulic oil discharged from the pump/motor 14A to flow into the hydraulic oil tank T by switching the selector valve 90 to the second position.

Also, the controller 30 maintains the confluence valve 55 in the state of the second position so that the first hydraulic oil and the second hydraulic oil do not merge and that respective movements of the arm cylinder 8 and the bucket cylinder 9 are independently controlled by using the first hydraulic oil and the second hydraulic oil separately. In this case, a flow rate of the hydraulic oil flowing into the rod side hydraulic chamber of the arm cylinder 8 can be directly controlled by the first pump 14L. Thus, the flow rate does not need to be controlled by an aperture at the flow rate control valve 171. Similarly, a flow rate of the hydraulic oil flowing into the rod side hydraulic chamber of the bucket cylinder 9 can be directly controlled by the second pump 14R. Thus, the flow rate does not need to be controlled by an aperture at the flow rate control valve 173. Therefore, as in the case of the flow rate control valve 172 corresponding to the boom cylinder 7, the controller 30 may cause opening areas of the flow rate control valves 171, 173 to become maximum by increasing pilot pressures acting on the left side pilot ports of the flow rate control valves 171, 173 by using decompression valves, and thus may reduce the pressure loss at the flow rate control valves 171, 173. When an earth removing movement with the arm opening operation and the bucket opening operation is carried out, the arm operating lever and the bucket operating lever are typically operated at full lever (for example, an amount of operation greater than or equal to 80% under the assumption that a neutral state of a lever correspond to 0% and the maximally operated state corresponds to 100%.). Thus, both opening areas of the flow rate control valves 171, 173 become maximum.

Also, the hydraulic oil flowing out of the bottom side hydraulic chamber of the boom cylinder 7 generates a rotary torque by rotating the pump/motor 14A. As shown by the black dashed-dotted line arrow in FIG. 14, this rotary torque is transmitted to the rotation axis of the engine 11 via the gearbox 13, and may be used as driving force for the first pump 14L and the second pump 14R. That is, the rotary torque generated by the pump/motor 14A is used for assisting rotation of the engine 11, and brings about an effect that it can reduce the load of the engine 11 and thus can reduce an amount of fuel injection.

If the controller 30 cannot adjust an actuating speed of the boom cylinder 7 to a level corresponding to an amount of operation of the boom operating lever only by controlling the displacement volume of the pump/motor 14A, the controller 30 directs at least part of the hydraulic oil flowing out of the bottom side hydraulic chamber of the boom cylinder 7 to the hydraulic oil tank T. Specifically, the controller 30 causes at least part of the hydraulic oil flowing out of the bottom side hydraulic chamber of the boom cylinder 7 to flow into the hydraulic oil tank T by shifting the selector valve 62 to an intermediate position between the first position and the second position, or by completely switching the selector valve 62 to the first position.

Figure 15:
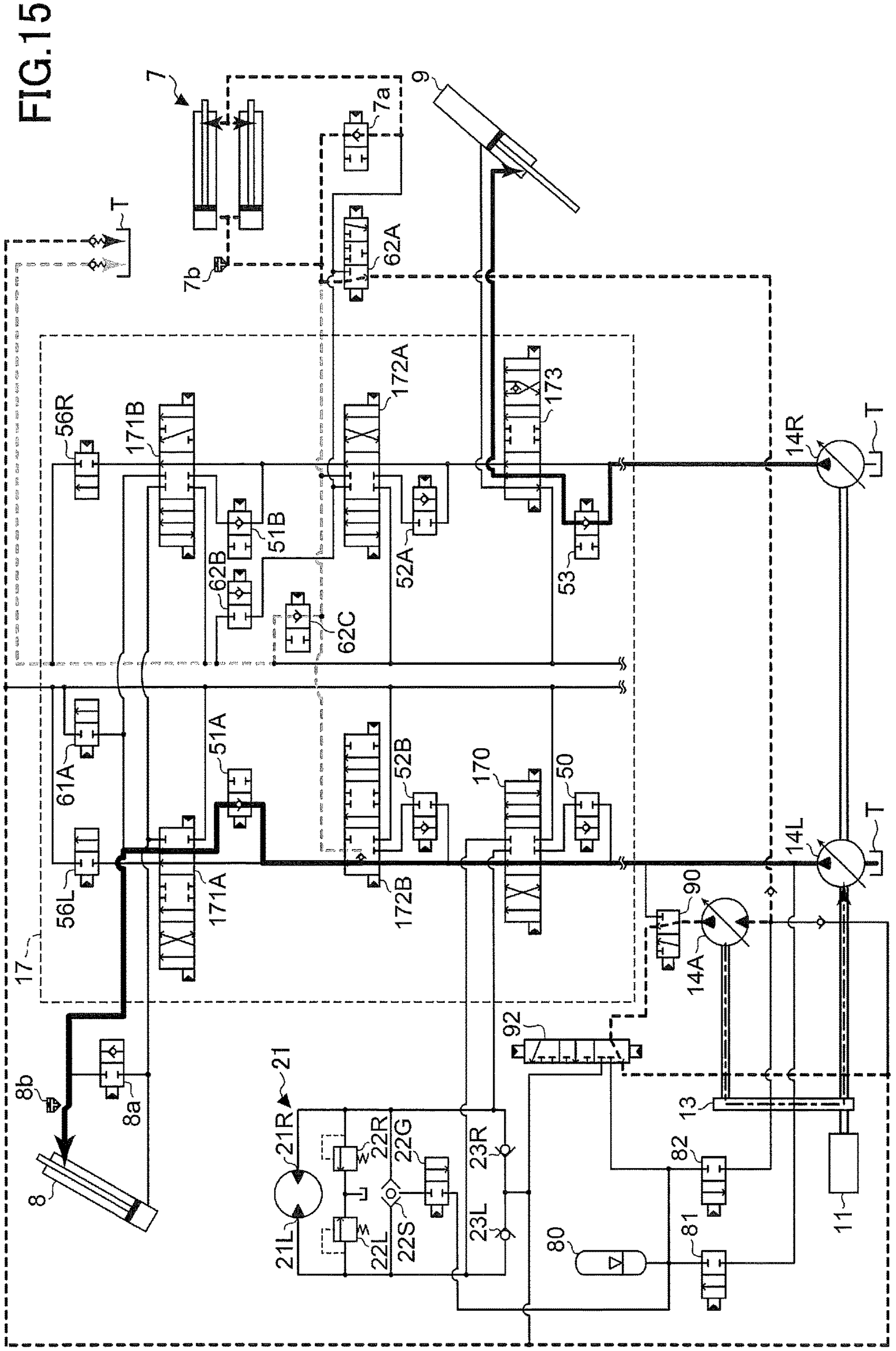
FIG. 15 shows a state of the hydraulic circuit in FIG. 3 when an earth removing movement is carried out along with an engine-assist by a back-pressure regeneration.

Next, referring to FIG. 15, a state of the hydraulic circuit in FIG. 3 when an earth removing movement is carried out along with an assist of the engine 11 by a back-pressure regeneration is explained. FIG. 15 shows a state of the hydraulic circuit in FIG. 3 when an earth removing movement is carried out along with an assist of the engine 11 by a back-pressure regeneration. Black thick solid lines in FIG. 15 depict flows of the hydraulic oil flowing into the hydraulic actuators. A width of the solid line increases with increase in flow rate. Black thick dotted lines and gray thick dotted lines in FIG. 15 depict flows of the hydraulic oil flowing out of the hydraulic actuators.

Specifically, when the controller determines that the boom lowering operation has been carried out, the controller 30 causes the hydraulic oil flowing out of the bottom side hydraulic chamber of the boom cylinder 7 to flow into the rod side hydraulic chamber of the boom cylinder 7 by maximizing an opening area of the regeneration valve 7*a*.

Also, the controller 30 switches the selector valve 62A to the first position and directs the hydraulic oil flowing out of the bottom side hydraulic chamber of the boom cylinder 7 to the supply side of the pump/motor 14A. Also, the controller 30 shifts the flow rate control valve 172A to its neutral position by decreasing a pilot pressure acting on the right side pilot port of the flow rate control valve 172A by using a decompression valve independently of an amount of operation of the boom operating lever, and thus, the controller 30 blocks a flow of the hydraulic oil flowing from the bottom side hydraulic chamber of the boom cylinder 7 through the flow rate control valve 172A toward the hydraulic oil tank T. Also, the controller 30 switches the variable load check valve 52A to the second position and closes the communication between the second pump 14R and the flow rate control valve 172A.

Also, when the arm opening operation is carried out, the flow rate control valve 171A shifts to the right position in FIG. 15 in response to a pilot pressure generated depending on an amount of operation of the arm operating lever. Also, when the bucket opening operation is carried out, the flow rate control valve 173 shifts to the left position in FIG. 15 in response to a pilot pressure generated depending on an amount of operation of the bucket operating lever.

Also, when the controller 30 determines that the arm opening operation has been carried out, the controller 30 switches the variable load check valve 51A to the first position and opens the communication between the first pump 14L and the flow rate control valve 171A. Also, when the controller 30 determines that the bucket opening operation has been carried out, the controller 30 switches the variable load check valve 53 to the first position and opens the communication between the second pump 14R and the flow rate control valve 173.

Also, the controller 30 controls a discharge rate of the pump/motor 14A depending on an amount of operation of the boom operating lever and an opening area of the regeneration valve 7*a*. Specifically, the controller 30 actuates the pump/motor 14A as a hydraulic motor and controls a displacement volume of the pump/motor 14A by controlling a corresponding regulator so that a pressure in the bottom side hydraulic chamber of the boom cylinder 7 does not change suddenly. Then, the controller 30 causes the third hydraulic oil discharged from the pump/motor 14A to flow into the hydraulic oil tank T by switching the selector valve 90 to the second position and by switching the selector valve 92 to the third position.

Also, the controller 30 maintains the variable load check valve 51B in the state of the second position so that the first hydraulic oil and the second hydraulic oil do not merge and that respective movements of the arm cylinder 8 and the bucket cylinder 9 are independently controlled by using the first hydraulic oil and the second hydraulic oil separately. In this case, a flow rate of the hydraulic oil flowing into the rod side hydraulic chamber of the arm cylinder 8 can be directly controlled by the first pump 14L. Thus, the flow rate does not need to be controlled by an aperture at the flow rate control valve 171A. Similarly, a flow rate of the hydraulic oil flowing into the rod side hydraulic chamber of the bucket cylinder 9 can be directly controlled by the second pump 14R. Thus, the flow rate does not need to be controlled by an aperture at the flow rate control valve 173. Therefore, as in the case of the flow rate control valve 172A corresponding to the boom cylinder 7, the controller 30 may cause an opening area of the flow rate control valves 171A to become maximum by increasing a pilot pressure acting on the right side pilot port of the flow rate control valve 171A by using a decompression valve, may cause an opening area of the flow rate control valves 173 to become maximum by increasing a pilot pressure acting on the left side pilot port of the flow rate control valve 173 by using a decompression valve, and thus may reduce the pressure loss at the flow rate control valves 171A, 173.

Also, the hydraulic oil flowing out of the bottom side hydraulic chamber of the boom cylinder 7 generates a rotary torque by rotating the pump/motor 14A. As shown by the dashed-dotted line arrow in FIG. 15, this rotary torque is transmitted to the rotation axis of the engine 11 via the gearbox 13, and may be used as driving force for the first pump 14L and the second pump 14R. That is, the rotary torque generated by the pump/motor 14A is used for assisting rotation of the engine 11, and brings about an effect that it can reduce the load of the engine 11 and thus can reduce an amount of fuel injection.

If the controller 30 cannot adjust an actuating speed of the boom cylinder 7 to a level corresponding to an amount of operation of the boom operating lever only by controlling the displacement volume of the pump/motor 14A, the controller 30 directs at least part of the hydraulic oil flowing out of the bottom side hydraulic chamber of the boom cylinder 7 to the hydraulic oil tank T. Specifically, the controller 30 causes at least part of the hydraulic oil flowing out of the bottom side hydraulic chamber of the boom cylinder 7 to flow into the hydraulic oil tank T by shifting the selector valve 62C to an intermediate position between the first position and the second position, or by completely switching the selector valve 62C to the first position.

Also, the controller 30 may shift the flow rate control valve 172B to the left position in FIG. 15 by increasing a pilot pressure acting on the left side pilot port of the flow rate control valve 172B by using a decompression valve independently of an amount of operation of the boom operating lever, and thus may merge the hydraulic oil flowing out of the bottom side hydraulic chamber of the boom cylinder 7 into the first hydraulic oil.

Gray thick dotted lines in FIG. 15 depict that the hydraulic oil flowing out of the bottom side hydraulic chamber of the boom cylinder 7 is discharged into the hydraulic oil tank T when the selector valve 62C is shifted toward the first position, and that the hydraulic oil flowing out of the bottom side hydraulic chamber of the boom cylinder 7 merges into the first hydraulic oil at the flow rate control valve 172B when the flow rate control valve 172B is shifted to the left position.

As described above, when the boom lowering operation has been carried out, the controller 30 generates a back-pressure by rotating the pump/motor 14A with the hydraulic oil flowing out of the bottom side hydraulic chamber of the boom cylinder 7. Thus, the shovel according to an embodiment of the present invention can use hydraulic energy obtained during generation of the back-pressure for assisting the engine 11. As a result, it can realize saving of energy by decreasing an engine power by an amount of power assisted, or faster movement and decreased cycle time by increasing a hydraulic pump power by adding an amount of power assisted to the engine power, or the like.

Also, the controller 30 generates the back-pressure by rotating the pump/motor 14A. Thus, there is no need to constrict a flow of the hydraulic oil flowing out of the bottom side hydraulic chamber of the boom cylinder 7 by an aperture, and thus the controller 30 does not generate pressure loss at the aperture. Thus, it reduces or prevents potential energy of the boom 4 from being wasted as heat energy, and therefore reduces or prevents energy loss.

Also, even if the boom lowering operation, the arm opening operation, and the bucket opening operation have been carried out simultaneously, the controller 30 independently controls respective movements of the arm cylinder 8 and the bucket cylinder 9 by using the first hydraulic oil and the second hydraulic oil separately without merging. Thus, one of the flow rate of the first hydraulic oil required to activate the arm cylinder 8 and the flow rate of the second hydraulic oil required to activate the bucket cylinder 9 is not affected by the other. As a result, it can prevent a hydraulic pump from discharging excessive hydraulic oil.

[Earth Removing Movement Along with a Hydraulic-actuator-assist by a Back-pressure Regeneration]

Figure 16:
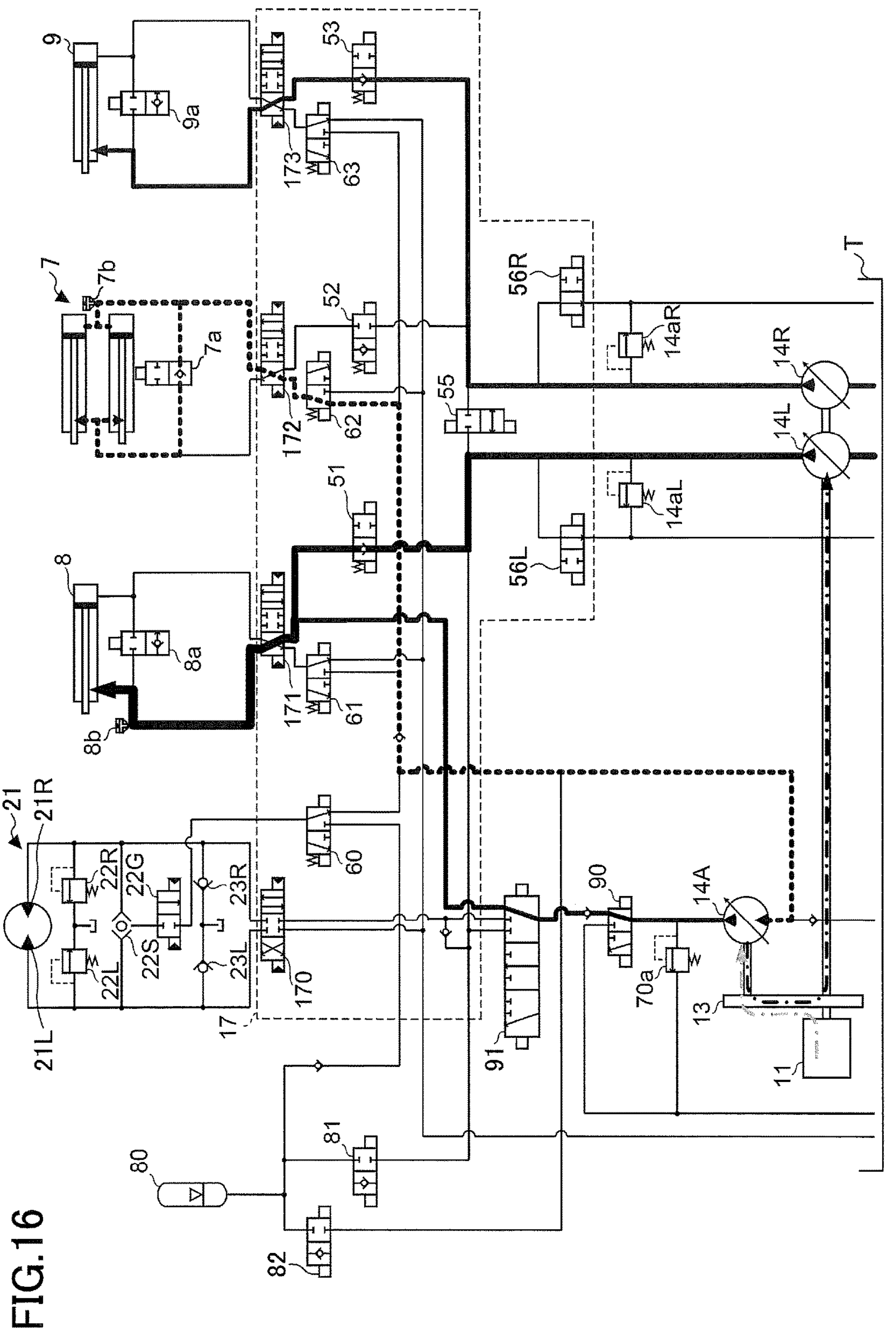
FIG. 16 shows a state of the hydraulic circuit in FIG. 2 when an earth removing movement is carried out along with a hydraulic-actuator-assist by a back-pressure regeneration.

Next, referring to FIG. 16, a state of the hydraulic circuit in FIG. 2 when an earth removing movement is carried out along with a hydraulic-actuator-assist by a back-pressure regeneration is explained. FIG. 16 shows a state of the hydraulic circuit in FIG. 2 when an earth removing movement is carried out along with an assist of the arm cylinder 8 by a back-pressure regeneration. Black thick solid lines in FIG. 16 depict flows of the hydraulic oil flowing into the hydraulic actuators. A width of the solid line increases with increase in flow rate. Black thick dotted lines in FIG. 16 depict a flow of the hydraulic oil flowing out of the hydraulic actuator.

When the boom lowering operation is carried out, the flow rate control valve 172 shifts to the left position in FIG. 16 in response to a pilot pressure generated depending on an amount of operation of the boom operating lever. Also, when the arm opening operation is carried out, the flow rate control valve 171 shifts to the left position in FIG. 16 in response to a pilot pressure generated depending on an amount of operation of the arm operating lever, and when the bucket opening operation is carried out, the flow rate control valve 173 shifts to the left position in FIG. 16 in response to a pilot pressure generated depending on an amount of operation of the bucket operating lever.

Then, when the controller 30 determines that the boom lowering operation has been carried out, the controller 30 causes the hydraulic oil flowing out of the bottom side hydraulic chamber of the boom cylinder 7 to flow into the rod side hydraulic chamber of the boom cylinder 7 by maximizing an opening area of the regeneration valve 7*a* as shown by the black thick dotted line.

Also, the controller 30 switches the selector valve 62 to the second position, and directs the hydraulic oil flowing out of the bottom side hydraulic chamber of the boom cylinder 7 to the supply side of the pump/motor 14A as shown by the black thick dotted line. Also, the controller 30 causes an opening area of the flow rate control valve 172 to become maximum by increasing a pilot pressure acting on the left side pilot port of the flow rate control valve 172 by using a decompression valve independently of an amount of operation of the boom operating lever, and thus reduces the pressure loss at the flow rate control valve 172. Also, the controller 30 switches the variable load check valve 52 to the second position and closes the communication between the second pump 14R and the flow rate control valve 172.

Also, the controller 30 controls a discharge rate of the pump/motor 14A depending on an amount of operation of the boom operating lever and an opening area of the regeneration valve 7*a*. Specifically, when a load pressure of the arm cylinder 8 (a pressure in the rod side hydraulic chamber) is higher than a desired back-pressure of the boom cylinder 7 (a pressure in the bottom side hydraulic chamber), the controller 30 actuates the pump/motor 14A as a hydraulic pump to increase a pressure of the hydraulic oil at the supply side (a pressure in the bottom side hydraulic chamber of the boom cylinder 7) up to the load pressure of the arm cylinder 8. Also, when a load pressure of the arm cylinder 8 (a pressure in the bottom side hydraulic chamber) is lower than or equal to a desired back-pressure of the boom cylinder 7, the controller 30 actuates the pump/motor 14A as a hydraulic motor to decrease a pressure of the hydraulic oil at the supply side (a pressure in the rod side hydraulic chamber of the boom cylinder 7) down to the load pressure. Then, the controller 30 controls a displacement volume of the pump/motor 14A by adjusting a swash plate tilting angle of the pump/motor 14A by using a corresponding regulator so that a pressure in the bottom side hydraulic chamber of the boom cylinder 7 does not change suddenly. For example, when the controller 30 rotates the pump/motor 14A at a constant speed, the controller 30 can decrease a flow rate of the hydraulic oil flowing out of the bottom side hydraulic chamber of the boom cylinder 7 with a decrease in the displacement volume, and can increase a pressure (a back-pressure) in the bottom side hydraulic chamber of the boom cylinder 7 with a decrease in the displacement volume. By using this relationship, the controller 30 can control the pump/motor 14A so that a pressure of the hydraulic oil at the discharge side of the pump/motor 14A becomes the load pressure of the arm cylinder 8 and so that a pressure of the hydraulic oil at the supply side of the pump/motor 14A becomes the desired back-pressure. The controller 30 may control the pump/motor 14A according to a split flow control by using an aperture, instead of adjusting a swash plate tilting angle and a rotation speed of the pump/motor 14A, so that a pressure of the hydraulic oil at the discharge side of the pump/motor 14A becomes the load pressure of the arm cylinder 8 and so that a pressure of the hydraulic oil at the supply side of the pump/motor 14A becomes the desired back-pressure. In this case, the swash plate tilting angle of the pump/motor 14A may be fixed. In other controls described above and in other controls described below, instead of adjusting the swash plate tilting angle and the rotation speed, the controller 30 may carry out the split flow control by using an aperture in order to cause the pressure of the hydraulic oil of each of the discharge side and the supply side of the pump/motor 14A to be a desired pressure.

The pump/motor 14A acting as a hydraulic pump can discharge hydraulic oil with a pump load lower than that of a case where it pumps hydraulic oil from the hydraulic oil tank T. As a result, it can reduce a load of the engine 11 and can realize saving of energy. Also, the controller 30 decreases a discharge rate of the first hydraulic oil discharged from the first pump 14L by a discharge rate of the third hydraulic oil discharged from the pump/motor 14A. As a result, it can reduce a load of the engine 11 and can realize saving of energy, without changing a flow rate of the hydraulic oil flowing into the rod side hydraulic chamber of the arm cylinder 8.

Also, the pump/motor 14A acting as a hydraulic motor can assist the engine 11 and can supply a part of a driving force for rotating the first pump 14L. As a result, the controller 30 can increase a horsepower consumed by the first pump 14L, or the load of the engine 11 can be reduced, and thus, an amount of fuel injection can be reduced when it does not increase the horsepower consumed by the first pump 14L. A gray dashed-dotted line arrow in FIG. 16 depicts that the pump/motor 14A acting as a hydraulic pump uses a part of the output of the engine 11. A black dashed-dotted line arrow in FIG. 16 depicts that the pump/motor 14A acting as a hydraulic motor assists the engine 11 and supplies a part of a driving force for the first pump 14L.

Then, the controller 30 switches the selector valve 90 to the first position and directs the third hydraulic oil discharged from the pump/motor 14A toward the selector valve 91, and switches the selector valve 91 to the first position and directs the third hydraulic oil toward the arm cylinder 8.

Also, the controller 30 maintains the confluence valve 55 in the state of the second position so that the first hydraulic oil and the second hydraulic oil do not merge and that respective movements of the arm cylinder 8 and the bucket cylinder 9 are independently controlled by using the first hydraulic oil and the second hydraulic oil separately. In this case, a flow rate of the hydraulic oil flowing into the rod side hydraulic chamber of the arm cylinder 8 can be directly controlled by the first pump 14L. Thus, the flow rate does not need to be controlled by an aperture at the flow rate control valve 171. Similarly, a flow rate of the hydraulic oil flowing into the rod side hydraulic chamber of the bucket cylinder 9 can be directly controlled by the second pump 14R. Thus, the flow rate does not need to be controlled by an aperture at the flow rate control valve 173. Therefore, as in the case of the flow rate control valve 172 corresponding to the boom cylinder 7, the controller 30 may cause opening areas of the flow rate control valves 171, 173 to become maximum by increasing pilot pressures acting on the left side pilot ports of the flow rate control valves 171, 173 by using decompression valves, and thus may reduce the pressure loss at the flow rate control valves 171, 173.

Also, if the controller 30 cannot adjust an actuating speed of the boom cylinder 7 to a level corresponding to an amount of operation of the boom operating lever only by controlling the displacement volume of the pump/motor 14A, the controller 30 directs at least part of the hydraulic oil flowing out of the bottom side hydraulic chamber of the boom cylinder 7 toward the hydraulic oil tank T. Specifically, the controller 30 causes at least part of the hydraulic oil flowing out of the bottom side hydraulic chamber of the boom cylinder 7 to flow into the hydraulic oil tank T by shifting the selector valve 62 to an intermediate position between the first position and the second position, or by completely switching the selector valve 62 to the first position.

Figure 17:
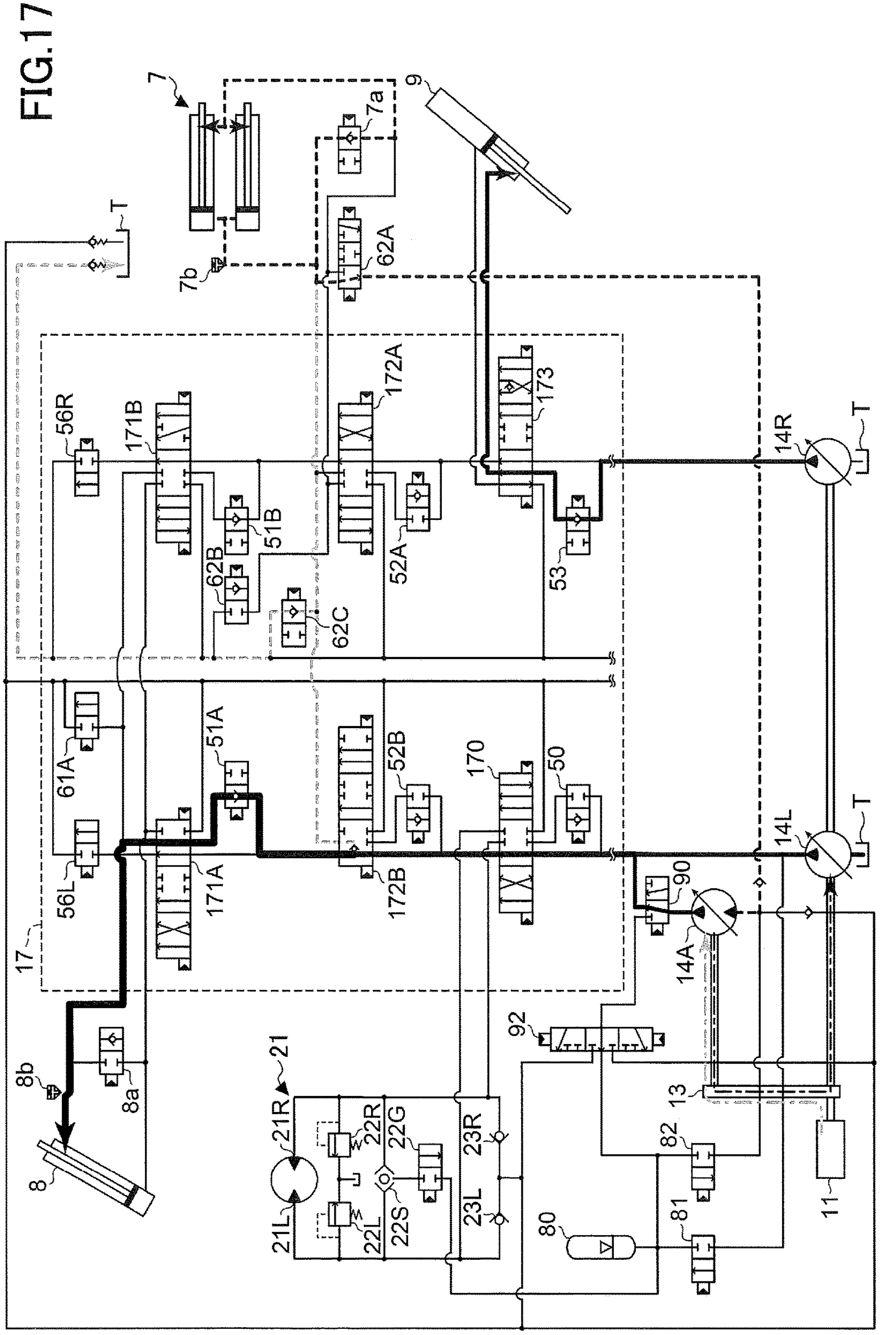
FIG. 17 shows a state of the hydraulic circuit in FIG. 3 when an earth removing movement is carried out along with a hydraulic-actuator-assist by a back-pressure regeneration.

Next, referring to FIG. 17, a state of the hydraulic circuit in FIG. 3 when an earth removing movement is carried out along with a hydraulic-actuator-assist by a back-pressure regeneration is explained. FIG. 17 shows a state of the hydraulic circuit in FIG. 3 when an earth removing movement is carried out along with an assist of the arm cylinder 8 by a back-pressure regeneration. Black thick solid lines in FIG. 17 depict flows of the hydraulic oil flowing into the hydraulic actuators. A width of the solid line increases with increase in flow rate. Black thick dotted lines and gray thick dotted lines in FIG. 17 depict flows of the hydraulic oil flowing out of the hydraulic actuators.

Specifically, when the controller 30 determines that the boom lowering operation has been carried out, the controller 30 causes the hydraulic oil flowing out of the bottom side hydraulic chamber of the boom cylinder 7 to flow into the rod side hydraulic chamber of the boom cylinder 7 by maximizing an opening area of the regeneration valve 7*a*.

Also, the controller 30 switches the selector valve 62A to the first position and directs the hydraulic oil flowing out of the bottom side hydraulic chamber of the boom cylinder 7 to the supply side of the pump/motor 14A. Also, the controller 30 shifts the flow rate control valve 172A to its neutral position by decreasing a pilot pressure acting on the right side pilot port of the flow rate control valve 172A by using a decompression valve independently of an amount of operation of the boom operating lever and thus blocks a flow of the hydraulic oil flowing from the bottom side hydraulic chamber of the boom cylinder 7 through the flow rate control valve 172A toward the hydraulic oil tank T. Also, the controller 30 switches the variable load check valve 52A to the second position and closes the communication between the second pump 14R and the flow rate control valve 172A.

Also, when the arm opening operation is carried out, the flow rate control valve 171A shifts to the right position in FIG. 17 in response to a pilot pressure generated depending on an amount of operation of the arm operating lever. Also, when the bucket opening operation is carried out, the flow rate control valve 173 shifts to the left position in FIG. 17 in response to a pilot pressure generated depending on an amount of operation of the bucket operating lever.

Also, when the controller 30 determines that the arm opening operation has been carried out, the controller 30 switches the variable load check valve 51A to the first position and opens the communication between the first pump 14L and the flow rate control valve 171A. Also, when the controller 30 determines that the bucket opening operation has been carried out, the controller 30 switches the variable load check valve 53 to the first position and opens the communication between the second pump 14R and the flow rate control valve 173.

Also, the controller 30 controls a discharge rate of the pump/motor 14A depending on an amount of operation of the boom operating lever and an opening area of the regeneration valve 7*a*. Specifically, when a load pressure of the arm cylinder 8 (a pressure in the rod side hydraulic chamber) is higher than a desired back-pressure of the boom cylinder 7 (a pressure in the bottom side hydraulic chamber), the controller 30 actuates the pump/motor 14A as a hydraulic pump to increase a pressure of the hydraulic oil at the supply side (a pressure in the bottom side hydraulic chamber of the boom cylinder 7) up to the load pressure of the arm cylinder 8. Also, when a load pressure of the arm cylinder 8 (a pressure in the rod side hydraulic chamber) is lower than or equal to a desired back-pressure of the boom cylinder 7, the controller 30 actuates the pump/motor 14A as a hydraulic motor to decrease a pressure of the hydraulic oil at the supply side (a pressure in the rod side hydraulic chamber of the boom cylinder 7) down to the load pressure. Then, the controller 30 controls a displacement volume of the pump/motor 14A by adjusting a swash plate tilting angle of the pump/motor 14A by using a corresponding regulator so that a pressure in the bottom side hydraulic chamber of the boom cylinder 7 does not change suddenly. For example, when the controller 30 rotates the pump/motor 14A at a constant speed, the controller 30 can decrease a flow rate of the hydraulic oil flowing out of the bottom side hydraulic chamber of the boom cylinder 7 with a decrease in the displacement volume, and can increase a pressure (a back-pressure) in the bottom side hydraulic chamber of the boom cylinder 7 with a decrease in the displacement volume. By using this relationship, the controller 30 can control the pump/motor 14A so that a pressure of the hydraulic oil at the discharge side of the pump/motor 14A becomes the load pressure of the arm cylinder 8 and so that a pressure of the hydraulic oil at the supply side of the pump/motor 14A becomes the desired back-pressure.

The pump/motor 14A acting as a hydraulic pump can discharge hydraulic oil with a pump load lower than that of a case where it pumps hydraulic oil from the hydraulic oil tank T. As a result, it can reduce a load of the engine 11 and can realize saving of energy. Also, the controller 30 decreases a discharge rate of the first hydraulic oil discharged from the first pump 14L by a discharge rate of the third hydraulic oil discharged from the pump/motor 14A. As a result, it can reduce a load of the engine 11 and can realize saving of energy, without changing a flow rate of the hydraulic oil flowing into the rod side hydraulic chamber of the arm cylinder 8.

Also, the pump/motor 14A acting as a hydraulic motor can assist the engine 11 and can supply a part of a driving force for rotating the first pump 14L. As a result, the controller 30 can increase a horsepower consumed by the first pump 14L, or can reduce a load of the engine 11 and thus can reduce an amount of fuel injection when it does not increase the horsepower consumed by the first pump 14L. A gray dashed-dotted line arrow in FIG. 17 depicts that the pump/motor 14A acting as a hydraulic pump uses a part of the output of the engine 11. A black dashed-dotted line arrow in FIG. 17 depicts that the pump/motor 14A acting as a hydraulic motor assists the engine 11 and supplies a part of a driving force for the first pump 14L.

Also, the controller 30 maintains the variable load check valve 51B in the state of the second position so that the first hydraulic oil and the second hydraulic oil do not merge and that respective movements of the arm cylinder 8 and the bucket cylinder 9 are independently controlled by using the first hydraulic oil and the second hydraulic oil separately. In this case, a flow rate of the hydraulic oil flowing into the rod side hydraulic chamber of the arm cylinder 8 can be directly controlled by the first pump 14L. Thus, the flow rate does not need to be controlled by an aperture at the flow rate control valve 171A. Similarly, a flow rate of the hydraulic oil flowing into the rod side hydraulic chamber of the bucket cylinder 9 can be directly controlled by the second pump 14R. Thus, the flow rate does not need to be controlled by an aperture at the flow rate control valve 173. Therefore, as in the case of the flow rate control valve 172A corresponding to the boom cylinder 7, the controller 30 may cause an opening area of the flow rate control valves 171A to become maximum by increasing a pilot pressure acting on the right side pilot port of the flow rate control valve 171A by using a decompression valve, may cause an opening area of the flow rate control valves 173 to become maximum by increasing a pilot pressure acting on the left side pilot port of the flow rate control valve 173 by using a decompression valve, and thus may reduce the pressure loss at the flow rate control valves 171A, 173.

If the controller 30 cannot adjust an actuating speed of the boom cylinder 7 to a level corresponding to an amount of operation of the boom operating lever only by controlling the displacement volume of the pump/motor 14A, the controller 30 directs at least part of the hydraulic oil flowing out of the bottom side hydraulic chamber of the boom cylinder 7 to the hydraulic oil tank T. Specifically, the controller 30 causes at least part of the hydraulic oil flowing out of the bottom side hydraulic chamber of the boom cylinder 7 to flow into the hydraulic oil tank T by shifting the selector valve 62C to an intermediate position between the first position and the second position, or by completely switching the selector valve 62C to the first position.

Also, the controller 30 may shift the flow rate control valve 172B to the left position in FIG. 17 by increasing a pilot pressure acting on the left side pilot port of the flow rate control valve 172B by using a decompression valve independently of an amount of operation of the boom operating lever, and thus may merge the hydraulic oil flowing out of the bottom side hydraulic chamber of the boom cylinder 7 into the first hydraulic oil.

Gray thick solid dotted lines in FIG. 17 depict that the hydraulic oil flowing out of the bottom side hydraulic chamber of the boom cylinder 7 is discharged into the hydraulic oil tank T when the selector valve 62C is shifted toward the first position, and that the hydraulic oil flowing out of the bottom side hydraulic chamber of the boom cylinder 7 merges into the first hydraulic oil at the flow rate control valve 172B when the flow rate control valve 172B is shifted to the left position.

As described above, the controller 30 additionally brings about following effects in addition to the effects described at [Earth removing movement along with an engine-assist by a back-pressure regeneration].

Specifically, the controller 30 determines whether to actuate the pump/motor 14A as a hydraulic pump or as a hydraulic motor, and varies a discharge pressure of the third hydraulic oil discharged from the pump/motor 14A by adjusting the displacement volume of the pump/motor 14A. Thus, independently of magnitude relationship between a load pressure of a hydraulic actuator as a supply destination of the third hydraulic oil and a desired back-pressure of the boom cylinder 7, it can cause the third hydraulic oil to flow into the hydraulic actuator. As a result, it can flexibly control a flow rate balance of the first hydraulic oil and the third hydraulic oil, and can allow regenerated energy to be effectively reused.

[Earth Removing Movement Along with a Pressure Accumulation in an Accumulator by a Back-pressure Regeneration]

Figure 18:
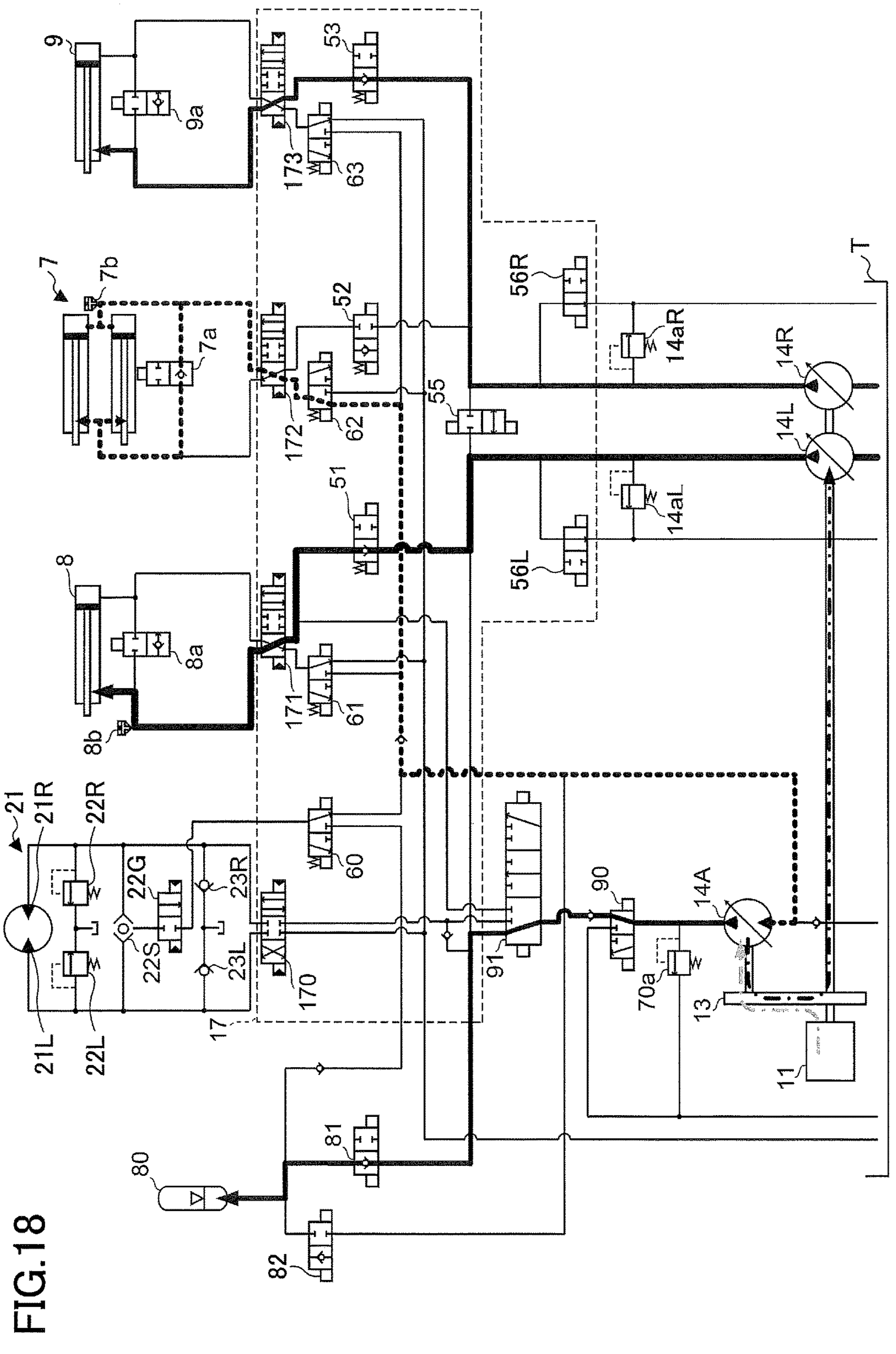
FIG. 18 shows a state of the hydraulic circuit in FIG. 2 when an earth removing movement is carried out along with a pressure accumulation in an accumulator by a back-pressure regeneration.

Next, referring to FIG. 18, a state of the hydraulic circuit in FIG. 2 when an earth removing movement is carried out along with a pressure accumulation in the accumulator 80 by a back-pressure regeneration is explained. FIG. 18 shows a state of the hydraulic circuit in FIG. 2 when an earth removing movement is carried out along with a pressure accumulation in the accumulator 80 by a back-pressure regeneration. Black thick solid lines in FIG. 18 depict flows of the hydraulic oil flowing into the hydraulic actuators. A width of the solid line increases with increase in flow rate. Black thick dotted lines in FIG. 18 depict a flow of the hydraulic oil flowing out of the hydraulic actuator.

When the boom lowering operation is carried out, the flow rate control valve 172 shifts to the left position in FIG. 18 in response to a pilot pressure generated depending on an amount of operation of the boom operating lever. Also, when the arm opening operation is carried out, the flow rate control valve 171 shifts to the left position in FIG. 18 in response to a pilot pressure generated depending on an amount of operation of the arm operating lever, and when the bucket opening operation is carried out, the flow rate control valve 173 shifts to the left position in FIG. 18 in response to a pilot pressure generated depending on an amount of operation of the bucket operating lever.

Then, when the controller 30 determines that the boom lowering operation has been carried out, the controller 30 causes the hydraulic oil flowing out of the bottom side hydraulic chamber of the boom cylinder 7 to flow into the rod side hydraulic chamber of the boom cylinder 7 by maximizing an opening area of the regeneration valve 7*a* as shown by the black thick dotted line.

Also, the controller 30 switches the selector valve 62 to the second position, and directs the hydraulic oil flowing out of the bottom side hydraulic chamber of the boom cylinder 7 to the supply side of the pump/motor 14A as shown by the black thick dotted line. Also, the controller 30 causes an opening area of the flow rate control valve 172 to become maximum by increasing a pilot pressure acting on the left side pilot port of the flow rate control valve 172 by using a decompression valve independently of an amount of operation of the boom operating lever, and reduces the pressure loss at the flow rate control valve 172. Also, the controller 30 switches the variable load check valve 52 to the second position and closes the communication between the second pump 14R and the flow rate control valve 172.

Also, the controller 30 controls a discharge rate of the pump/motor 14A depending on an amount of operation of the boom operating lever and an opening area of the regeneration valve 7*a*. Specifically, when the accumulator pressure is higher than a desired back-pressure of the boom cylinder 7 (a pressure in the bottom side hydraulic chamber), the controller 30 actuates the pump/motor 14A as a hydraulic pump to increase a pressure of the hydraulic oil at the supply side (a pressure in the bottom side hydraulic chamber of the boom cylinder 7) up to the accumulator pressure. Also, when the accumulator pressure is lower than or equal to a desired back-pressure of the boom cylinder 7, the controller 30 actuates the pump/motor 14A as a hydraulic motor to decrease a pressure of the hydraulic oil at the supply side (a pressure in the rod side hydraulic chamber of the boom cylinder 7) down to the accumulator pressure. Then, the controller 30 controls a displacement volume of the pump/motor 14A by adjusting a swash plate tilting angle of the pump/motor 14A by using a corresponding regulator so that a pressure in the bottom side hydraulic chamber of the boom cylinder 7 does not change suddenly. For example, when the controller 30 rotates the pump/motor 14A at a constant speed, the controller 30 can decrease a flow rate of the hydraulic oil flowing out of the bottom side hydraulic chamber of the boom cylinder 7 with a decrease in the displacement volume, and can increase a pressure (a back-pressure) in the bottom side hydraulic chamber of the boom cylinder 7 with a decrease in the displacement volume. By using this relationship, the controller 30 can control a pressure of the hydraulic oil so that a pressure of the hydraulic oil at the discharge side of the pump/motor 14A becomes the accumulator pressure and so that a pressure of the hydraulic oil at the supply side of the pump/motor 14A becomes the desired back-pressure.

The pump/motor 14A acting as a hydraulic pump can accumulate hydraulic oil in the accumulator 80 with a pump load lower than that of a case where it pumps hydraulic oil from the hydraulic oil tank T and accumulates it in the accumulator 80. As a result, it can reduce a load of the engine 11 and can realize saving of energy. Also, the pump/motor 14A acting as a hydraulic motor can assist the engine 11 and can supply a part of a driving force for rotating the first pump 14L. As a result, the controller 30 can increase a horsepower consumed by the first pump 14L, or, when it does not increase the horsepower consumed by the first pump 14L, a load of the engine 11 can be reduced, and thus, an amount of fuel injection can be reduced. A gray dashed-dotted line arrow in FIG. 18 depicts that the pump/motor 14A acting as a hydraulic pump uses a part of the output of the engine 11. A black dashed-dotted line arrow in FIG. 18 depicts that the pump/motor 14A acting as a hydraulic motor assists the engine 11 and supplies a part of a driving force for the first pump 14L.

Then, the controller 30 switches the selector valve 90 to the first position and directs the third hydraulic oil discharged from the pump/motor 14A toward the selector valve 91, and switches the selector valve 91 to the third position and directs the third hydraulic oil toward the accumulator 80. Also, the controller 30 switches the selector valve 81 to the first position and opens the communication between the pump/motor 14A and the accumulator 80. In this case, the controller 30 may block the communication between the first pump 14L and the accumulator 80 by using another selector valve.

Also, the controller 30 maintains the confluence valve 55 in the state of the second position so that the first hydraulic oil and the second hydraulic oil do not merge and respective movements of the arm cylinder 8 and the bucket cylinder 9 are independently controlled by using the first hydraulic oil and the second hydraulic oil separately. In this case, a flow rate of the hydraulic oil flowing into the rod side hydraulic chamber of the arm cylinder 8 can be directly controlled by the first pump 14L. Thus, the flow rate does not need to be controlled by an aperture at the flow rate control valve 171. Similarly, a flow rate of the hydraulic oil flowing into the rod side hydraulic chamber of the bucket cylinder 9 can be directly controlled by the second pump 14R. Thus, the flow rate does not need to be controlled by an aperture at the flow rate control valve 173. Therefore, as in the case of the flow rate control valve 172 corresponding to the boom cylinder 7, the controller 30 may cause opening areas of the flow rate control valves 171, 173 to become maximum by increasing pilot pressures acting on the left side pilot ports of the flow rate control valves 171, 173 by using decompression valves, and thus may reduce the pressure loss at the flow rate control valves 171, 173.

If the controller 30 cannot adjust an actuating speed of the boom cylinder 7 to a level corresponding to an amount of operation of the boom operating lever only by controlling the displacement volume of the pump/motor 14A, the controller 30 directs at least part of the hydraulic oil flowing out of the bottom side hydraulic chamber of the boom cylinder 7 to the hydraulic oil tank T. Specifically, the controller 30 causes at least part of the hydraulic oil flowing out of the bottom side hydraulic chamber of the boom cylinder 7 to flow into the hydraulic oil tank T by shifting the selector valve 62 to an intermediate position between the first position and the second position, or by completely switching the selector valve 62 to the first position.

Figure 19:
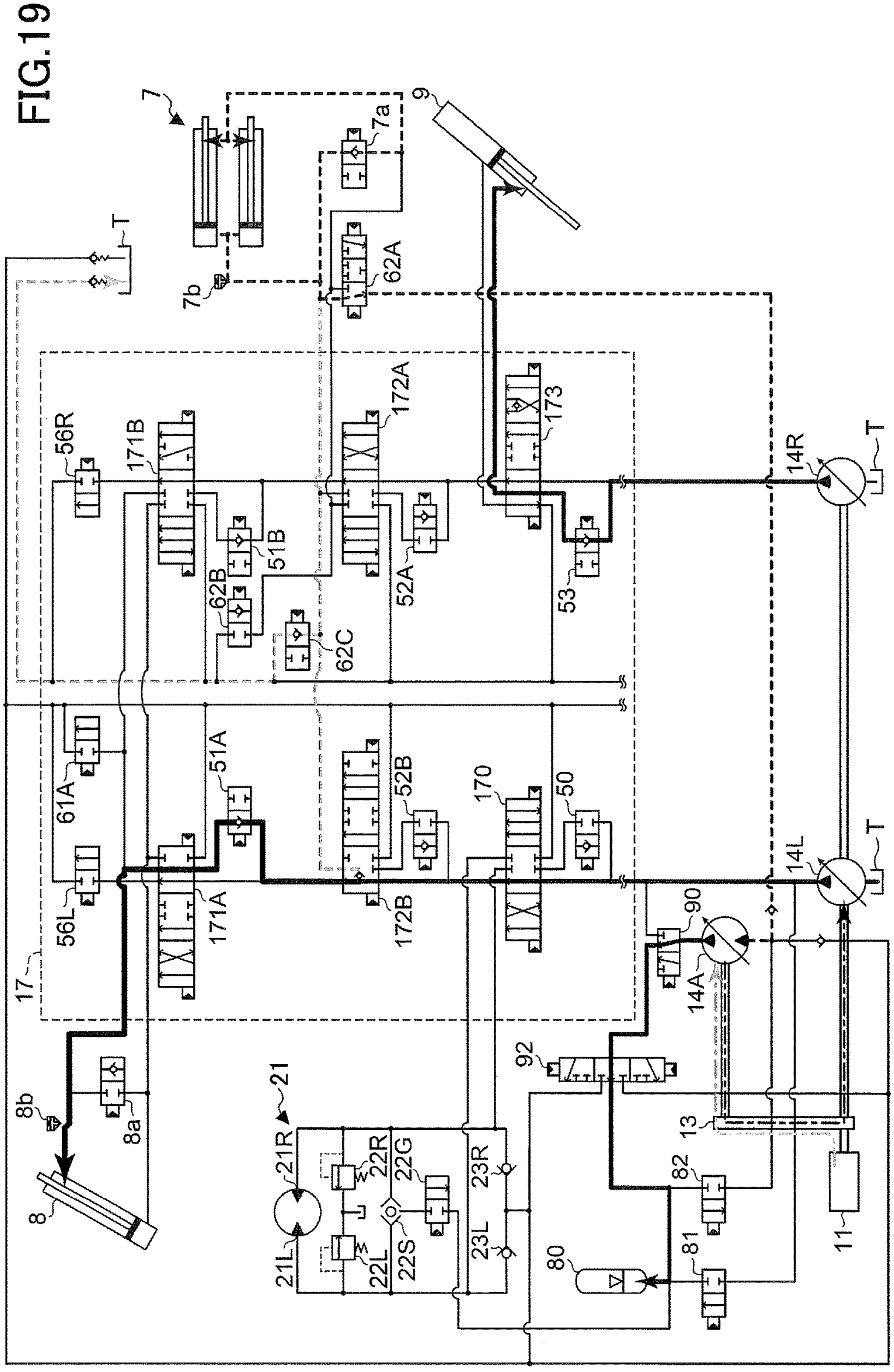
FIG. 19 shows a state of the hydraulic circuit in FIG. 3 when an earth removing movement is carried out along with a pressure accumulation in an accumulator by a back-pressure regeneration.

Next, referring to FIG. 19, a state of the hydraulic circuit in FIG. 3 when an earth removing movement is carried out along with a pressure accumulation in the accumulator 80 by a back-pressure regeneration is explained. FIG. 19 shows a state of the hydraulic circuit in FIG. 3 when an earth removing movement is carried out along with a pressure accumulation in the accumulator 80 by a back-pressure regeneration. Black thick solid lines in FIG. 19 depict flows of the hydraulic oil flowing into the hydraulic actuators. A width of the solid line increases with increase in flow rate. Black thick dotted lines and gray thick dotted lines in FIG. 19 depict flows of the hydraulic oil flowing out of the hydraulic actuators.

Specifically, when the controller 30 determines that the boom lowering operation has been carried out, the controller 30 causes the hydraulic oil flowing out of the bottom side hydraulic chamber of the boom cylinder 7 to flow into the rod side hydraulic chamber of the boom cylinder 7 by maximizing an opening area of the regeneration valve 7*a*.

Also, the controller 30 switches the selector valve 62A to the first position and directs the hydraulic oil flowing out of the bottom side hydraulic chamber of the boom cylinder 7 to the supply side of the pump/motor 14A. Also, the controller 30 shifts the flow rate control valve 172A to its neutral position by decreasing a pilot pressure acting on the right side pilot port of the flow rate control valve 172A by using a decompression valve independently of an amount of operation of the boom operating lever and thus blocks a flow of the hydraulic oil flowing from the bottom side hydraulic chamber of the boom cylinder 7 through the flow rate control valve 172A toward the hydraulic oil tank T. Also, the controller 30 switches the variable load check valve 52A to the second position and closes the communication between the second pump 14R and the flow rate control valve 172A.

Also, when the arm opening operation is carried out, the flow rate control valve 171A shifts to the right position in FIG. 19 in response to a pilot pressure generated depending on an amount of operation of the arm operating lever. Also, when the bucket opening operation is carried out, the flow rate control valve 173 shifts to the left position in FIG. 19 in response to a pilot pressure generated depending on an amount of operation of the bucket operating lever.

Also, when the controller 30 determines that the arm opening operation has been carried out, the controller 30 switches the variable load check valve 51A to the first position and opens the communication between the first pump 14L and the flow rate control valve 171A. Also, when the controller 30 determines that the bucket opening operation has been carried out, the controller 30 switches the variable load check valve 53 to the first position and opens the communication between the second pump 14R and the flow rate control valve 173.

Also, the controller 30 controls a discharge rate of the pump/motor 14A depending on an amount of operation of the boom operating lever and an opening area of the regeneration valve 7*a*. Specifically, when the accumulator pressure is higher than a desired back-pressure of the boom cylinder 7 (a pressure in the bottom side hydraulic chamber), the controller 30 actuates the pump/motor 14A as a hydraulic pump to increase a pressure of the hydraulic oil at the supply side (a pressure in the bottom side hydraulic chamber of the boom cylinder 7) up to the accumulator pressure. Also, when the accumulator pressure is lower than or equal to a desired back-pressure of the boom cylinder 7, the controller 30 actuates the pump/motor 14A as a hydraulic motor to decrease a pressure of the hydraulic oil at the supply side (a pressure in the rod side hydraulic chamber of the boom cylinder 7) down to the accumulator pressure. Then, the controller 30 controls a displacement volume of the pump/motor 14A by adjusting a swash plate tilting angle of the pump/motor 14A by using a corresponding regulator so that a pressure in the bottom side hydraulic chamber of the boom cylinder 7 does not change suddenly. For example, when the controller 30 rotates the pump/motor 14A at a constant speed, the controller 30 can decrease a flow rate of the hydraulic oil flowing out of the bottom side hydraulic chamber of the boom cylinder 7 with a decrease in the displacement volume, and can increase a pressure (a back-pressure) in the bottom side hydraulic chamber of the boom cylinder 7 with a decrease in the displacement volume. By using this relationship, the controller 30 can control the pump/motor 14A so that a pressure of the hydraulic oil at the discharge side of the pump/motor 14A becomes the accumulator pressure and so that a pressure of the hydraulic oil at the supply side of the pump/motor 14A becomes the desired back-pressure.

The pump/motor 14A acting as a hydraulic pump can accumulate hydraulic oil in the accumulator 80 with a pump load lower than that of a case where it pumps hydraulic oil from the hydraulic oil tank T and accumulates it in the accumulator 80. As a result, it can reduce a load of the engine 11 and can realize saving of energy. Also, the pump/motor 14A acting as a hydraulic motor can assist the engine 11 and can supply a part of a driving force for rotating the first pump 14L. As a result, the controller 30 can increase a horsepower consumed by the first pump 14L, or, when it does not increase the horsepower consumed by the first pump 14L, a load of the engine 11 can be reduced and thus an amount of fuel injection can be reduced. A gray dashed-dotted line arrow in FIG. 19 depicts that the pump/motor 14A acting as a hydraulic pump uses a part of the output of the engine 11. A black dashed-dotted line arrow in FIG. 19 depicts that the pump/motor 14A acting as a hydraulic motor assists the engine 11 and supplies a part of a driving force for the first pump 14L.

Also, the controller 30 maintains the variable load check valve 51B in the state of the second position so that the first hydraulic oil and the second hydraulic oil do not merge and so that respective movements of the arm cylinder 8 and the bucket cylinder 9 are independently controlled by using the first hydraulic oil and the second hydraulic oil separately. In this case, a flow rate of the hydraulic oil flowing into the rod side hydraulic chamber of the arm cylinder 8 can be directly controlled by the first pump 14L. Thus, the flow rate does not need to be controlled by an aperture at the flow rate control valve 171A. Similarly, a flow rate of the hydraulic oil flowing into the rod side hydraulic chamber of the bucket cylinder 9 can be directly controlled by the second pump 14R. Thus, the flow rate does not need to be controlled by an aperture at the flow rate control valve 173. Therefore, as in the case of the flow rate control valve 172A corresponding to the boom cylinder 7, the controller 30 may cause an opening area of the flow rate control valves 171A to become maximum by increasing a pilot pressure acting on the right side pilot port of the flow rate control valve 171A by using a decompression valve, may cause an opening area of the flow rate control valves 173 to become maximum by increasing a pilot pressure acting on the left side pilot port of the flow rate control valve 173 by using a decompression valve, and thus may reduce the pressure loss at the flow rate control valves 171A, 173.

If the controller 30 cannot adjust an actuating speed of the boom cylinder 7 to a level corresponding to an amount of operation of the boom operating lever only by controlling the displacement volume of the pump/motor 14A, the controller 30 directs at least part of the hydraulic oil flowing out of the bottom side hydraulic chamber of the boom cylinder 7 to the hydraulic oil tank T. Specifically, the controller 30 causes at least part of the hydraulic oil flowing out of the bottom side hydraulic chamber of the boom cylinder 7 to flow into the hydraulic oil tank T by shifting the selector valve 62C to an intermediate position between the first position and the second position, or by completely switching the selector valve 62C to the first position.

Also, the controller 30 may shift the flow rate control valve 172B to the left position in FIG. 19 by increasing a pilot pressure acting on the left side pilot port of the flow rate control valve 172B by using a decompression valve independently of an amount of operation of the boom operating lever, and thus may merge the hydraulic oil flowing out of the bottom side hydraulic chamber of the boom cylinder 7 into the first hydraulic oil.

Gray thick solid dotted lines in FIG. 19 depict that the hydraulic oil flowing out of the bottom side hydraulic chamber of the boom cylinder 7 is discharged into the hydraulic oil tank T when the selector valve 62C is shifted toward the first position, and that the hydraulic oil flowing out of the bottom side hydraulic chamber of the boom cylinder 7 merges into the first hydraulic oil at the flow rate control valve 172B when the flow rate control valve 172B is shifted to the left position.

As described above, the controller 30 additionally brings about following effects in addition to the effects described at [Earth Removing Movement Along with an Engine-assist by a Back-pressure Regeneration] and [Earth Removing Movement Along with a Hydraulic-actuator-assist by a Back-pressure Regeneration].

Specifically, the controller 30 determines whether to actuate the pump/motor 14A as a hydraulic pump or as a hydraulic motor, and varies a discharge pressure of the third hydraulic oil discharged from the pump/motor 14A by adjusting the displacement volume of the pump/motor 14A. Thus, independently of magnitude relationship between a pressure in the accumulator 80 as a supply destination of the third hydraulic oil and a desired back-pressure of the boom cylinder 7, it can cause the third hydraulic oil to flow into the accumulator 80. As a result, it can flexibly accumulate potential energy of the boom 4 in the accumulator 80 as hydraulic energy, and can allow the accumulated hydraulic energy to be effectively reused. Also, when the boom lowering operation has been carried out, and when there is no need to assist the engine 11 or when there is no need to increase an actuating speed of the arm cylinder 8, it can accumulate potential energy of the boom 4 in the accumulator 80 as hydraulic energy. Also, even if the potential energy of the boom 4 is small, it can accumulate the potential energy in the accumulator 80 as hydraulic energy.

[Boom-lowering-swing-decelerating Movement Along with a Pressure Accumulation in an Accumulator]

Figure 20:
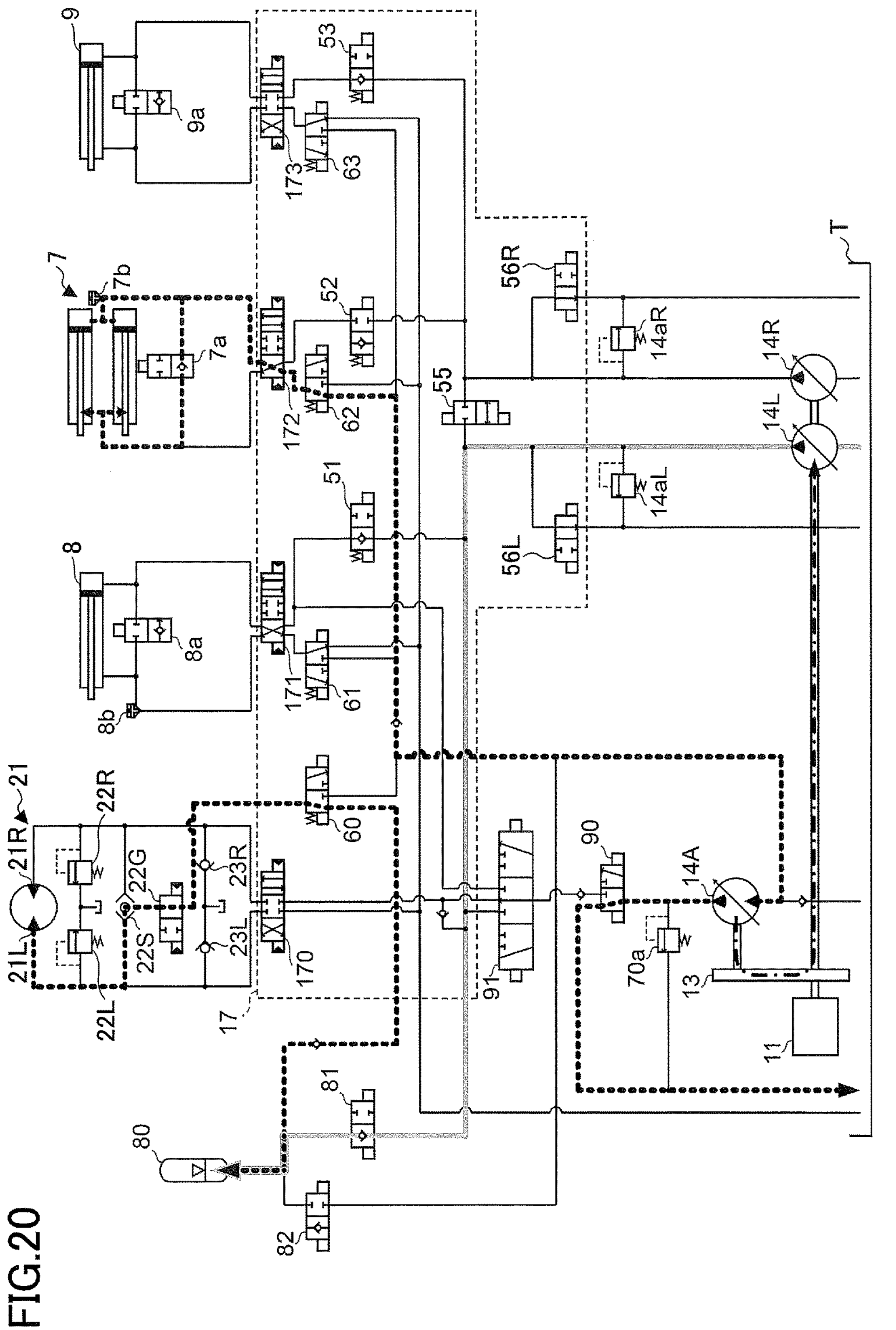
FIG. 20 shows a state of the hydraulic circuit in FIG. 2 when a boom-lowering-swing-decelerating movement is carried out along with a pressure accumulation in an accumulator.

Next, referring to FIG. 20, a state of the hydraulic circuit in FIG. 2 when a boom-lowering-swing-decelerating movement is carried out along with a pressure accumulation in the accumulator 80 is explained. FIG. 20 shows a state of the hydraulic circuit in FIG. 2 when a boom-lowering-swing-decelerating movement is carried out along with a pressure accumulation in the accumulator 80. Gray thick solid lines in FIG. 20 depict a flow of the hydraulic oil flowing into the accumulator 80. Black thick dotted lines in FIG. 20 depict flows of the hydraulic oil flowing out of the hydraulic actuators.

A boom-lowering-swing-decelerating movement is a movement including a boom lowering and a swing decelerating. The upper swing body 3 continues to swing by inertia, and deceleration of the upper swing body 3 is controlled by adjusting a pressure of the hydraulic oil at a discharge port side of the hydraulic swing motor 21. Specifically, the deceleration rate of the upper swing body 3 increases with increase in the pressure of the hydraulic oil at the discharge port side.

When a boom lowering operation is carried out, the flow rate control valve 172 shifts to the left position in FIG. 20 in response to a pilot pressure generated depending on an amount of operation of the boom operating lever.

Then, when the controller 30 determines that the boom lowering operation has been carried out, the controller 30 causes the hydraulic oil flowing out of the bottom side hydraulic chamber of the boom cylinder 7 to flow into the rod side hydraulic chamber of the boom cylinder 7 by maximizing an opening area of the regeneration valve 7*a* as shown by the black thick dotted line.

Also, the controller 30 switches the selector valve 62 to the second position, and directs the hydraulic oil flowing out of the bottom side hydraulic chamber of the boom cylinder 7 to the supply side of the pump/motor 14A as shown by the thick dotted line. Also, the controller 30 causes an opening area of the flow rate control valve 172 to become maximum by increasing a pilot pressure acting on the left side pilot port of the flow rate control valve 172 by using a decompression valve independently of an amount of operation of the boom operating lever, and reduces the pressure loss at the flow rate control valve 172. Also, the controller 30 switches the variable load check valve 52 to the second position and closes the communication between the second pump 14R and the flow rate control valve 172.

Also, the controller 30 controls a discharge rate of the pump/motor 14A depending on an amount of operation of the boom operating lever and an opening area of the regeneration valve 7*a*. Specifically, the controller 30 actuates the pump/motor 14A as a hydraulic motor and controls a displacement volume of the pump/motor 14A by controlling a corresponding regulator so that a pressure in the bottom side hydraulic chamber of the boom cylinder 7 does not change suddenly. Then, the controller 30 causes the third hydraulic oil discharged from the pump/motor 14A to flow into the hydraulic oil tank T by switching the selector valve 90 to the second position.

The controller 30 may direct the third hydraulic oil discharged from the pump/motor 14A toward the accumulator 80 or toward a hydraulic actuator in motion. Specifically, when the accumulator pressure is higher than a desired back-pressure of the boom cylinder 7 (a pressure in the bottom side hydraulic chamber), the controller 30 actuates the pump/motor 14A as a hydraulic pump to increase a pressure of the hydraulic oil at the supply side (a pressure in the bottom side hydraulic chamber of the boom cylinder 7) up to the accumulator pressure. Also, when the accumulator pressure is lower than or equal to the desired back-pressure of the boom cylinder 7, the controller 30 actuates the pump/motor 14A as a hydraulic motor to decrease a pressure of the hydraulic oil at the supply side (a pressure in the rod side hydraulic chamber of the boom cylinder 7) down to the accumulator pressure. Then, the controller 30 controls a displacement volume of the pump/motor 14A by adjusting a swash plate tilting angle of the pump/motor 14A by using a corresponding regulator so that a pressure in the bottom side hydraulic chamber of the boom cylinder 7 does not change suddenly. Also, the controller 30 switches the selector valve 90 to the first position and directs the third hydraulic oil discharged from the pump/motor 14A toward the selector valve 91, and switches the selector valve 91 to the third position and directs the third hydraulic oil toward the accumulator 80. In this way, the controller 30 controls the pump/motor 14A so that a pressure of the hydraulic oil at the discharge side of the pump/motor 14A becomes the accumulator pressure and so that a pressure of the hydraulic oil at the supply side of the pump/motor 14A becomes the desired back-pressure. The same goes for a case where it directs the third hydraulic oil toward the hydraulic actuator in motion.

The pump/motor 14A acting as a hydraulic pump can discharge hydraulic oil with a pump load lower than that of a case where it pumps hydraulic oil from the hydraulic oil tank T. As a result, it can reduce a load of the engine 11 and can realize saving of energy. Also, the pump/motor 14A acting as a hydraulic motor can assist the engine 11 by generating a rotary torque and can supply a part of a driving force for rotating the first pump 14L. As a result, the controller 30 can increase a horsepower consumed by the first pump 14L, or, when it does not increase the horsepower consumed by the first pump 14L, a load of the engine 11 can be reduced and thus an amount of fuel injection can be reduced.

In the example of FIG. 20, when the controller 30 actuates the pump/motor 14A as a hydraulic motor and discharges the third hydraulic oil to the hydraulic oil tank T, the controller 30 causes the first hydraulic oil discharged from the first pump 14L actuated by the rotary torque of the pump/motor 14A to flow into the accumulator 80. In this case, the controller 30 controls a displacement volume of the first pump 14L by using a corresponding regulator so that a discharge pressure of the first pump 14L becomes the accumulator pressure. Also, the controller 30 switches the selector valve 81 to the first position to open the communication between the first pump 14L and the accumulator 80. A black dashed-dotted line arrow in FIG. 20 depicts that the rotary torque of the pump/motor 14A acting as a hydraulic motor actuates the first pump 14L, a gray thick solid line in FIG. 20 depicts that the first hydraulic oil of the first pump 14L, which is actuated by a rotary torque including a rotary torque generated by the pump/motor 14A, flows into the accumulator 80.

If the controller 30 cannot adjust an actuating speed of the boom cylinder 7 to a level corresponding to an amount of operation of the boom operating lever only by controlling the displacement volume of the pump/motor 14A, the controller 30 directs at least part of the hydraulic oil flowing out of the bottom side hydraulic chamber of the boom cylinder 7 to the hydraulic oil tank T. Specifically, the controller 30 causes at least part of the hydraulic oil flowing out of the bottom side hydraulic chamber of the boom cylinder 7 to flow into the hydraulic oil tank T by shifting the selector valve 62 to an intermediate position between the first position and the second position, or by completely switching the selector valve 62 to the first position.

Also, when a swing decelerating movement is carried out, the flow rate control valve 170 shifts to the neutral position in FIG. 20 because a pilot pressure decreases with decrease in an amount of operation of the swing operating lever.

Then, when the controller 30 determines that a swing decelerating movement has been carried out, the controller 30 opens the regeneration valve 22G and causes the hydraulic oil at the side of the discharge port 21L of the hydraulic swing motor 21 to flow toward the selector valve 60 as shown by the black thick dotted line. Also, the controller 30 switches the selector valve 60 to the second position and causes the hydraulic oil flowing out of the hydraulic swing motor 21 to flow into the accumulator 80 as shown by the black thick dotted line.

Also, the controller 30 adjusts an opening area of the regeneration valve 22G or an opening area of the selector valve 60 at the second position, depending on a pressure of the hydraulic oil at the side of the discharge port 21L of the hydraulic swing motor 21 and the accumulator pressure. Then, the controller 30 controls a pressure of the hydraulic oil at the side of the discharge port 21L so as to generate a desired braking torque for stopping a swing of the upper swing body 3. The controller 30 detects a pressure of the hydraulic oil at each of two ports 21L, 21R of the hydraulic swing motor 21 based on an output of a swing pressure sensor (not shown).

Also, when the controller 30 determines that a swing decelerating movement has been carried out, it may switch the selector valve 60 to the first position and may cause the hydraulic oil flowing out of the hydraulic swing motor 21 to flow into the supply side of the pump/motor 14A. In this case, the controller 30 generates a brake pressure by rotating the pump/motor 14A. Thus, there is no need to constrict a flow of the hydraulic oil flowing out of the hydraulic swing motor 21 by an aperture, and thus the controller 30 does not generate pressure loss at the aperture. Thus, it reduces or prevents inertial energy of the upper swing body 3 from being wasted as heat energy, and therefore reduces or prevents energy loss.

Figure 21:
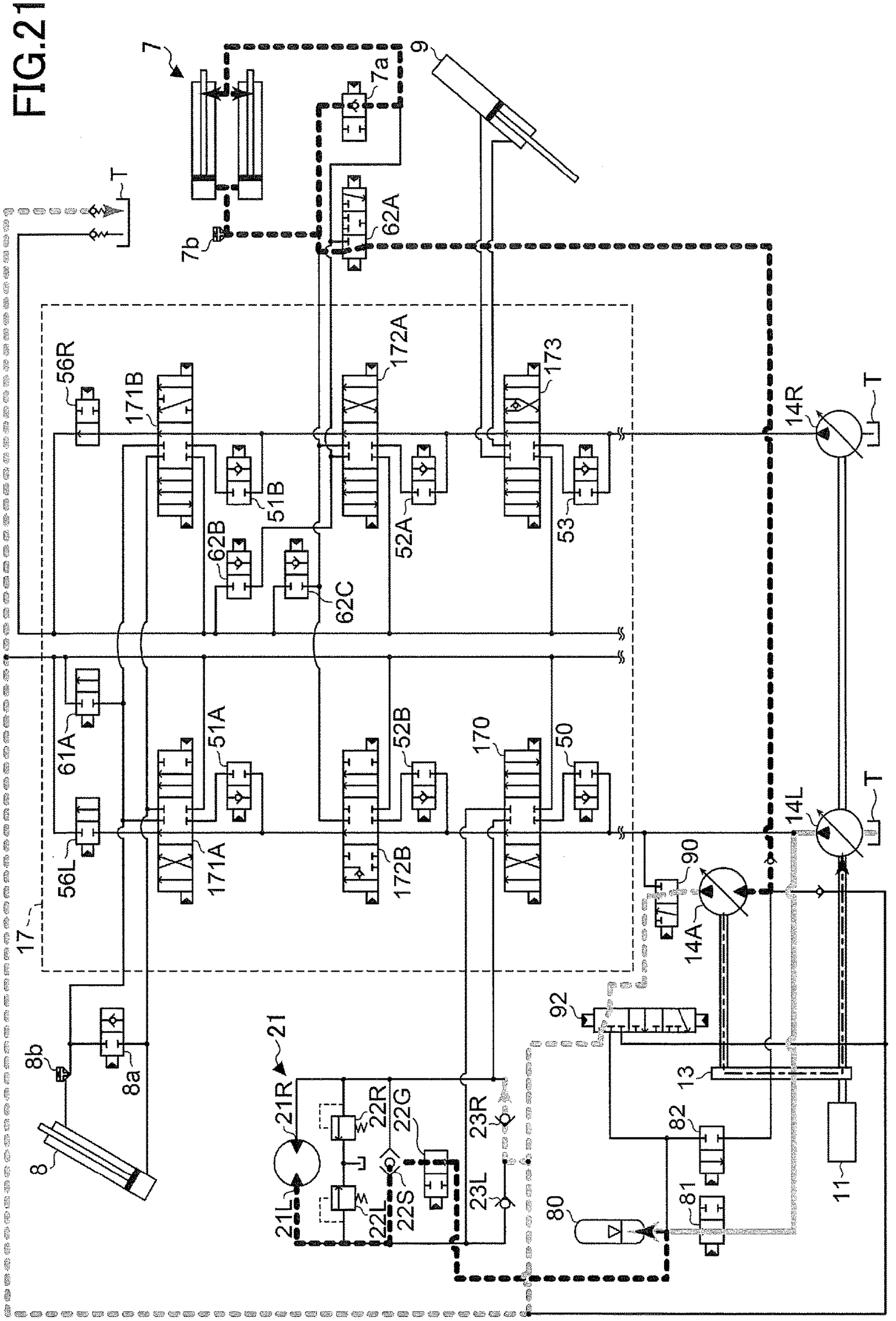
FIG. 21 shows a state of the hydraulic circuit in FIG. 3 when a boom-lowering-swing-decelerating movement is carried out along with a pressure accumulation in an accumulator.

Next, referring to FIG. 21, a state of the hydraulic circuit in FIG. 3 when a boom-lowering-swing-decelerating movement is carried out along with a pressure accumulation in the accumulator 80 is explained. FIG. 21 shows a state of the hydraulic circuit in FIG. 3 when a boom-lowering-swing-decelerating movement is carried out along with a pressure accumulation in the accumulator 80. Gray thick solid lines in FIG. 21 depict a flow of the hydraulic oil flowing into the accumulator 80. Black thick dotted lines in FIG. 21 depict flows of the hydraulic oil flowing out of the hydraulic actuators.

Specifically, when the controller 30 determines that the boom lowering operation has been carried out, the controller 30 causes the hydraulic oil flowing out of the bottom side hydraulic chamber of the boom cylinder 7 to flow into the rod side hydraulic chamber of the boom cylinder 7 by maximizing an opening area of the regeneration valve 7*a*.

Also, the controller 30 switches the selector valve 62A to the first position and directs the hydraulic oil flowing out of the bottom side hydraulic chamber of the boom cylinder 7 to the supply side of the pump/motor 14A. Also, the controller 30 shifts the flow rate control valve 172A to its neutral position by decreasing a pilot pressure acting on the right side pilot port of the flow rate control valve 172A by using a decompression valve independently of an amount of operation of the boom operating lever and thus blocks a flow of the hydraulic oil flowing from the bottom side hydraulic chamber of the boom cylinder 7 through the flow rate control valve 172A toward the hydraulic oil tank T. Also, the controller 30 switches the variable load check valve 52A to the second position and closes the communication between the second pump 14R and the flow rate control valve 172A.

Also, the controller 30 controls a discharge rate of the pump/motor 14A depending on an amount of operation of the boom operating lever and an opening area of the regeneration valve 7*a*. Specifically, the controller 30 actuates the pump/motor 14A as a hydraulic motor and controls a displacement volume of the pump/motor 14A by controlling a corresponding regulator so that a pressure in the bottom side hydraulic chamber of the boom cylinder 7 does not change suddenly. Then, the controller 30 directs the third hydraulic oil discharged from the pump/motor 14A toward the replenishing mechanism of the hydraulic swing motor 21 by switching the selector valve 90 to the second position and switching the selector valve 92 to the first position.

The controller 30 may direct the third hydraulic oil discharged from the pump/motor 14A toward the accumulator 80 or toward a hydraulic actuator in motion. Specifically, when the accumulator pressure is higher than a desired back-pressure of the boom cylinder 7 (a pressure in the bottom side hydraulic chamber), the controller 30 actuates the pump/motor 14A as a hydraulic pump to increase a pressure of the hydraulic oil at the supply side (a pressure in the bottom side hydraulic chamber of the boom cylinder 7) up to the accumulator pressure. Also, when the accumulator pressure is lower than or equal to the desired back-pressure of the boom cylinder 7, the controller 30 actuates the pump/motor 14A as a hydraulic motor to decrease a pressure of the hydraulic oil at the supply side (a pressure in the rod side hydraulic chamber of the boom cylinder 7) down to the accumulator pressure. Then, the controller 30 controls a displacement volume of the pump/motor 14A by adjusting a swash plate tilting angle of the pump/motor 14A by using a corresponding regulator so that a pressure in the bottom side hydraulic chamber of the boom cylinder 7 does not change suddenly. Also, the controller 30 switches the selector valve 90 to the first position, switches the selector valve 92 to the second position, and thus causes the third hydraulic oil discharged from the pump/motor 14A to flow into the accumulator 80. In this way, the controller 30 controls the pump/motor 14A so that a pressure of the hydraulic oil at the discharge side of the pump/motor 14A becomes the accumulator pressure and so that a pressure of the hydraulic oil at the supply side of the pump/motor 14A becomes the desired back-pressure. The same goes for a case where it directs the third hydraulic oil toward the hydraulic actuator in motion.

The pump/motor 14A acting as a hydraulic pump can discharge hydraulic oil with a pump load lower than that of a case where it pumps hydraulic oil from the hydraulic oil tank T. As a result, it can reduce a load of the engine 11 and can realize saving of energy. Also, the pump/motor 14A acting as a hydraulic motor can assist the engine 11 by generating a rotary torque and can supply a part of a driving force for rotating the first pump 14L. As a result, the controller 30 can increase a horsepower consumed by the first pump 14L, or, when it does not increase the horsepower consumed by the first pump 14L, a load of the engine 11 can be reduced and thus an amount of fuel injection can be reduced.

In the example of FIG. 21, when the controller 30 actuates the pump/motor 14A as a hydraulic motor and discharges the third hydraulic oil to the hydraulic oil tank T, the controller 30 causes the first hydraulic oil discharged from the first pump 14L actuated by the rotary torque of the pump/motor 14A to flow into the accumulator 80. In this case, the controller 30 controls a displacement volume of the first pump 14L by using a corresponding regulator so that a discharge pressure of the first pump 14L becomes the accumulator pressure. Also, the controller 30 switches the selector valve 81 to the first position to open the communication between the first pump 14L and the accumulator 80. A black dashed-dotted line arrow in FIG. 21 depicts that the rotary torque of the pump/motor 14A acting as a hydraulic motor actuates the first pump 14L, a gray thick solid line in FIG. 21 depicts that the first hydraulic oil of the first pump 14L actuated by a torque including a rotary torque generated by the pump/motor 14A flows into the accumulator 80.

If the controller 30 cannot adjust an actuating speed of the boom cylinder 7 to a level corresponding to an amount of operation of the boom operating lever only by controlling the displacement volume of the pump/motor 14A, the controller 30 directs at least part of the hydraulic oil flowing out of the bottom side hydraulic chamber of the boom cylinder 7 to the hydraulic oil tank T. Specifically, the controller 30 causes at least part of the hydraulic oil flowing out of the bottom side hydraulic chamber of the boom cylinder 7 to flow into the hydraulic oil tank T by shifting the selector valve 62C to an intermediate position between the first position and the second position, or by completely switching the selector valve 62C to the first position.

Also, when a swing decelerating movement is carried out, the flow rate control valve 170 shifts to the neutral position in FIG. 21 because a pilot pressure decreases with decrease in an amount of operation of the swing operating lever.

Then, when the controller 30 determines that a swing decelerating movement has been carried out, the controller 30 opens the regeneration valve 22G and causes the hydraulic oil at the side of the discharge port 21L of the hydraulic swing motor 21 to flow into the accumulator 80 as shown by the black thick dotted line.

Also, the controller 30 adjusts an opening area of the regeneration valve 22G depending on a pressure of the hydraulic oil at the side of the discharge port 21L of the hydraulic swing motor 21 and the accumulator pressure. Then, the controller 30 controls a pressure of the hydraulic oil at the side of the discharge port 21L so as to generate a desired braking torque for stopping a swing of the upper 7 swing body 3.

In the example of FIG. 21, when a swing decelerating movement is carried out, a pressure of the hydraulic oil at the side of the suction port 21R becomes negative, and thus the check valve 23R in the replenishing mechanism supplies hydraulic oil to the side of the suction port 21R. In this case, the controller 30 switches the selector valve 90 to the second position and switches the selector valve 92 to the first position to direct the third hydraulic oil discharged from the pump/motor 14A toward the replenishing mechanism of the hydraulic swing motor 21. Thus, the check valve 23R can supply the third hydraulic oil discharged from the pump/motor 14A to the side of the suction port 21R as shown by the gray thick dotted line. As a result, even if it becomes difficult to suck hydraulic oil up from the hydraulic oil tank T due to a decrease in an amount of hydraulic oil in the hydraulic oil tank T, the replenishing mechanism can supply hydraulic oil to the hydraulic swing motor 21 without generating cavitation. An amount of hydraulic oil in the hydraulic oil tank T decreases with increase in an amount of hydraulic oil accumulated in the accumulator 80.

As described above, the controller 30 additionally brings about following effects in addition to the effects described at [Earth removing movement along with an engine-assist by a back-pressure regeneration], [Earth Removing Movement Along with a Hydraulic-actuator-assist by a Back-pressure Regeneration], and [Earth Removing Movement Along with a Pressure Accumulation in an Accumulator by a Back-pressure Regeneration].

Specifically, when a boom-lowering-swing-decelerating movement is carried out, the controller 30 causes the hydraulic oil flowing out of the hydraulic swing motor 21 to flow into the accumulator 80, and causes the hydraulic oil flowing out of the bottom side hydraulic chamber of the boom cylinder 7 to flow into the supply side of the pump/motor 14A. Thus, the shovel according to the present embodiment can accumulate hydraulic energy generated during a swing deceleration in the accumulator 80, and use hydraulic energy generated during a boom lowering for assisting the engine 11. Also, it can actuate the first pump 14L by assisting the engine 11 by using the hydraulic energy generated during a boom lowering, and can accumulate the hydraulic energy generated during a boom lowering in the accumulator 80 by causing the first hydraulic oil discharged from the first pump 14L to flow into the accumulator 80. As a result, even if the hydraulic energy generated during a boom lowering is large, it can regenerate all the hydraulic energy by increasing a discharge rate of the first pump 14L and thus increasing a horsepower consumed by the first pump 14L.

[Swing Decelerating Movement Along with an Engine-assist and a Pressure Accumulation in an Accumulator]

Figure 22:
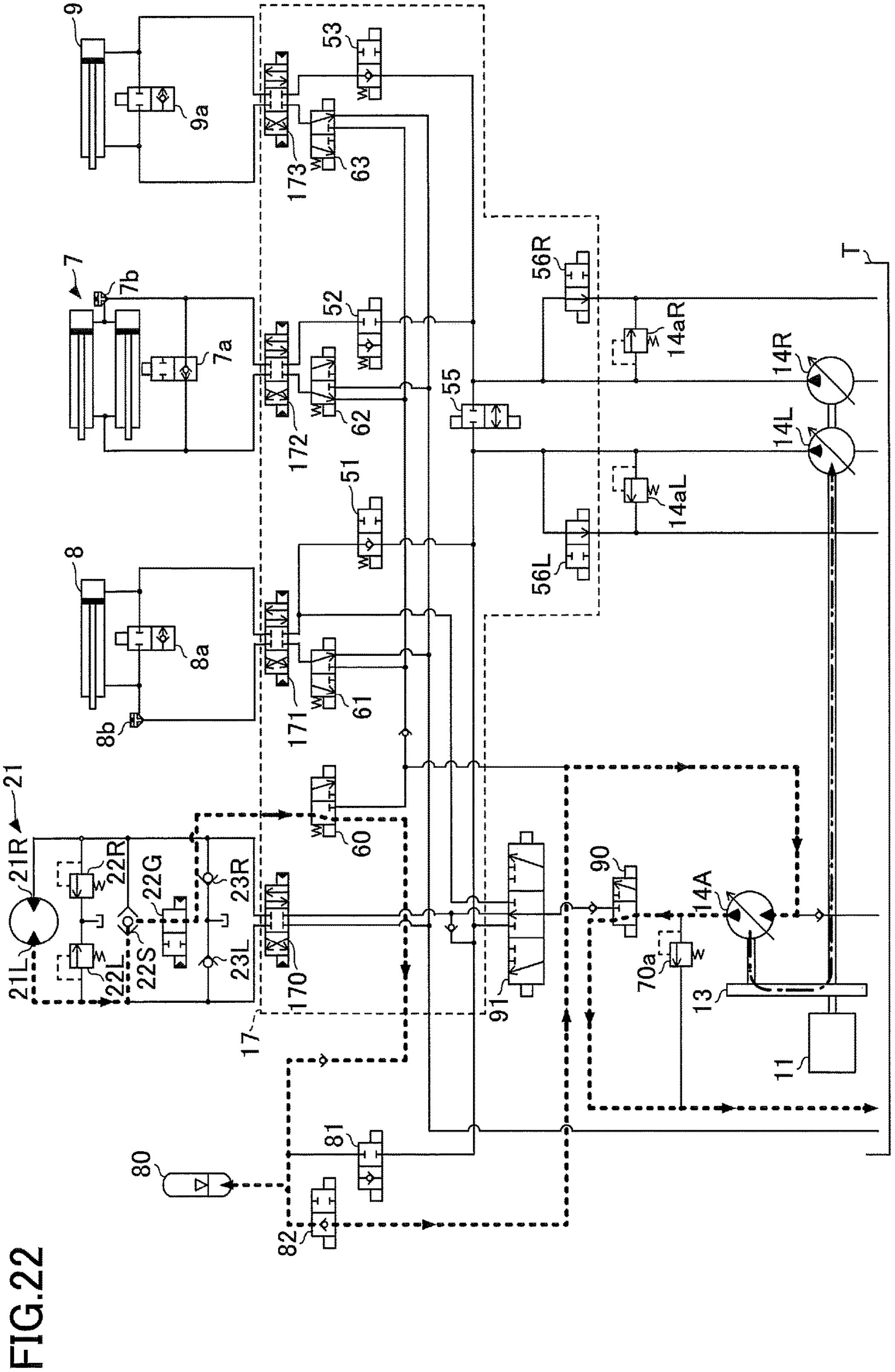
FIG. 22 shows a state of the hydraulic circuit in FIG. 2 when a swing-decelerating movement is carried out along with an engine-assist and a pressure accumulation in an accumulator.

Next, referring to FIG. 22, a state of the hydraulic circuit in FIG. 2 when a swing-decelerating movement is carried out along with an assist of an engine 11 and a pressure accumulation in an accumulator 80 is explained. FIG. 22 shows a state of the hydraulic circuit in FIG. 2 when a swing-decelerating movement is carried out along with an assist of an engine 11 and a pressure accumulation in an accumulator 80. Black thick dotted lines in FIG. 22 depict a flow of the hydraulic oil flowing out of the hydraulic swing motor 21. A black dashed-dotted line arrow depicts that an engine-assist torque is transmitted to the rotation axis of the engine 11 via the gearbox 13. FIG. 22 shows an example of a case in which the port 21L of the hydraulic swing motor 21 is a discharge port. However, the following explanation can be also applied to a case in which the port 21R is a discharge port.

The swing-decelerating movement is a movement in which swing speed of the upper swing body 3 is decelerated. Even if the swing operating lever is returned to the neutral position, the upper swing body 3 continues to rotate by inertia. In this case, the deceleration of the upper swing body 3 is controlled by adjusting a pressure of the hydraulic oil at a discharge port side of the hydraulic swing motor 21 (hereinafter, referred to as "hydraulic swing flowing-out pressure"). Specifically, the deceleration rate of the upper swing body 3 increases with increase in the hydraulic swing flowing-out pressure.

When a swing-decelerating movement is carried out, the flow rate control valve 170 shifts to the neutral position as shown in FIG. 22 because a pilot pressure decreases with decrease in an amount of operation of the swing operating lever. As a result, the hydraulic oil flowing into the hydraulic swing motor 21 from at least one of the first pump 14L, the second pump 14R, and the pump/motor 14A is blocked.

Then, when the controller 30 determines that the swing-decelerating movement has been carried out, the controller 30 opens the regeneration valve 22G and causes the hydraulic oil at the discharge port side of the hydraulic swing motor 21 to flow toward the selector valve 60 as shown by the black thick dotted line. Also, the controller 30 switches the selector valve 60 to the second position and causes the hydraulic oil flowing out of the hydraulic swing motor 21 to flow into the accumulator 80 as shown by the black thick dotted line. Furthermore, the controller 30 switches the selector valve 82 to the first position to open a communication between the accumulator 80 and the pump/motor 14A, and causes the hydraulic oil flowing out of the hydraulic swing motor 21 to also flow into the pump/motor 14A as shown by the black thick dotted line. As a result, the hydraulic oil flowing out of the hydraulic swing motor 21 flows into each of the accumulator 80 and the pump/motor 14A at the same pressure.

Also, the controller 30 adjusts an opening area of the regeneration valve 22G depending on the swing flowing-out pressure as an output of a swing pressure sensor and on the accumulator pressure as an output of an accumulator sensor. The controller 30 further controls the swing flowing-out pressure in order to generate a desired braking torque for stopping the swing of the upper swing body 3. In the present embodiment, in order to cause the swing flowing-out pressure to become slightly lower than a relief pressure or a cracking pressure of the relief valve 22L (hereinafter, referred to as "swing brake target pressure"), the controller 30 generates a pressure difference, between the front and the back of the regeneration valve 22G, equal to a difference between the swing brake target pressure and the accumulator pressure. The swing brake target pressure may be predefined in an internal memory or may be calculated each time based on outputs of various sensors Specifically, the controller 30 decreases the opening area of the regeneration valve 22G with increase of a difference between the swing brake target pressure and the accumulator pressure, or with decrease of the accumulator pressure, and increases the opening area of the regeneration valve 22G with decrease of a difference between the swing brake target pressure and the accumulator pressure, or with increase of the accumulator pressure. When the accumulator pressure is greater than the swing brake target pressure, the controller 30 may release the hydraulic oil at the port 21L side from the relief valve 22L to the hydraulic oil tank T by closing the regeneration valve 22G.

Also, the controller 30 calculates an engine assist torque, which the pump/motor 14A generates, based on a displacement volume of the pump/motor 14A and the accumulator pressure. The displacement volume of the pump/motor 14A is calculated from, for example, an output of a swash plate tilting angle sensor (not shown). The controller 30 adjusts the displacement volume, or the swash plate tilting angle, of the pump/motor 14A in such a way that the engine assist torque becomes an assist torque target value. The assist torque target value may be predefined in the internal memory, etc., or may be calculated each time based on outputs of various sensors.

Specifically, the controller 30 increases the swash plate tilting angle in order to increase the displacement volume when the engine assist torque is less than the assist torque target value. This is to cause the engine assist torque to be closer to the assist torque target value. A flow rate of the hydraulic oil flowing into the pump/motor 14A increases with increase of the displacement volume. As a result, a flow rate of the hydraulic oil flowing into the accumulator 80 decreases. Also, the controller 30 decreases the swash plate tilting angle in order to decrease the displacement volume when the engine assist torque is greater than the assist torque target value. This is to keep the engine assist torque equal to or less than the assist torque target value. A flow rate of the hydraulic oil flowing into the pump/motor 14A decreases with decrease of the displacement volume. As a result, a flow rate of the hydraulic oil flowing into the accumulator 80 increases. The accumulator 80 increases the accumulator pressure with increase of the volume of the internally accumulated hydraulic oil, in order to decrease a difference between the swing brake target pressure and the accumulator pressure. When the difference between the swing brake target pressure and the accumulator pressure decreases, the controller 30 increases the opening area of the regeneration valve 22G in order to maintain the swing flowing-out pressure at the swing brake target pressure. This is to maintain the desired brake torque.

In this case, a brake torque $T_B$ is expressed by the following equation (1). $D_m$ represents the displacement volume of the hydraulic swing motor 21 (motor volume) and $P_m$ represents the swing flowing-out pressure.

[Math 1]

$$T_B=D_mP_m \tag{1}$$

A flow rate of the hydraulic oil flowing out of the hydraulic swing motor 21 (hereinafter, referred to as "swing flowing-out rate") $Q_m$ is expressed by the following equation (2).

[Math 2]

$$Q_m=D_m\omega \tag{2}$$

The swing flowing-out rate $Q_m$ is also a flow rate of the hydraulic oil flowing through the regeneration valve 22G, and thus, $Q_m$ is also expressed by the following equation (3). $c_{ma}$ represents a flow coefficient, $A_{ma}$ represents an opening area of the regeneration valve 22G, $P_{acc}$ represents an accumulator pressure, and ρ represents a density of the hydraulic oil.

[Math 3]

$$Q_m = c_{ma}A_{ma}\sqrt{\frac{2(P_m - P_{acc})}{\rho}} \tag{3}$$

A hydraulic system is controllable, and a state of the hydraulic system can be freely changed by controlling the opening area of the regeneration valve 22G. Therefore, in the present embodiment, the controller 30 causes the swing flowing-out pressure $P_m$ to become a desired swing brake target pressure by adjusting the opening area $A_{ma}$ of the regeneration valve 22G. In the following, this adjustment is referred to as "swing flowing-out pressure feedback control".

When the selector valve 82 is moved to the first position in order to open a communication between the accumulator 80 and the upstream side of the pump/motor 14A, a part or all of the hydraulic oil flowing out of the hydraulic swing motor 21 flows into the upstream side of the pump/motor 14A. At this time, a balance formula of the hydraulic oil flow rates is expressed by the following equation (4). $Q_{acc}$ represents a flow rate of the hydraulic oil flowing into the accumulator 80, and $Q_{P3}$ represents a flow rate of the hydraulic oil flowing into the pump/motor 14A.

[Math 4]

$$Q_m = Q_{acc} + Q_{P3} \tag{4}$$

The flow rate of the hydraulic oil flowing into the pump/motor 14, $Q_{P3}$ is expressed by the following equation (5) by using a displacement volume of the pump/motor 14A, $V_{P3}$ and the number of engine rotations, $\omega_e$.

[Math 5]

$$Q_{P3} = \omega_e V_{P3} \tag{5}$$

As described above, the hydraulic system is controllable, and a state of the hydraulic system can be freely changed by controlling the opening area of the regeneration valve 22G and by controlling the displacement volume of the pump/motor 14A. Therefore, in the present embodiment, the controller 30 causes the engine assist torque $V_{P3}$ to become the desired assist torque target value by adjusting the displacement volume of the pump/motor 14A, $V_{P3}$. In the following, this adjustment is referred to as "engine assist torque feedback control".

In this way, it is possible for the controller 30 to control the swing flowing-out pressure and the engine assist torque to be desired values by carrying out the swing flowing-out pressure feedback control and the engine assist torque feedback control, simultaneously and independently.

At this time, the engine assist torque $T_{P3}$, which the pump/motor 14A generates according to the flow rate $Q_{P3}$ of the hydraulic oil flowing into the pump/motor 14A, is expressed by the following equation (6).

[Math 6]

$$T_{P3} = V_{P3} P_{acc} \tag{6}$$

On the other hand, an allowable maximum value of the engine assist torque $T_{P3}$ that the pump/motor 14A can generate is determined by load of the engine 11 at the time of determination. Therefore, there is a case in which the controller 30 cannot supply all of the hydraulic oil flowing out of the hydraulic swing motor 21 to the pump/motor 14A. In this case, the hydraulic oil, of the hydraulic oil flowing out of the hydraulic swing motor 21, that cannot be supplied to the pump/motor 14A is accumulated in the accumulator 80. The accumulator pressure $P_{acc}$ increases with accumulation of the hydraulic oil, and thus, a pressure difference between the accumulator pressure $P_{acc}$ and the swing brake target pressure decreases. The controller 30 increases the opening area of the regeneration valve 22G according to the decrease of the pressure difference in order to maintain a pressure of the hydraulic oil flowing out of the hydraulic swing motor 21 at the swing brake target pressure.

As described above, it is possible for the controller 30 to cause a part of the hydraulic oil flowing out of the hydraulic swing motor 21 during the swing deceleration to be accumulated in the accumulator 80, and to supply the remaining part directly to the upstream side of the pump/motor 14A without accumulating in the accumulator 80. It is possible to generate a desired engine assist torque and to realize, for example, saving of energy by decreasing a brake drag torque of the engine 11. It is possible for the controller 30 to use inertial energy of the upper swing body 3 more efficiently than a case in which the remaining part of the hydraulic oil is accumulated in the accumulator 80 first, and then, is released to the upstream side of the pump/motor 14A, in order to facilitate saving of energy.

Figure 23:
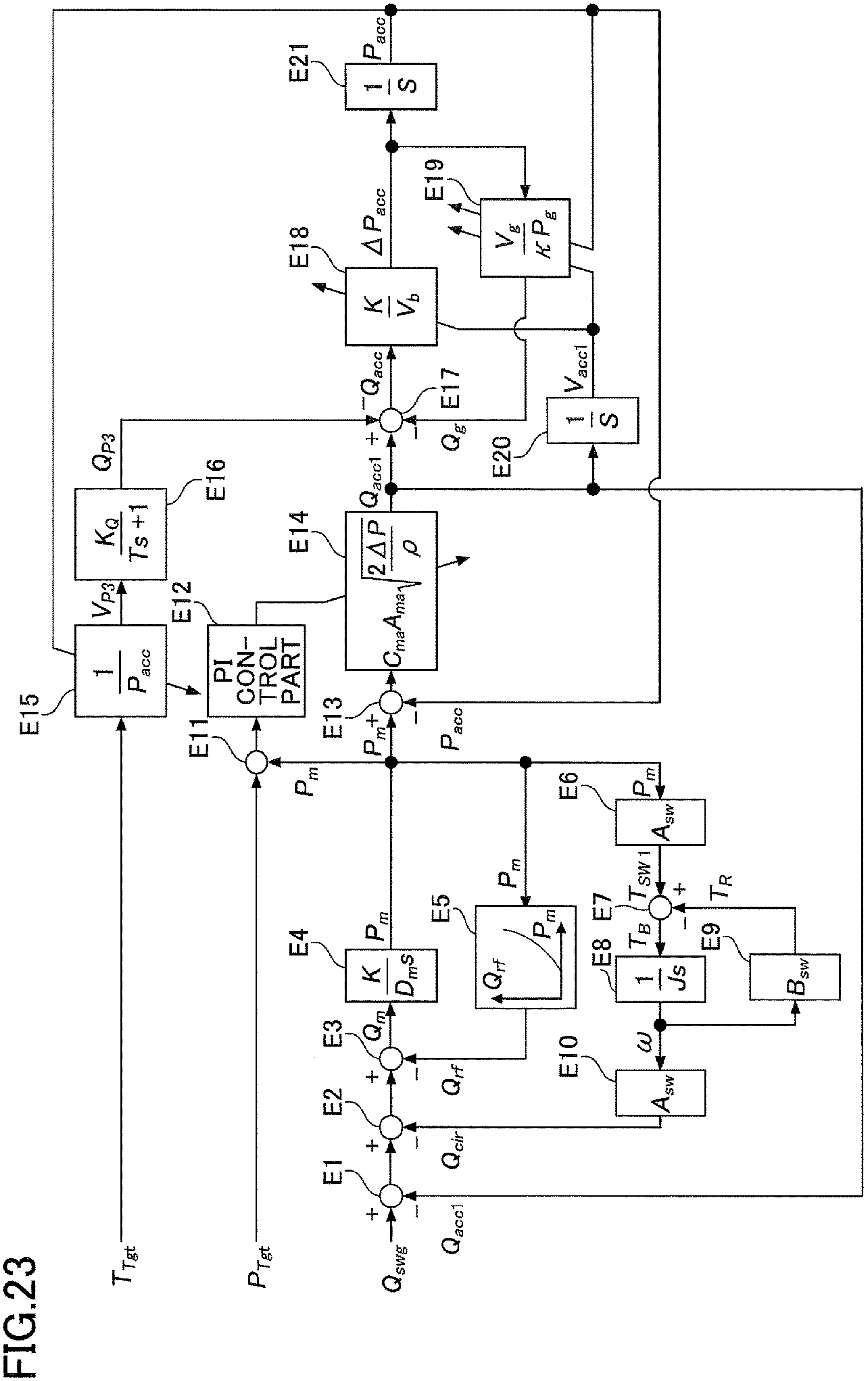
FIG. 23 is a control block line diagram showing control flow of a hydraulic system.

Next, referring to FIG. 23, a control flow, in which the accumulator pressure $P_{acc}$ is determined according to an assist torque target value $T_{Tgt}$, a swing brake target pressure $P_{Tgt}$, and a swing flowing-in rate $Q_{swg}$, is described. The swing flowing-in rate $Q_{swg}$ represents a flow rate of the hydraulic oil flowing into the hydraulic swing motor 21 from a control valve 17. FIG. 23 is a control block line diagram showing the control flow of a hydraulic system. As an example, a case of decelerating the hydraulic swing motor 21 is described.

FIG. 23 shows that the swing flowing-out rate $Q_m$ is obtained by subtracting a flow rate $Q_{acc1}$ flowing into the accumulator 80 (including the flow rate $Q_{P3}$ flowing into the pump/motor 14A), a flow rate $Q_{cir}$ circulating in the hydraulic swing motor 21, and a flow rate $Q_{rf}$ flowing out through the relief valves 22L and 22R, from the swing flowing-in rate $Q_{swg}$. Inaddition to the above, FIG. 23 shows that the swing flowing-out pressure $P_m$ is calculated from the swing flowing-out rate $Q_m$.

Specifically, FIG. 23 shows that the swing flowing-out rate $Q_m$ is calculated by subtracting the flow rate $Q_{acc1}$, the flow rate $Q_{cir}$, and the flow rate $Q_{rf}$ at calculation elements E1, E2, E3, respectively, from the swing flowing-in rate $Q_{swg}$. Also, FIG. 23 shows that the swing flowing-out rate $Q_m$ is converted to the swing flowing-out pressure $P_m$ via a calculation element E4 representing a compression volume. K, $D_m$, and s in the calculation element E4 represent a bulk modulus (volume elasticity), a displacement volume of the hydraulic swing motor 21, and a Laplace operator, respectively.

Further, FIG. 23 shows that the swing flowing-out pressure $P_m$ is converted to the flow rate $Q_{rf}$ via a calculation element E5 representing relief valves 22L and 22R, and that the swing flowing-out pressure $P_m$ is converted to the flow rate $Q_{cir}$ via calculation elements E6 to E10. Specifically, FIG. 23 shows that the swing flowing-out pressure $P_m$ is converted to a torque $T_{SW1}$ via a calculation element E6 representing a pressure receiving area $A_{SW}$ of the hydraulic swing motor 21; the brake torque $T_B$ is calculated by subtracting a resistance torque $T_R$ from the torque $T_{SW1}$ at a calculation element E7; and the brake torque $T_B$ is converted to an angular velocity ω of the hydraulic swing motor 21 via a calculation element E8 representing an inertia of the hydraulic swing motor 21. J and s in the calculation element E8 represent a moment of inertia and a Laplace operator, respectively. Furthermore, FIG. 23 shows that the angular velocity ω is converted to the resistance torque $T_R$ via a calculation element E9 representing a viscous resistance $B_{SW}$ of the hydraulic oil in the hydraulic swing motor 21, and that the angular velocity ω is converted to the flow rate $Q_{cir}$ via a calculation element E10 representing the pressure receiving area of the hydraulic swing motor 21.

Also, the controller 30 reads the swing brake target pressure $P_{Tgt}$ predefined in the internal memory, etc., and causes the swing flowing-out pressure $P_m$ to become the swing brake target pressure $P_{Tgt}$ by adjusting the opening area of the regeneration valve 22G.

FIG. 23 shows that a difference between the swing brake target pressure $P_{Tgt}$ and the swing flowing-out pressure $P_m$ is calculated at a calculation element E11 and that the difference is input to a calculation element (PI control part) E12. Further, FIG. 23 shows that the swing flowing-out pressure $P_m$ is converted to the flow rate $Q_{acc1}$ via calculation elements E13 and E14. The flow rate $Q_{acc1}$ corresponds to a flow rate flowing into the accumulator 80 when the flow rate $Q_{P3}$ flowing into the pump/motor 14A is zero. $C_{ma}$, $A_{ma}$, ΔP, and ρ in the calculation element E14 represent a flow coefficient, an opening area of the regeneration valve 22G, a pressure difference between the front and the back of the regeneration valve 22G ($P_m$–$P_{acc}$), and a fluid density, respectively.

Specifically, FIG. 23 shows that a difference is calculated from the swing flowing-out pressure $P_m$ and the pressure $P_{acc}$ at the calculation element E13, and that the difference is converted to the flow rate $Q_{acc1}$ via the calculation element E14 representing a metering valve of the regeneration valve 22G.

Further, the controller 30 calculates the assist torque target value $T_{Tgt}$ based on outputs of various sensors, and causes the engine assist torque $T_{P3}$ that the pump/motor 14A generates to become the assist torque target value $T_{Tgt}$ by adjusting the displacement volume $V_{P3}$ of the pump/motor 14A.

FIG. 23 shows that the assist torque target value $T_{Tgt}$ is converted to the flow rate $Q_{P3}$ via calculation elements E15 and E16. Specifically, FIG. 23 shows that the displacement volume $V_{P3}$ of the pump/motor 14A is calculated by dividing the assist torque target value $T_{Tgt}$ by the accumulator pressure $P_{acc}$ at the calculation element E15, and that the displacement volume $V_{P3}$ is converted to the flow rate $Q_{P3}$ flowing into the pump/motor 14A via the calculation element E16 representing a first-order lag. KQ, T, and s in the calculation element E16 represent a proportional gain, a time constant, and a Laplace operator, respectively.

The flow rate $Q_{acc}$ changes when the displacement volume $V_{P3}$ of the pump/motor 14A changes. As a result, the accumulator pressure $P_{acc}$, the flow rate $Q_{acc1}$ and the swing flowing-out pressure $P_m$ also change, which would cause the brake torque $T_B$ of the hydraulic swing motor 21 to change if nothing is done. Therefore, the controller 30 causes the swing flowing-out pressure $P_m$ to become a desired pressure by adjusting the opening area $A_{ma}$ of the regeneration valve 22G.

FIG. 23 shows that the flow rate $Q_{acc1}$ is converted to the accumulator pressure $P_{acc}$ via calculation elements E17 to E21. Specifically, FIG. 23 shows that the flow rate $Q_{acc}$ is calculated by subtracting the flow rate $Q_{P3}$ and a flow rate $Q_g$ from the flow rate $Q_{acc1}$ at the calculation element E17. The flow rate $Q_g$ represents a flow rate generated by a volume change of nitrogen gas in the accumulator 80.

FIG. 23 also shows that the flow rate $Q_{acc}$ is converted to a pressure change rate $\Delta P_{acc}$ via the calculation element E18 representing hydraulic oil in the accumulator 80. K and $V_b$ in the calculation element E18 represent a bulk modulus (volume elasticity) and a volume of the hydraulic oil in the accumulator 80, respectively.

FIG. 23 also shows that the pressure change rate $\Delta P_{acc}$ is converted to the flow rate $Q_g$ via the calculation element E19 representing a nitrogen gas in the accumulator 80. K, $V_g$, and $P_g$ (=$P_{acc}$) in the calculation element E19 represent a specific heat ratio, a nitrogen gas volume, and a nitrogen gas pressure, respectively.

FIG. 23 also shows that the flow rate $Q_{acc1}$ is integrated and converted to a volume $V_{acc1}$ at the calculation element E20, and that the volume $V_{acc1}$ is used for adjusting the calculation element E18 and the calculation element E19. FIG. 23 also shows that the accumulator pressure $P_{acc}$ is additionally used for adjusting the calculation element E19. FIG. 23 also shows that the pressure change rate $\Delta P_{acc}$ is integrated and converted to the accumulator pressure $P_{acc}$ at the calculation element E21.

Figure 24:
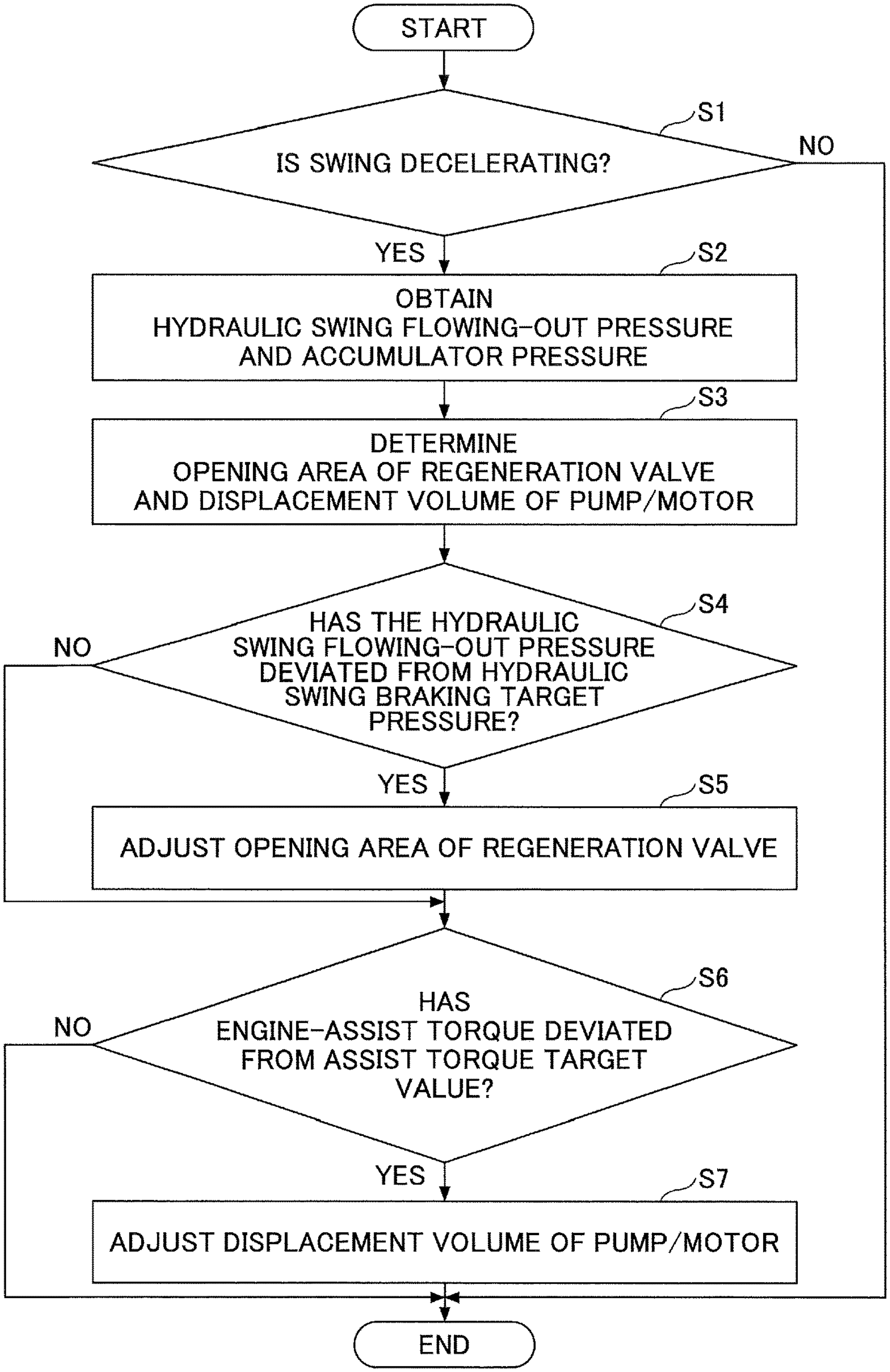
FIG. 24 is a flowchart showing flow of a swing-decelerating process.

Next, referring to FIG. 24, a process is described, in which, during swing deceleration, the controller 30 adjusts the opening area of the regeneration valve 22G in order to generate a desired brake torque and adjusts the displacement volume of the pump/motor 14A in order to generate a desired engine-assist torque (hereinafter, referred to as "swing decelerating process"). FIG. 24 is a flowchart showing a flow of the swing decelerating process. The controller 30 carries out the swing decelerating process repeatedly at a predetermined control cycle.

At first, the controller 30 determines whether the swing is decelerating (step S1). In the present embodiment, the controller 30 determines whether the swing is decelerating based on an output of the operating pressure sensor corresponding to the swing operating lever.

When it is determined that the swing is decelerating (YES in step S1), the controller 30 obtains the swing flowing-out pressure and the accumulator pressure (step S2). In the present embodiment, the controller 30 obtains the swing flowing-out pressure based on an output of the swing pressure sensor, and obtains the accumulator pressure based on an output of the accumulator pressure sensor.

Then, the controller 30 determines the opening area of the regeneration valve 22G and the displacement volume of the pump/motor 14A (step S3). In the present embodiment, the controller 30 causes the swing flowing-out pressure to be matched with the swing brake target pressure by determining the opening area of the regeneration valve 22G based on a pressure difference between the accumulator pressure and the swing brake target pressure. The controller 30 also causes the engine assist torque generated by the pump/motor 14A to be matched with the assist torque target value by determining the displacement volume of the pump/motor 14A based on the accumulator pressure and the assist torque target value.

The controller 30 also determines whether the swing flowing-out pressure has deviated from the swing brake target pressure (step S4). When it is determined that the swing flowing-out pressure has deviated from the swing brake target pressure (YES in step S4), the controller 30 adjusts the opening area of the regeneration valve 22G (step S5).

In the present embodiment, by using the swing flowing-out pressure feedback control, the controller 30 increases the opening area of the regeneration valve 22G when the swing flowing-out pressure output from the swing pressure sensor exceeds the swing brake target pressure, and decreases the opening area of the regeneration valve 22G when the swing flowing-out pressure output from the swing pressure sensor becomes less than the swing brake target pressure.

Further, the controller 30 determines whether the engine-assist torque has deviated from the assist torque target value (step S6). When it is determined that the engine-assist torque has deviated from the assist torque target value (YES in step S6), the controller 30 adjusts the displacement volume of the pump/motor 14A (step S7).

In the present embodiment, by using the engine assist torque feedback control, the controller 30 calculates the engine-assist torque based on the accumulator pressure and the swash plate tilting angle of the pump/motor 14A. When the engine-assist torque exceeds the assist torque target value, the controller 30 decreases the displacement area of the pump/motor 14A. When the engine-assist torque becomes less than the assist torque target value, the controller 30 increases the displacement area of the pump/motor 14A.

In this way, by monitoring the swing flowing-out pressure and the accumulator pressure, and by adjusting the opening area of the regeneration valve 22G and the displacement volume of the pump/motor 14A, the controller 30 maintains the desired brake torque and the desired engine-assist torque.

Also, by maintaining the desired engine-assist torque, it is possible for the controller 30 to prevent excessively increasing the engine-assist torque and adversely affecting the engine 11.

Figure 25:
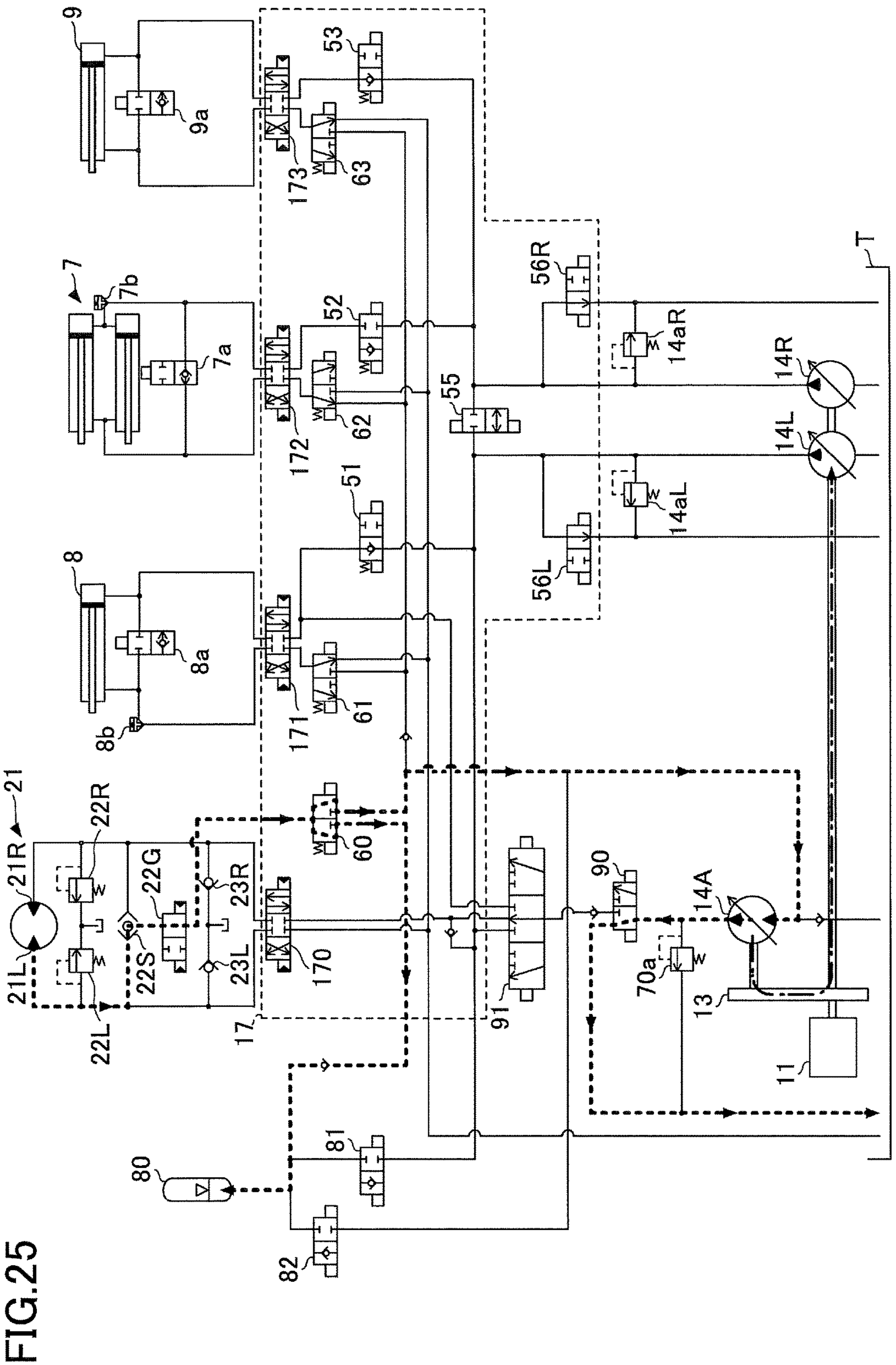
FIG. 25 shows a state of the hydraulic circuit in FIG. 2 when a swing-decelerating movement is carried out along with an engine-assist and a pressure accumulation in an accumulator.

Next, referring to FIG. 25, another example of a state of the hydraulic circuit in FIG. 2 when a swing-decelerating movement is carried out along with an assist of an engine 11 and a pressure accumulation in an accumulator 80 is explained. FIG. 25 shows another example of a state of the hydraulic circuit in FIG. 2 when a swing-decelerating movement is carried out along with an assist of an engine 11 and a pressure accumulation in an accumulator 80. Black thick dotted lines in FIG. 25 depict a flow of the hydraulic oil flowing out of the hydraulic swing motor 21. A black dashed-dotted line arrow depicts that an engine-assist torque is transmitted to the rotation axis of the engine 11 via the gearbox 13. FIG. 25 shows an example of a case in which the port 21L of the hydraulic swing motor 21 is a discharge port. However, the following explanation can be also applied to a case in which the port 21R is a discharge port.

A state shown in FIG. 25 is different from a state shown in FIG. 22 in that the selector valve 60 is at the neutral position between the first position and the second position and the selector valve 82 is at the second position. A state shown in FIG. 25 and a state shown in FIG. 22 are common except for the above difference. Therefore, descriptions for the common portion is omitted and detailed descriptions for the different portion will be provided.

When the controller 30 determines that a swing decelerating movement has been carried out, the controller 30 opens the regeneration valve 22G and causes the hydraulic oil at the side of the discharge port 21L of the hydraulic swing motor 21 to flow toward the selector valve 60 as shown by the black thick dotted line. Also, the controller 30 switches the selector valve 60 to the neutral position and divides the hydraulic oil flowing out of the hydraulic swing motor 21 to flow into each of the accumulator 80 and the pump/motor 14A at the same pressure as shown by the black thick dotted line.

Also, the controller 30 adjusts an opening area of the regeneration valve 22G depending on the swing flowing-out pressure as an output of a swing pressure sensor and on the accumulator pressure as an output of an accumulator sensor. Then, the controller 30 generates a desired brake torque for stopping the swing of the upper swing body 3 by controlling the swing flowing-out pressure.

Also, the controller 30 calculates an engine assist torque, which the pump/motor 14A generates, based on the displacement volume of the pump/motor 14A and the accumulator pressure. The displacement volume of the pump/motor 14A is calculated from, for example, an output of the swash plate tilting angle sensor. The controller 30 causes the engine assist torque to become an assist torque target value by adjusting the displacement volume (that is, the swash plate tilting angle) of the pump/motor 14A.

In this way, by using a state of the hydraulic circuit shown in FIG. 25, it is possible for the controller 30 to bring about the similar effects as a case in which a state of the hydraulic circuit shown in FIG. 22 is used.

Figure 26:
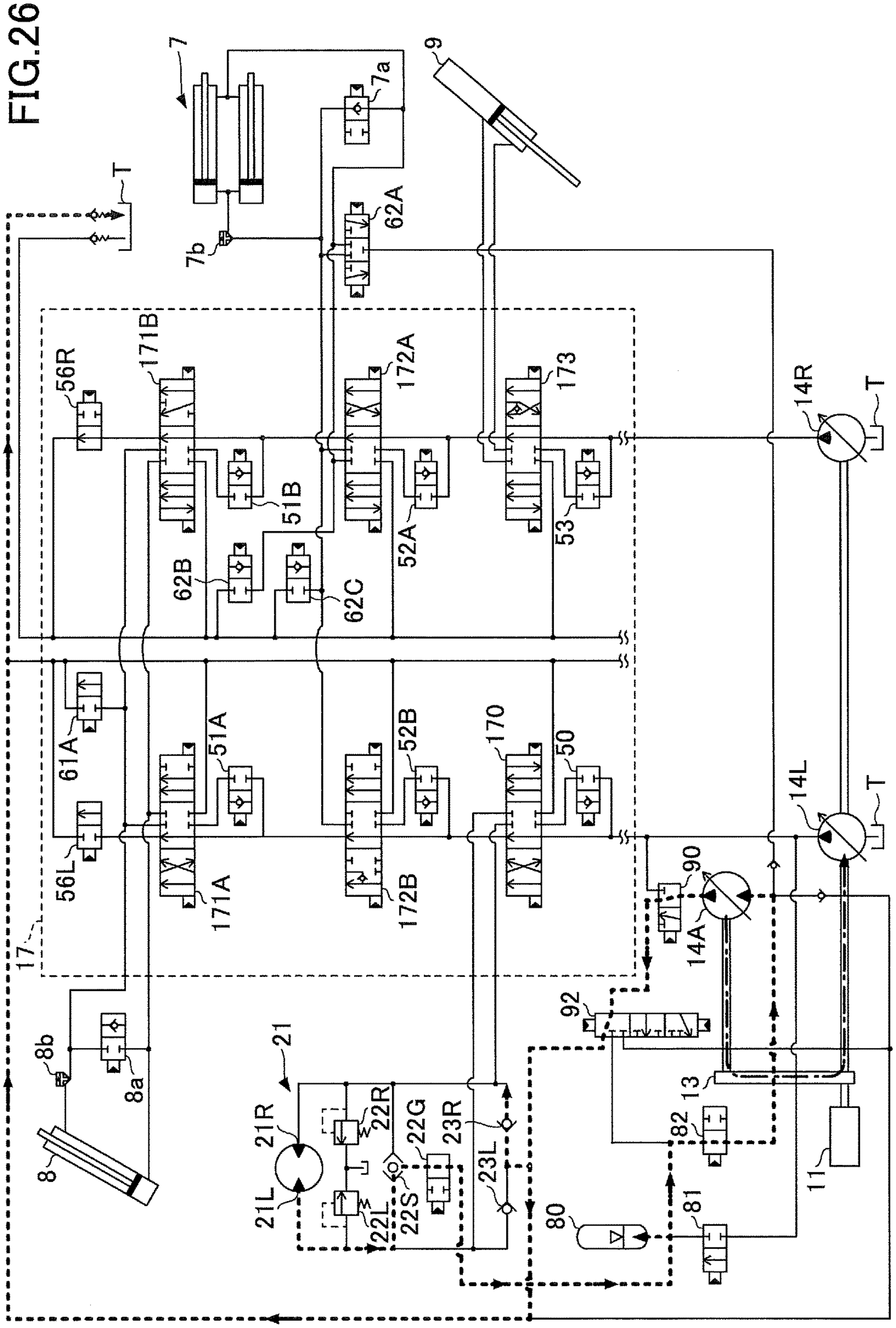
FIG. 26 shows a state of the hydraulic circuit in FIG. 3 when a swing-decelerating movement is carried out along with an engine-assist and a pressure accumulation in an accumulator.

Next, referring to FIG. 26, a state of the hydraulic circuit in FIG. 3 when a swing-decelerating movement is carried out along with an assist of an engine 11 and a pressure accumulation in an accumulator 80 is explained. FIG. 26 shows a state of the hydraulic circuit in FIG. 3 when a swing-decelerating movement is carried out along with an assist of an engine 11 and a pressure accumulation in an accumulator 80. Black thick dotted lines in FIG. 26 depict a flow of the hydraulic oil flowing out of the hydraulic swing motor 21. A black dashed-dotted line arrow depicts that an engine-assist torque is transmitted to the rotation axis of the engine 11 via the gearbox 13. FIG. 26 shows an example of a case in which the port 21L of the hydraulic swing motor 21 is a discharge port. However, the following explanation can be also applied to a case in which the port 21R is a discharge port.

When a swing-decelerating movement is carried out, the flow rate control valve 170 shifts to the neutral position as shown in FIG. 26 because a pilot pressure decreases with decrease in an amount of operation of the swing operating lever. As a result, the hydraulic oil flowing into the hydraulic swing motor 21 from at least one of the first pump 14L and the pump/motor 14A is blocked.

Then, when the controller 30 determines that the swing-decelerating movement has been carried out, the controller 30 opens the regeneration valve 22G and causes the hydraulic oil at the discharge port 21L side of the hydraulic swing motor 21 to flow toward the accumulator 80 as shown by the black thick dotted line. Also, the controller 30 switches the selector valve 82 to the first position to open a communication between the accumulator 80 and the pump/motor 14A, and causes the hydraulic oil flowing out of the hydraulic swing motor 21 to also flow into the pump/motor 14A as shown by the black thick dotted line. As a result, the hydraulic oil flowing out of the hydraulic swing motor 21 flows into each of the accumulator 80 and the pump/motor 14A at the same pressure.

Also, the controller 30 adjusts an opening area of the regeneration valve 22G depending on the swing flowing-out pressure as an output of a swing pressure sensor and on the accumulator pressure as an output of an accumulator sensor. Then, the controller 30 generates a desired brake torque for stopping the swing of the upper swing body 3 by controlling the swing flowing-out pressure.

Also, the controller 30 calculates an engine assist torque, which the pump/motor 14A generates, based on the displacement volume of the pump/motor 14A and the accumulator pressure. The displacement volume of the pump/motor 14A is calculated from, for example, an output of the swash plate tilting angle sensor. The controller 30 causes the engine assist torque to become an assist torque target value by adjusting the displacement volume (that is, the swash plate tilting angle) of the pump/motor 14A.

In this way, by using a state of the hydraulic circuit shown in FIG. 26, it is possible for the controller 30 to bring about the similar effects as a case in which a state of the hydraulic circuit shown in FIG. 22 is used.

[Swing Accelerating Movement Along with an Engine-assist and a Pressure Accumulation in an Accumulator]

Figure 27:
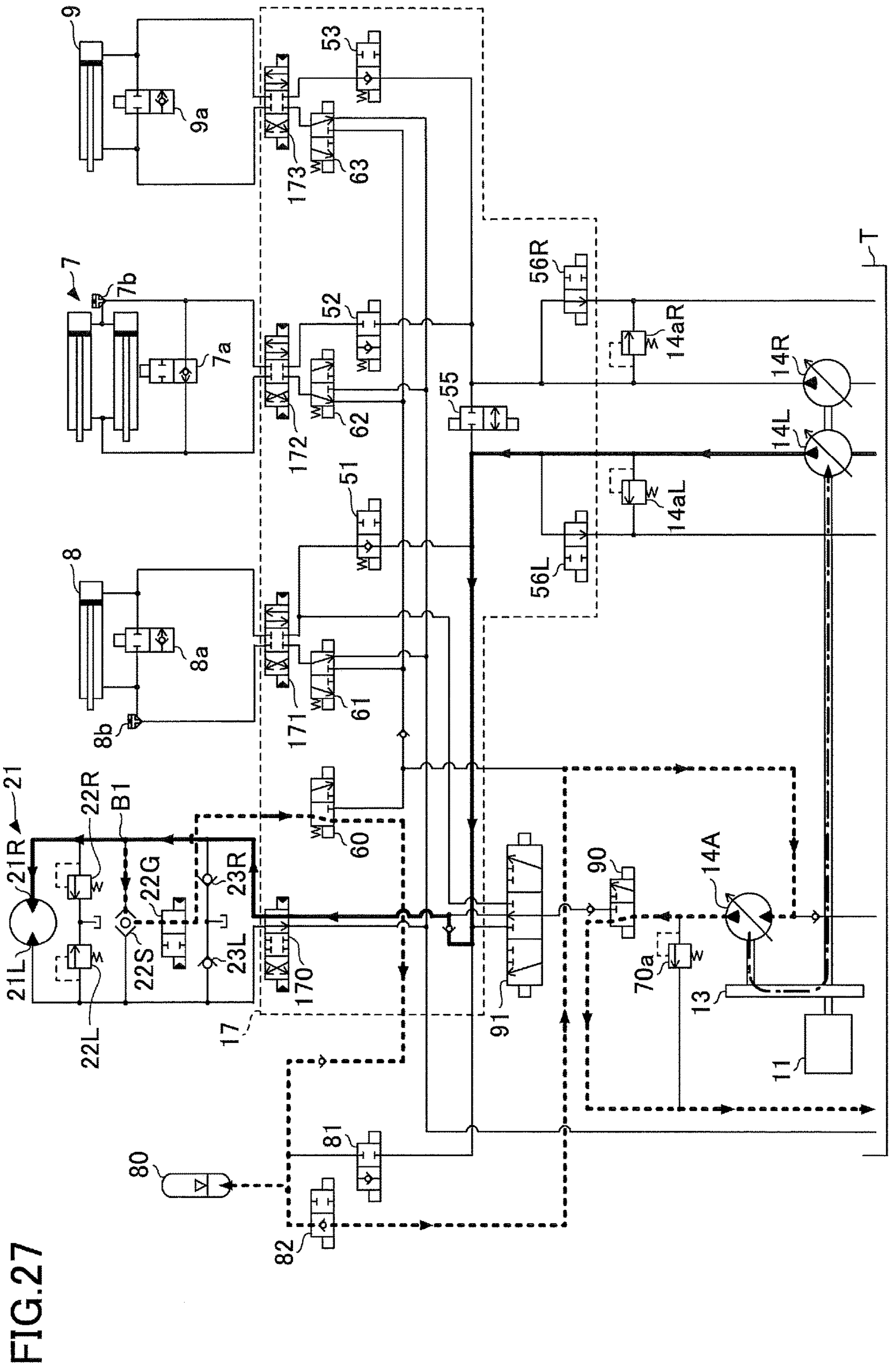
FIG. 27 shows a state of the hydraulic circuit in FIG. 2 when a swing-accelerating movement is carried out along with an engine-assist and a pressure accumulation in an accumulator.

Next, referring to FIG. 27, a state of the hydraulic circuit in FIG. 2 when a swing-accelerating movement is carried out along with an assist of an engine 11 and a pressure accumulation in an accumulator 80 is explained. FIG. 27 shows a state of the hydraulic circuit in FIG. 2 when a swing-accelerating movement is carried out along with an assist of an engine 11 and a pressure accumulation in an accumulator 80. Black thick solid lines in FIG. 27 depict a flow of the hydraulic oil flowing out of the first pump 14L into the hydraulic swing motor 21. A black dashed-dotted line arrow depicts a flow of the hydraulic oil flowing out of a branch point B1 into the accumulator 80 and the pump/motor 14A. A black dashed-dotted line arrow depicts that an engine-assist torque is transmitted to the rotation axis of the engine 11 via the gearbox 13. FIG. 27 shows an example of a case in which the port 21R of the hydraulic swing motor 21 is a suction port. However, the following explanation can be also applied to a case in which the port 21L is a suction port.

The swing-accelerating movement is a movement in which swing speed of the upper swing body 3 is accelerated. In the present embodiment, the swing-accelerating movement is carried out when, for example, the swing operating lever is operated by full lever. Specifically, while a part of the hydraulic oil discharged from the first pump 14L is caused to flow toward the hydraulic oil tank T through the relief valve 22R, remaining part of the hydraulic oil discharged from the first pump 14L is caused to flow into the suction port 21R of the hydraulic swing motor 21 in order to rotate the hydraulic swing motor 21. However, it is inefficient that a part of the hydraulic oil is caused to flow toward the hydraulic oil tank T because the hydraulic oil with large hydraulic energy is returned to the hydraulic oil tank T in vain. Therefore, the controller 30 realizes efficient use of the hydraulic energy by causing the hydraulic oil, which used to be caused to flow toward the hydraulic oil tank T through the relief valve 22R, to be accumulated in the accumulator 80, and/or, to be supplied to the pump/motor 14A.

When the swing-accelerating movement is carried out, the flow rate control valve 170 shifts to the right position as shown in FIG. 27. As a result, the hydraulic oil discharged from the first pump 14L flows into the suction port 21R of the hydraulic swing motor 21.

Then, when the controller 30 determines that the swing-accelerating movement has been carried out, the controller 30 opens the regeneration valve 22G and causes the hydraulic oil at the suction port 21R side of the hydraulic swing motor 21 to flow toward the selector valve 60 as shown by the black thick dotted line. Also, the controller 30 switches the selector valve 60 to the second position and causes the hydraulic oil flowing out of the regeneration valve 22G to flow into the accumulator 80 as shown by the black thick dotted line. Furthermore, the controller 30 switches the selector valve 82 to the first position to open a communication between the accumulator 80 and the pump/motor 14A, and causes the hydraulic oil flowing out of the regeneration valve 22G to also flow into the pump/motor 14A as shown by the black thick dotted line. As a result, the hydraulic oil flowing out of the regeneration valve 22G flows into each of the accumulator 80 and the pump/motor 14A at the same pressure.

Also, the controller 30 adjusts an opening area of the regeneration valve 22G depending on the swing flowing-in pressure as an output of the swing pressure sensor and on the accumulator pressure as an output of an accumulator sensor. The controller 30 further controls the swing flowing-in pressure in order to generate a desired acceleration torque for accelerating the swing of the upper swing body 3. In the present embodiment, in order to cause the swing flowing-in pressure to become slightly lower than a relief pressure or a cracking pressure of the relief valve 22L (hereinafter, referred to as "swing acceleration target pressure"), the controller 30 generates a pressure difference, between the front and the back of the regeneration valve 22G, equal to a difference between the swing acceleration target pressure and the accumulator pressure. The swing acceleration target pressure may be predefined in an internal memory or may be calculated each time based on outputs of various sensors Specifically, the controller 30 decreases the opening area of the regeneration valve 22G with increase of a difference between the swing acceleration target pressure and the accumulator pressure, or with decrease of the accumulator pressure; and increases the opening area of the regeneration valve 22G with decrease of a difference between the swing acceleration target pressure and the accumulator pressure, or with increase of the accumulator pressure. When the accumulator pressure is greater than the swing acceleration target pressure, the controller 30 may release the hydraulic oil at the port 21R side from the relief valve 22R to the hydraulic oil tank T by closing the regeneration valve 22G.

Also, the controller 30 calculates an engine assist torque, which the pump/motor 14A generates, based on a displacement volume of the pump/motor 14A and the accumulator pressure. The displacement volume of the pump/motor 14A is calculated from, for example, an output of a swash plate tilting angle sensor (not shown). The controller 30 causes the engine assist torque to become an assist torque target value by adjusting the displacement volume, or the swash plate tilting angle, of the pump/motor 14A. The assist torque target value may be predefined in the internal memory, etc., or may be calculated each time based on outputs of various sensors.

Specifically, the controller 30 increases the swash plate tilting angle in order to increase the displacement volume when the engine assist torque is less than the assist torque target value. A flow rate of the hydraulic oil flowing into the pump/motor 14A increases with increase of the displacement volume. As a result, a flow rate of the hydraulic oil flowing into the accumulator 80 decreases. Also, the controller 30 decreases the swash plate tilting angle in order to decrease the displacement volume when the engine assist torque is greater than the assist torque target value. A flow rate of the hydraulic oil flowing into the pump/motor 14A decreases with decrease of the displacement volume. As a result, a flow rate of the hydraulic oil flowing into the accumulator 80 increases. The accumulator 80 increases the accumulator pressure with increase of the volume of the internally accumulated hydraulic oil, in order to decrease a difference between the swing acceleration target pressure and the accumulator pressure. Then, when the difference between the swing acceleration target pressure and the accumulator pressure decreases, the controller 30 increases the opening area of the regeneration valve 22G in order to maintain the swing flowing-in pressure at the swing acceleration target pressure. With the above operations, the desired acceleration torque is maintained.

In this case, the acceleration torque is expressed by the following equation (7). $D_m$ represents the displacement volume of the hydraulic swing motor 21 (motor volume) and $P_m$ represents the swing flowing-in pressure.

[Math 7]

$$T_A = D_m P_m \tag{7}$$

The flow rate $Q_m$ of the hydraulic oil flowing through the regeneration valve 22G is expressed by the following equation (8). $Q_P$ represents a discharge rate of the first pump 14L and $Q_{swg}$ represents the swing flowing-in rate.

[Math 8]

$$Q_m = Q_P - Q_{swg} = Q_P - D_m\omega \quad (8)$$

The flow rate $Q_m$ of the hydraulic oil flowing through the regeneration valve 22G is also expressed by the following equation (9). The equation (9) is the same as the above-described equation (3). $c_{ma}$ represents a flow coefficient, $A_{ma}$ represents an opening area of the regeneration valve 22G, $P_{acc}$ represents an accumulator pressure, and ρ represents a density of the hydraulic oil.

[Math 9]

$$Q_m = c_{ma} A_{ma} \sqrt{\frac{2(P_m - P_{acc})}{\rho}} \quad (9)$$

A hydraulic system is controllable, and a state of the hydraulic system can be freely changed by controlling the opening area of the regeneration valve 22G. Therefore, in the present embodiment, the controller 30 causes the swing flowing-in pressure $P_m$ to become a desired swing acceleration target pressure by adjusting an opening area $A_{ma}$ of the regeneration valve 22G. In the following, this adjustment is referred to as "swing flowing-in pressure feedback control".

When the selector valve 82 is shifted to the first position to open a communication between the accumulator 80 and the upstream side of the pump/motor 14A, a part or all of the hydraulic oil flowing out of the hydraulic swing motor 21 flows into the upstream side of the pump/motor 14A.

As described above, the hydraulic system is controllable, and a state of the hydraulic system can be freely changed by controlling the opening area of the regeneration valve 22G and by controlling the displacement volume of the pump/motor 14A. Therefore, in the present embodiment, the controller 30 causes the engine assist torque $T_{P3}$ to become the desired assist torque target value by adjusting the displacement volume of the pump/motor 14A, $V_{P3}$. In the following, this adjustment is referred to as "engine assist torque feedback control".

In this way, it is possible for the controller 30 to control the swing flowing-in pressure and the engine assist torque to be desired values by carrying out the swing flowing-in pressure feedback control and the engine assist torque feedback control, simultaneously and independently.

Also, it is possible for the controller 30 to cause the accumulator 80 to accumulate a part of the hydraulic oil flowing out of the regeneration valve 22G during the swing acceleration, and to supply the remaining part directly to the upstream side of the pump/motor 14A without accumulation in the accumulator 80. It is possible to generate a desired engine assist torque and to realize, for example, saving of energy by assisting the engine 11. It is possible for the controller 30 to use inertial energy of the upper swing body 3 more efficiently than a case in which the hydraulic oil is accumulated in the accumulator 80 first, and then, is released to the upstream side of the pump/motor 14A, and it is possible to realize saving of energy.

A control flow of a hydraulic system during the swing accelerating movement is similar to the control flow of a hydraulic system during the swing decelerating movement.

Figure 28:
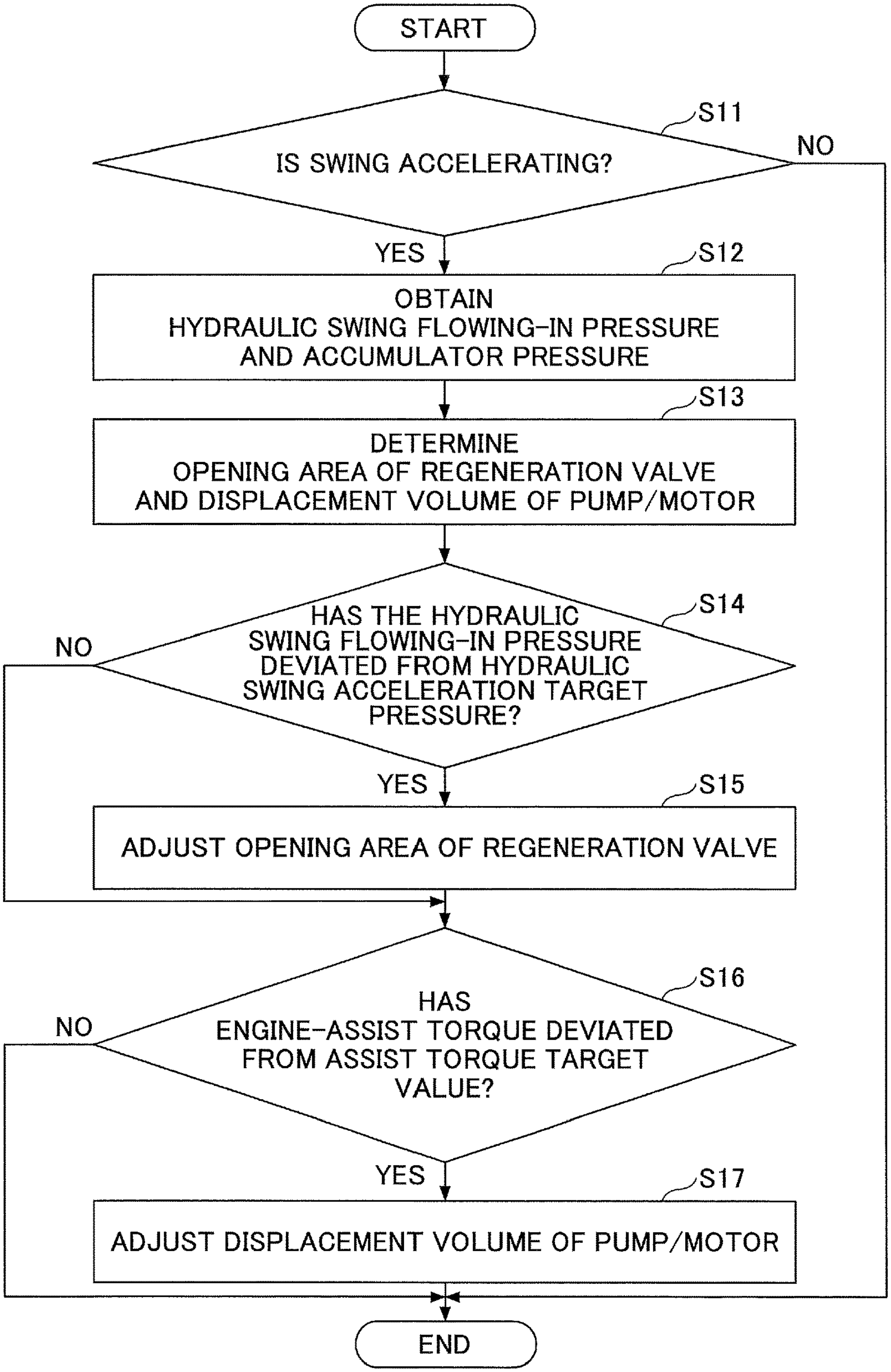
FIG. 28 is a flowchart showing flow of a swing-accelerating process.

Next, referring to FIG. 28, a process is described, in which, during swing acceleration, the controller 30 adjusts the opening area of the regeneration valve 22G in order to generate a desired acceleration torque and adjusts the displacement volume of the pump/motor 14A in order to generate a desired engine-assist torque (hereinafter, referred to as "swing accelerating process"). FIG. 28 is a flowchart showing flow of the swing accelerating process. The controller 30 carries out the swing accelerating process repeatedly at a predetermined control cycle.

At first, the controller 30 determines whether the swing is accelerating (step S11). In the present embodiment, the controller 30 determines whether the swing is accelerating based on an output of the operating pressure sensor corresponding to the swing operating lever.

When it is determined that the swing is accelerating (YES in step S11), the controller 30 obtains the swing flowing-in pressure and the accumulator pressure (step S12). In the present embodiment, the controller 30 obtains the swing flowing-in pressure based on an output of the swing pressure sensor, and obtains the accumulator pressure based on an output of the accumulator pressure sensor.

Then, the controller 30 determines the opening area of the regeneration valve 22G and the displacement volume of the pump/motor 14A (step S13). In the present embodiment, the controller 30 causes the swing flowing-in pressure to be matched with the swing acceleration target pressure by determining the opening area of the regeneration valve 22G based on a pressure difference between the accumulator pressure and the swing acceleration target pressure. The controller 30 also causes the engine assist torque generated by the pump/motor 14A to be matched with the assist torque target value by determining the displacement volume of the pump/motor 14A based on the accumulator pressure and the assist torque target value.

The controller 30 also determines whether the swing flowing-in pressure has deviated from the swing acceleration target pressure (step S14). When it is determined that the swing flowing-in pressure has deviated from the swing acceleration target pressure (YES in step S14), the controller 30 adjusts the opening area of the regeneration valve 22G (step S15).

In the present embodiment, by using the swing flowing-in pressure feedback control, the controller 30 increases the opening area of the regeneration valve 22G when the swing flowing-in pressure output from the swing pressure sensor exceeds the swing acceleration target pressure, and decreases the opening area of the regeneration valve 22G when the swing flowing-in pressure output from the swing pressure sensor becomes less than the swing acceleration target pressure.

Further, the controller 30 determines whether the engine-assist torque has deviated from the assist torque target value (step S16). When it is determined that the engine-assist torque has deviated from the assist torque target value (YES in step S16), the controller 30 adjusts the displacement volume of the pump/motor 14A (step S17).

In the present embodiment, by using the engine assist torque feedback control, the controller 30 calculates the engine-assist torque based on the accumulator pressure and the swash plate tilting angle of the pump/motor 14A. When the engine-assist torque exceeds the assist torque target value, the controller 30 decreases the displacement area of the pump/motor 14A. When the engine-assist torque becomes less than the assist torque target value, the controller 30 increases the displacement area of the pump/motor 14A.

In this way, while monitoring the swing flowing-in pressure and the accumulator pressure, the controller 30 maintains the desired acceleration torque and the desired engine-assist torque by adjusting the opening area of the regeneration valve 22G and the displacement volume of the pump/motor 14A. Further, it is possible for the controller 30 to cause a part of the hydraulic oil discharged from the first pump 14L during the swing acceleration to be, instead of released through the relief valves 22L and 22R, accumulated in the accumulator 80, and/or, supplied to the pump/motor 14A. As a result, it is possible for the controller 30 to realize efficient use of the hydraulic energy.

Figure 29:
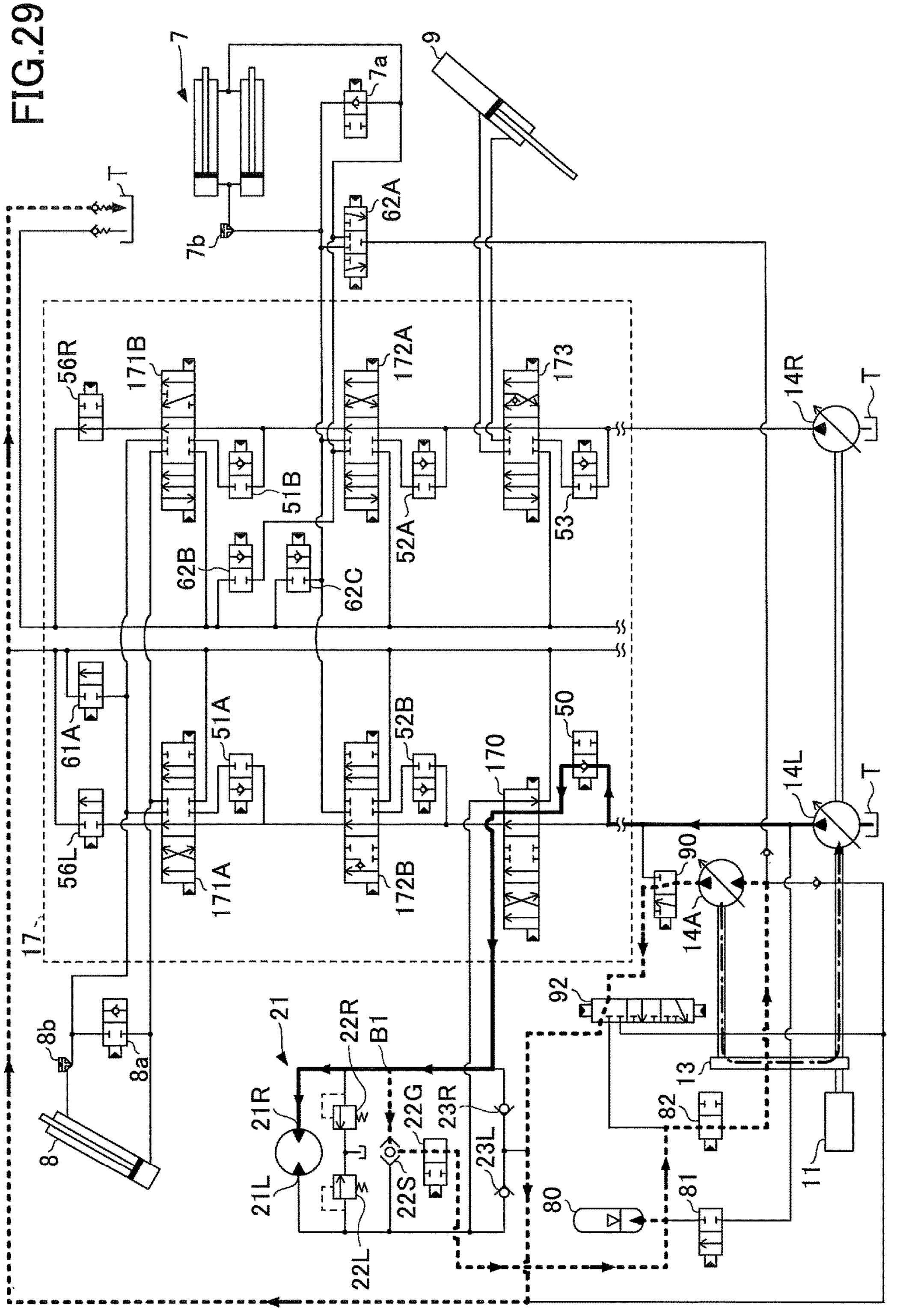
FIG. 29 shows a state of the hydraulic circuit in FIG. 3 when a swing-accelerating movement is carried out along with an engine-assist and a pressure accumulation in an accumulator.

Next, referring to FIG. 29, a state of the hydraulic circuit in FIG. 3 when a swing-accelerating movement is carried out along with an assist of an engine 11 and a pressure accumulation in an accumulator 80 is explained. FIG. 29 shows a state of the hydraulic circuit in FIG. 3 when a swing-accelerating movement is carried out along with an assist of an engine 11 and a pressure accumulation in an accumulator 80. Black thick solid lines in FIG. 29 depict a flow of the hydraulic oil flowing out of the first pump 14L into the hydraulic swing motor 21. A black dashed-dotted line arrow depicts a flow of the hydraulic oil flowing out of a branch point B1 into the accumulator 80 and the pump/motor 14A. A black dashed-dotted line arrow depicts that an engine-assist torque is transmitted to the rotation axis of the engine 11 via the gearbox 13. FIG. 29 shows an example of a case in which the port 21R of the hydraulic swing motor 21 is a suction port. However, the following explanation can be also applied to a case in which the port 21L is a suction port.

When the swing-accelerating movement is carried out, the variable load check valve 50 shifts to the left position and the flow rate control valve 170 shifts to the right position as shown in FIG. 29. As a result, the hydraulic oil discharged from the first pump 14L flows into the suction port 21R of the hydraulic swing motor 21.

When the controller 30 determines that the swing-accelerating movement has been carried out, the controller 30 opens the regeneration valve 22G and causes the hydraulic oil at the suction port 21R side of the hydraulic swing motor 21 to flow toward accumulator 80 as shown by the black thick dotted line. Also, the controller 30 switches the selector valve 82 to the first position, opens a communication between the accumulator 80 and the pump/motor 14A, and causes the hydraulic oil flowing out of the regeneration valve 22G to also flow into the pump/motor 14A as shown by the black thick dotted lines. As a result, the hydraulic oil flowing out of the regeneration valve 22G flows into each of the accumulator 80 and the pump/motor 14A at the same pressure.

Also, the controller 30 adjusts an opening area of the regeneration valve 22G depending on the swing flowing-in pressure as an output of the swing pressure sensor and on the accumulator pressure as an output of an accumulator sensor. Then, the controller 30 controls the swing flowing-in pressure in order to generate a desired acceleration torque for accelerating the swing of the upper swing body 3.

Also, the controller 30 calculates an engine assist torque, which the pump/motor 14A generates, based on the displacement volume of the pump/motor 14A and the accumulator pressure. The displacement volume of the pump/motor 14A is calculated from, for example, an output of the swash plate tilting angle sensor. The controller 30 causes the engine assist torque to become an assist torque target value by adjusting the displacement volume (that is, the swash plate tilting angle) of the pump/motor 14A.

In this way, by using a state of the hydraulic circuit shown in FIG. 29, it is possible for the controller 30 to bring about the similar effects as a case in which a state of the hydraulic circuit shown in FIG. 28 is used.

[Swing Accelerating Movement Along with Only a Pressure Accumulation in an Accumulator]

Figure 30:
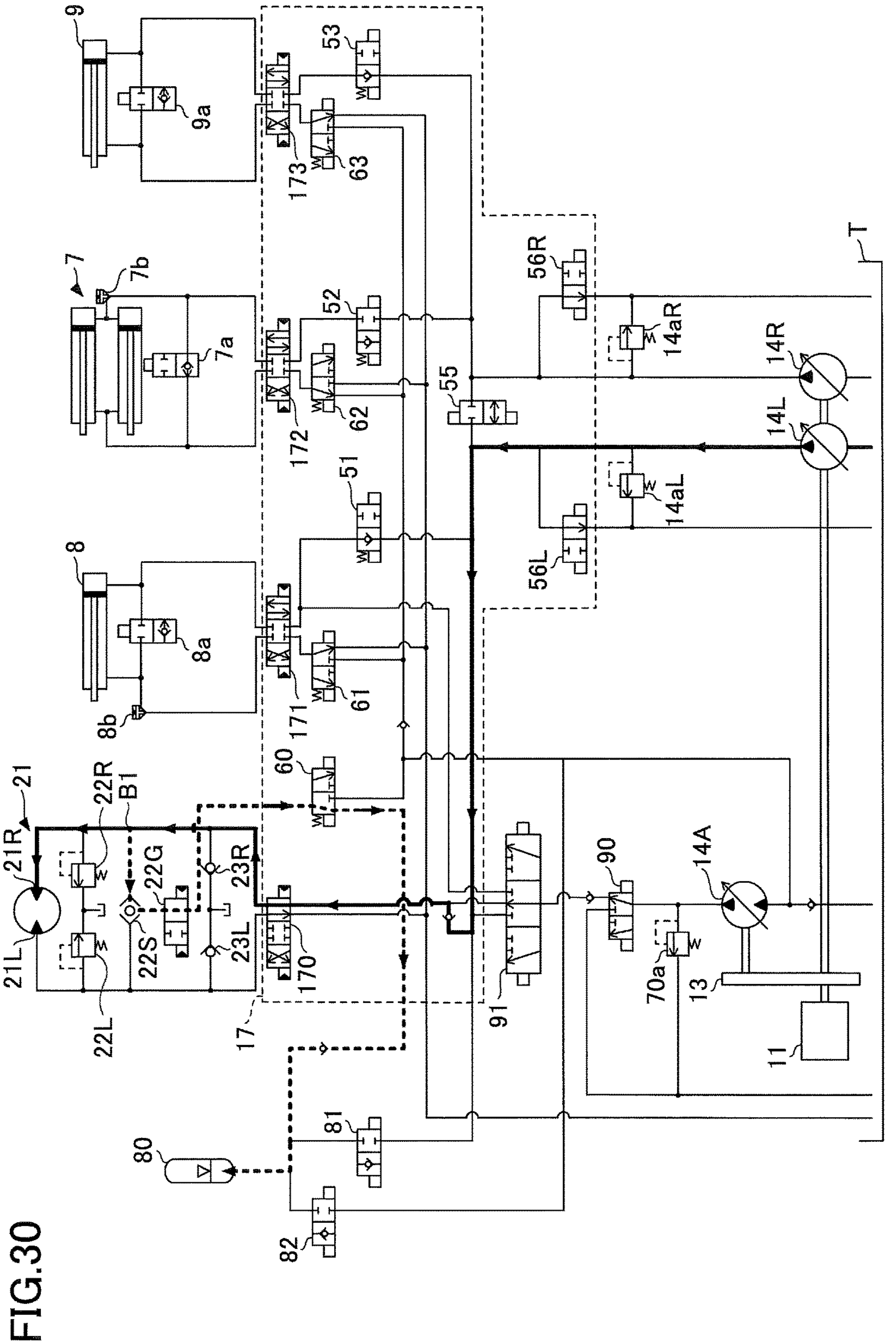
FIG. 30 shows a state of the hydraulic circuit in FIG. 2 when a swing-accelerating movement is carried out along with a pressure accumulation in an accumulator.

Next, referring to FIG. 30, a state of the hydraulic circuit in FIG. 2 when a swing-accelerating movement is carried out along with only a pressure accumulation in the accumulator 80 is explained. FIG. 30 shows a state of the hydraulic circuit in FIG. 2 when a swing-accelerating movement is carried out along with only a pressure accumulation in the accumulator 80. Black thick solid lines in FIG. 30 depict a flow of the hydraulic oil flowing out of the first pump 14L into the hydraulic swing motor 21, and black thick dotted lines depict a flow of the hydraulic oil flowing out of a branch point B1 into the accumulator 80. FIG. 30 shows an example of a case in which the port 21R of the hydraulic swing motor 21 is a suction port. However, the following explanation can be also applied to a case in which the port 21L is a suction port. A swing accelerating process carried out by the hydraulic circuit in FIG. 30 is the same as the swing accelerating process shown in FIG. 28 except for steps for adjusting the displacement volume of the pump/motor 14A in order to generate a desired engine-assist torque. Further, a control flow of the hydraulic system during the swing accelerating movement is the same as the control flow of the hydraulic system during the swing decelerating movement shown in FIG. 23.

When the swing-accelerating movement is carried out, the flow rate control valve 170 shifts to the right position as shown in FIG. 30. As a result, the hydraulic oil discharged from the first pump 14L flows into the suction port 21R of the hydraulic swing motor 21.

When the controller 30 determines that the swing-accelerating movement has been carried out, the controller 30 opens the regeneration valve 22G and causes the hydraulic oil at the suction port 21R side of the hydraulic swing motor 21 to flow toward the selector valve 60 as shown by the black thick dotted line. Also, the controller 30 switches the selector valve 60 to the second position and causes the hydraulic oil flowing out of the regeneration valve 22G to flow into the accumulator 80 as shown by the black thick dotted line.

Also, the controller 30 adjusts an opening area of the regeneration valve 22G depending on the swing flowing-in pressure as an output of a swing pressure sensor and on the accumulator pressure as an output of an accumulator sensor. The controller 30 further controls the swing flowing-in pressure in order to generate a desired acceleration torque for accelerating the swing of the upper swing body 3. In the present embodiment, in order to cause the swing flowing-in pressure to become the swing acceleration target pressure, the controller 30 generates a pressure difference, between the front and the back of the regeneration valve 22G, equal to a difference between the swing acceleration target pressure and the accumulator pressure. The swing acceleration target pressure may be predefined in an internal memory or may be calculated each time based on outputs of various sensors.

Specifically, the controller 30 decreases the opening area of the regeneration valve 22G with increase of a difference between the swing acceleration target pressure and the accumulator pressure, or with decrease of the accumulator pressure; and increases the opening area of the regeneration valve 22G with decrease of a difference between the swing acceleration target pressure and the accumulator pressure, or with increase of the accumulator pressure. When the accumulator pressure is greater than the swing acceleration target pressure, the controller 30 may release the hydraulic oil at the port 21R side from the relief valve 22R to the hydraulic oil tank T by closing the regeneration valve 22G.

The accumulator 80 increases the accumulator pressure with increase of the volume of the internally accumulated hydraulic oil, in order to decrease a difference between the swing acceleration target pressure and the accumulator pressure. Then, when the difference between the swing acceleration target pressure and the accumulator pressure decreases, the controller 30 increases the opening area of the regeneration valve 22G in order to maintain the swing flowing-in pressure at the swing acceleration target pressure. With the above operations, the desired acceleration torque is maintained.

In this way, while monitoring the swing flowing-in pressure and the accumulator pressure, the controller 30 maintains the desired acceleration torque by adjusting the opening area of the regeneration valve 22G. Further, it is possible for the controller 30 to cause a part of the hydraulic oil discharged from the first pump 14L during the swing acceleration to be, instead of released through the relief valves 22L and 22R, accumulated in the accumulator 80. As a result, it is possible for the controller 30 to realize efficient use of the hydraulic energy.

Figure 31:
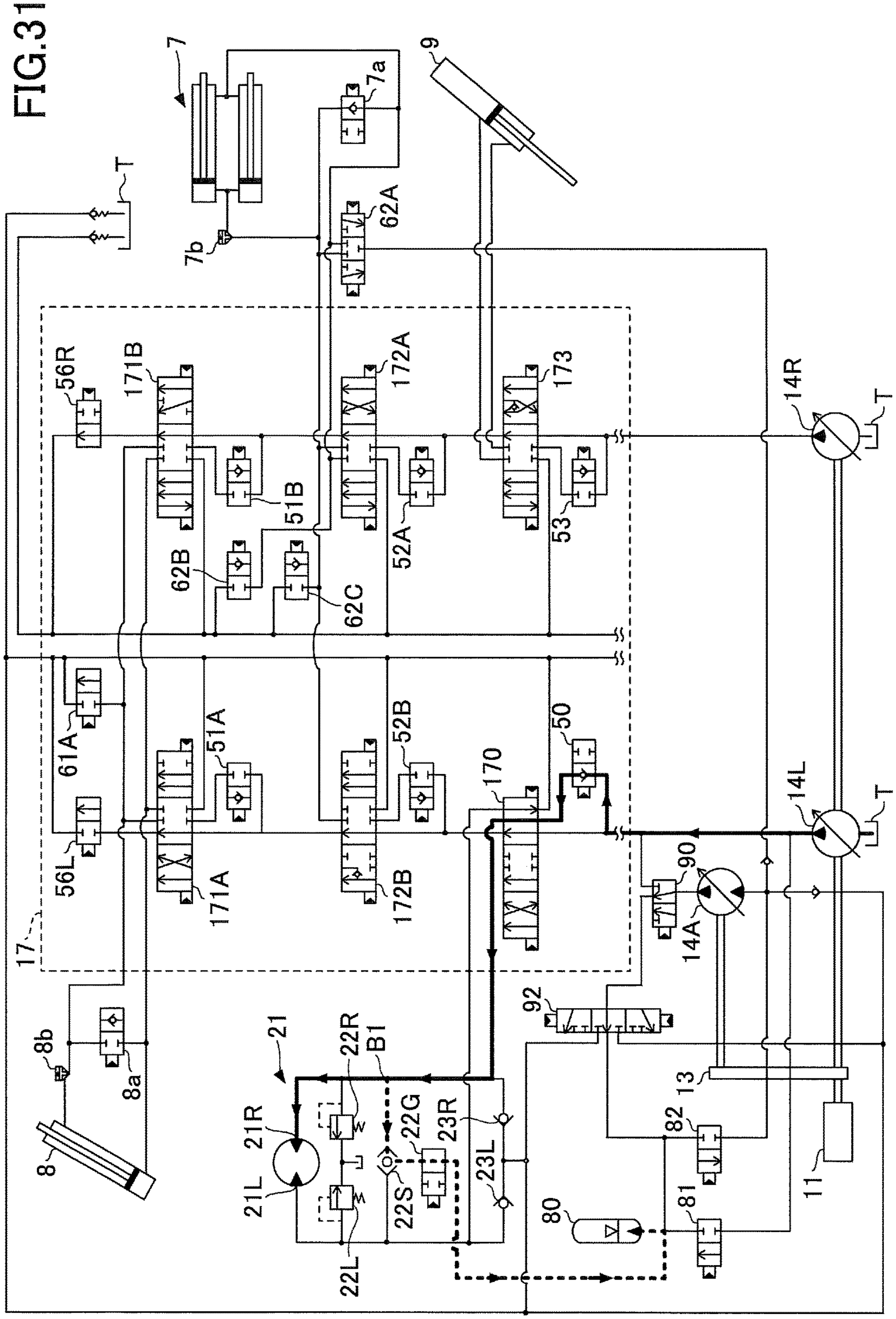
FIG. 31 shows a state of the hydraulic circuit in FIG. 3 when a swing-accelerating movement is carried out along with a pressure accumulation in an accumulator.

Next, referring to FIG. 31, a state of the hydraulic circuit in FIG. 3 when a swing-accelerating movement is carried out along with only a pressure accumulation in an accumulator 80 is explained. FIG. 31 shows a state of the hydraulic circuit in FIG. 3 when a swing-accelerating movement is carried out along with only a pressure accumulation in an accumulator 80. Black thick solid lines in FIG. 31 depict a flow of the hydraulic oil flowing out of the first pump 14L into the hydraulic swing motor 21. Black thick dotted lines depict a flow of the hydraulic oil flowing out of a branch point B1 into the accumulator 80. FIG. 31 shows an example of a case in which the port 21R of the hydraulic swing motor 21 is a suction port. However, the following explanation can be also applied to a case in which the port 21L is a suction port.

When the swing-accelerating movement is carried out, the variable load check valve 50 shifts to the left position and the flow rate control valve 170 shifts to the right position as shown in FIG. 31. As a result, the hydraulic oil discharged from the first pump 14L flows into the suction port 21R of the hydraulic swing motor 21.

When the controller 30 determines that a swing accelerating movement has been carried out, the controller 30 opens the regeneration valve 22G and causes the hydraulic oil at the suction port 21R side of the hydraulic swing motor 21 to flow toward the accumulator 80 as shown by the black thick dotted line.

Also, the controller 30 adjusts an opening area of the regeneration valve 22G depending on the swing flowing-in pressure as an output of the swing pressure sensor and on the accumulator pressure as an output of an accumulator sensor. Then, the controller 30 generates a desired acceleration torque for accelerating the swing of the upper swing body 3 by controlling the swing flowing-in pressure.

In this way, by using a state of the hydraulic circuit shown in FIG. 31, it is possible for the controller 30 to bring about the similar effects as a case in which a state of the hydraulic circuit shown in FIG. 30 is used.

The above description explains eleven types of states in each of the hydraulic circuits in FIGS. 2 and 3 (four states during an excavating movement, three states during an earth removing movement, one state during a boom-lowering-swing-decelerating movement, one state during a swing decelerating movement, and two states during a swing accelerating movement). The controller 30 determines which states to realize based on an amount of operation of an operating lever corresponding to each of the hydraulic actuators, a load pressure of each of the hydraulic actuators, an accumulation state of the accumulator 80, and the like.

For example, the controller 30 may allow an excavating movement along with an accumulator assist to be carried out, when it determines that there is no need to generate a back-pressure in the rod side hydraulic chamber of the boom cylinder 7 during the excavating movement and that sufficient amounts of hydraulic oil are accumulated in the accumulator 80.

Also, the controller 30 may allow an excavating movement along with a hydraulic-actuator-assist by a back-pressure regeneration to be carried out, when it determines that there is a need to generate a back-pressure in the rod side hydraulic chamber of the boom cylinder 7 during the excavating movement and that there is a need to actuate the arm cylinder 8 rapidly.

Also, the controller 30 may allow an excavating movement along with an engine-assist by a back-pressure regeneration to be carried out, when it determines that there is a need to generate a back-pressure in the rod side hydraulic chamber of the boom cylinder 7 during the excavating movement and that there is no need to actuate the arm cylinder 8 rapidly.

Also, the controller 30 may allow an earth removing movement along with a hydraulic-actuator-assist by a back-pressure regeneration to be carried out, when it determines that there is a need to generate a back-pressure in the rod side hydraulic chamber of the boom cylinder 7 during the earth removing movement and that there is a need to actuate the arm cylinder 8 rapidly.

Also, the controller 30 may allow an earth removing movement along with an engine-assist by a back-pressure regeneration to be carried out, when it determines that there is a need to generate a back-pressure in the bottom side hydraulic chamber of the boom cylinder 7 during the earth removing movement, that there is no need to actuate the arm cylinder 8 rapidly, and that sufficient amounts of hydraulic oil are accumulated in the accumulator 80.

Also, the controller 30 may allow an earth removing movement along with a pressure accumulation in an accumulator by a back-pressure regeneration to be carried out, when it determines that there is a need to generate a back-pressure in the bottom side hydraulic chamber of the boom cylinder 7 during the earth removing movement, that there is no need to actuate the arm cylinder 8 rapidly, and that sufficient amounts of hydraulic oil are not accumulated in the accumulator 80.

As described above, preferable embodiments of the present invention have been explained in detail. However, the present invention shall not be limited to the above embodiments. Variety of modifications and substitutions can be applied to the above embodiments without deviating from the scope of the present invention.

For example, in the above embodiments, the hydraulic actuators may include a left side hydraulic running motor (not shown) and a right side hydraulic running motor (not shown). In this case, the controller 30 may accumulate hydraulic energy generated during a travel deceleration in the accumulator 80. The hydraulic swing motor 21 may be an electric motor.

Also, the shovel according to the above embodiments may mount an electric motor-generator (not shown), an electric storage device (not shown) that accumulates electric power generated by the electric motor-generator and supplies electric power to the electric motor-generator, an inverter that controls the electric motor-generator, and the like.

Also, the pump/motor 14A may be actuated by the electric motor-generator, instead of being actuated by the engine 11. In this case, when the pump/motor 14A acts as a hydraulic motor, the pump/motor 14A may actuate the electric motor-generator as a generator by using generated rotary torque, and may then cause the generated electric power to be accumulated in the electric storage device. Also, the electric motor-generator may act as a electric motor by using the electric power accumulated in the electric storage device, and may then cause the pump/motor 14A to act as a hydraulic pump.

DESCRIPTION OF THE REFERENCE NUMERALS

1 . . . lower running body,
2 . . . swing mechanism,
3 . . . upper swing body,
4 . . . boom,
5 . . . arm,
6 . . . bucket,
7 . . . boom cylinder,
8 . . . arm cylinder,
9 . . . bucket cylinder,
7*a*, 8*a*, 9*a* . . . regeneration valve,
7*b*, 8*b* . . . holding valve,
10 . . . cabin,
11 . . . engine,
13 . . . gearbox,
14A . . . pump/motor,
14L . . . first pump,
14R . . . second pump,
14*a*L, 14*a*R . . . relief valve,
17 . . . control valve,
21 . . . hydraulic swing motor,
21L, 21R . . . port,
22L, 22R . . . relief valve,
22S . . . shuttle valve,
22G . . . regeneration valve,
23L, 23R . . . check valve,
30 . . . controller,
50, 51, 51A, 51B, 52, 52A, 52B, 53 . . . variable load check valve,
55 . . . confluence valve,
56L, 56R . . . unified bleed-off valve,
60, 61, 61A, 62, 62A, 62B, 62C, 63, 81, 82, 90, 91, 92 . . . selector valve,
70*a* . . . relief valve,
80 . . . accumulator,
170, 171, 171A, 171B, 172, 172A, 172B, 173 . . . flow rate control valve,
T . . . hydraulic oil tank

What is claimed is:

1. A shovel with a plurality of hydraulic pumps, the shovel comprising:

a hydraulic swing motor;

a relief valve configured to release hydraulic oil when a pressure of hydraulic oil flowing out of the hydraulic swing motor becomes equal to or higher than a predetermined relief pressure;

a hydraulic motor configured to generate an engine-assist torque in response to hydraulic oil flowing out of a suction port side of the hydraulic swing motor during swing acceleration, or in response to hydraulic oil flowing out of a discharge port side of the hydraulic swing motor during swing deceleration;

an accumulator configured to accumulate the flowing out hydraulic oil;

an open/close valve, whose open area is adjustable, configured to switch open/close of transfer from one of the suction port and the discharge port to both the hydraulic motor and the accumulator; and a control device configured to control the open/close valve, wherein the control device adjusts an open area of the open/close valve to cause a pressure of the flowing out hydraulic oil to be a predetermined target pressure, and causes the flowing out hydraulic oil to flow into each of the hydraulic motor and the accumulator.

2. The shovel as claimed in claim 1, further comprising:

a selector valve configured to selectively realize a state in which the flowing out hydraulic oil flows into each of the hydraulic motor and the accumulator at the same pressure.

3. The shovel as claimed in claim 2, wherein the selector valve is located between the hydraulic motor and the accumulator.

4. The shovel as claimed in claim 3, wherein the selector valve opens a communication between the hydraulic motor and the accumulator during the swing deceleration in order to cause the hydraulic oil flowing out of the open/close valve to flow into each of the hydraulic motor and the accumulator at the same pressure.

5. The shovel as claimed in claim 2, wherein the selector valve is located between the discharge port and each of the hydraulic motor and the accumulator.

6. The shovel as claimed in claim 1, wherein the hydraulic motor is a variable displacement type in which a displacement volume is controlled in such a way that the engine-assist torque becomes equal to or less than a predetermined assist torque target value.

7. The shovel as claimed in claim 6, wherein the displacement volume is determined based on a pressure of hydraulic oil accumulated in the accumulator and on the assist torque target value in such a way that the engine-assist torque is matched with the assist torque target value.

8. The shovel as claimed in claim 6, wherein the engine-assist torque is calculated based on a pressure of the hydraulic oil accumulated in the accumulator and a swash plate tilting angle of the hydraulic motor.

9. The shovel as claimed in claim 1, wherein the target pressure is less than a relief pressure or a cracking pressure of the hydraulic swing motor.

10. The shovel as claimed in claim 1, wherein the control device determines an open area of the open/close valve based on a pressure difference between a pressure of the hydraulic oil accumulated in the accumulator and the target pressure in such a way that a pressure of the hydraulic oil flowing out of a discharge port side of the hydraulic swing motor is matched with the target pressure during swing deceleration.

11. The shovel as claimed in claim 1, wherein the control device determines an open area of the open/close valve based on a pressure difference between a pressure of the hydraulic oil accumulated in the accumulator and the target pressure in such a way that a pressure of the hydraulic oil flowing out of a suction port side of the hydraulic swing motor is matched with the target pressure during swing acceleration.

12. The shovel as claimed in claim 1, wherein the control device discharges the hydraulic oil of the suction port side of the hydraulic swing motor from a relief valve to a hydraulic oil tank when a pressure of the hydraulic oil accumulated in the accumulator is greater than the target pressure.

13. A shovel with a plurality of hydraulic pumps, the shovel comprising:

a hydraulic swing motor;

a relief valve configured to release hydraulic oil when a pressure of hydraulic oil flowing out of the hydraulic swing motor becomes equal to or higher than a predetermined relief pressure;

an accumulator configured to accumulate (1) hydraulic oil flowing out of a suction port side of the hydraulic swing motor during swing acceleration, or (2) hydraulic oil flowing out of a discharge port side of the hydraulic swing motor during swing deceleration;

an open/close valve, whose open area is adjustable, configured to switch open/close of transfer from one of the suction port and the discharge port to the accumulator; and a control device configured to control the open/close valve, wherein the control device adjusts an open area of the open/close valve to cause a pressure of the flowing out hydraulic oil to be a target pressure, and causes the flowing out hydraulic oil to flow into the accumulator.

* * * * *